US008843939B2

(12) United States Patent
Lesandro et al.

(10) Patent No.: US 8,843,939 B2
(45) Date of Patent: Sep. 23, 2014

(54) COMPUTER ARCHITECTURE AND PROCESS FOR APPLICATION PROCESSING ENGINE

(75) Inventors: Ronald M. Lesandro, Hamburg, NY (US); Paris F. Roselli, Buffalo, NY (US); Michael J. Sullivan, Colden, NY (US); Srinivas Laksham, Mexico City (MX); Sonu Gupta, Tampa, FL (US); John P. Flood, Bartlett, IL (US); Martin Hayes, New York, NY (US); Trevor Johnson, Vancouver (CA); Darrick R. Brooks, Valrico, FL (US); Ewan C. Hutton, Horrogate (GB)

(73) Assignee: HSBC Technology & Services (USA) Inc., Mettawa, IL (US)

(*) Notice: Subject to any disclaimer, the term of this patent is extended or adjusted under 35 U.S.C. 154(b) by 140 days.

(21) Appl. No.: 13/270,831

(22) Filed: Oct. 11, 2011

(65) Prior Publication Data

US 2012/0180071 A1 Jul. 12, 2012

Related U.S. Application Data

(60) Provisional application No. 61/391,815, filed on Oct. 11, 2010, provisional application No. 61/405,398, filed on Oct. 21, 2010, provisional application No. 61/407,210, filed on Oct. 27, 2010, provisional application No. 61/435,000, filed on Jan. 21, 2011.

(51) Int. Cl.
*G06F 3/00* (2006.01)
*G06F 9/445* (2006.01)
*G06Q 40/00* (2012.01)
*G06Q 10/06* (2012.01)

(52) U.S. Cl.
CPC .................................... *G06Q 10/06* (2013.01)
USPC .............................. 719/313; 705/39; 717/177

(58) Field of Classification Search
None
See application file for complete search history.

(56) References Cited

U.S. PATENT DOCUMENTS

| | | |
|---|---|---|
| 5,866,889 A | 2/1999 | Weiss |
| 6,021,397 A | 2/2000 | Jones et al. |
| 6,131,810 A | 10/2000 | Weiss |
| 6,199,077 B1 | 3/2001 | Inala |
| 6,278,993 B1 | 8/2001 | Kumar |
| 6,292,789 B1 | 9/2001 | Schutzer |
| 6,354,490 B1 | 3/2002 | Weiss |
| 6,412,073 B1 | 6/2002 | Rangan |
| 6,567,850 B1 | 5/2003 | Freishtat |
| 6,594,766 B2 | 7/2003 | Rangan |

(Continued)

OTHER PUBLICATIONS

International Search Report and Written Opinion from International application No. PCT/US11/58014, issued Feb. 27, 2012.

(Continued)

*Primary Examiner* — Tuan Dao
(74) *Attorney, Agent, or Firm* — Stroock & Stroock & Lavan, LLP

(57) ABSTRACT

An application processing engine computer system is configured to process an application for at least one of a product and service using a plurality of coordinated, configurable services. The application processing engine includes an application data management service, an application process flow management service, a decisioning service, an application processing host service, an application activity monitoring service, a queue management service and/or a system maintenance service. Various embodiments are described, including a computer implemented method for processing an application using an application processing engine component and/or module.

36 Claims, 29 Drawing Sheets

(56) References Cited

U.S. PATENT DOCUMENTS

| | | | |
|---|---|---|---|
| 6,633,910 B1 | 10/2003 | Rajan | |
| 6,725,425 B1 | 4/2004 | Rajan | |
| 6,802,042 B2 | 10/2004 | Rangan | |
| 6,859,212 B2 | 2/2005 | Kumar | |
| 6,865,680 B1 | 3/2005 | Wu | |
| 6,867,789 B1 | 3/2005 | Allen et al. | |
| 6,871,220 B1 | 3/2005 | Rajan | |
| 6,871,346 B1 | 3/2005 | Kumbalimutt et al. | |
| 6,886,025 B1 | 4/2005 | Britton | |
| 7,013,310 B2 | 3/2006 | Messing | |
| 7,085,997 B1 | 8/2006 | Wu | |
| 7,178,096 B2 | 2/2007 | Rangan | |
| 7,200,804 B1 | 4/2007 | Khavari | |
| 7,203,845 B2 | 4/2007 | Sokolic | |
| 7,225,464 B2 | 5/2007 | Satyavolu | |
| 7,313,813 B2 | 12/2007 | Rangan | |
| 7,321,874 B2 | 1/2008 | Dilip | |
| 7,321,875 B2 | 1/2008 | Dilip | |
| 7,383,223 B1 | 6/2008 | Dilip | |
| 7,424,520 B2 | 9/2008 | Daswani | |
| 7,505,937 B2 | 3/2009 | Dilip | |
| 7,536,340 B2 | 5/2009 | Dheer | |
| 7,571,140 B2 | 8/2009 | Weichert et al. | |
| 7,577,598 B2 | 8/2009 | Rousseau et al. | |
| 7,606,752 B2 | 10/2009 | Hazlehurst | |
| 7,644,023 B2 | 1/2010 | Kumar | |
| 7,657,761 B2 | 2/2010 | Sokolic | |
| 7,672,879 B1 | 3/2010 | Kumar | |
| 7,676,751 B2 | 3/2010 | Allen et al. | |
| 7,685,525 B2 | 3/2010 | Kumar | |
| 7,729,283 B2 | 6/2010 | Ferguson | |
| 7,734,541 B2 | 6/2010 | Kumar | |
| 7,797,207 B1 | 9/2010 | Dilip | |
| 7,856,386 B2 | 12/2010 | Hazlehurst | |
| 7,856,453 B2 | 12/2010 | Malik | |
| 7,873,677 B2 | 1/2011 | Messing | |
| 7,925,579 B1 | 4/2011 | Flaxman et al. | |
| 7,933,819 B2 | 4/2011 | Dumas et al. | |
| 8,095,923 B2 * | 1/2012 | Harvey et al. | 717/171 |
| 2001/0042785 A1 | 11/2001 | Walker et al. | |
| 2001/0044787 A1 * | 11/2001 | Shwartz et al. | 705/78 |
| 2002/0091635 A1 | 7/2002 | Dilip | |
| 2002/0156720 A1 | 10/2002 | Chow | |
| 2002/0165745 A1 | 11/2002 | Greene et al. | |
| 2002/0165993 A1 | 11/2002 | Kramer | |
| 2003/0069780 A1 | 4/2003 | Hailwood et al. | |
| 2003/0101131 A1 | 5/2003 | Warren | |
| 2003/0120593 A1 * | 6/2003 | Bansal et al. | 705/39 |
| 2003/0135457 A1 | 7/2003 | Stewart | |
| 2003/0158928 A1 | 8/2003 | Knox et al. | |
| 2003/0187741 A1 * | 10/2003 | Brown et al. | 705/14 |
| 2003/0208526 A1 | 11/2003 | Imanishi et al. | |
| 2003/0225692 A1 | 12/2003 | Bosch | |
| 2003/0236728 A1 | 12/2003 | Sunderji | |
| 2004/0015818 A1 | 1/2004 | McDonald et al. | |
| 2004/0019853 A1 | 1/2004 | Takizawa et al. | |
| 2004/0205414 A1 | 10/2004 | Roselli et al. | |
| 2004/0230417 A1 * | 11/2004 | Kraiss et al. | 704/8 |
| 2004/0230516 A1 | 11/2004 | Crosthwaite | |
| 2005/0018249 A1 | 1/2005 | Miura et al. | |
| 2005/0125442 A1 | 6/2005 | Oxman et al. | |
| 2005/0144101 A1 | 6/2005 | Khandros | |
| 2005/0171833 A1 | 8/2005 | Jost et al. | |
| 2005/0187809 A1 | 8/2005 | Falkenhainer | |
| 2005/0246269 A1 | 11/2005 | Smith | |
| 2005/0262453 A1 | 11/2005 | Massasso | |
| 2006/0036954 A1 | 2/2006 | Satyadas et al. | |
| 2006/0075334 A1 | 4/2006 | Sato | |
| 2006/0085796 A1 * | 4/2006 | Hoerle et al. | 719/313 |
| 2006/0116949 A1 | 6/2006 | Wehunt | |
| 2006/0143107 A1 | 6/2006 | Dumas et al. | |
| 2006/0195816 A1 | 8/2006 | Grandcolas et al. | |
| 2006/0230343 A1 | 10/2006 | Armandpour | |
| 2006/0253463 A1 | 11/2006 | Wu | |
| 2007/0022027 A1 | 1/2007 | Gupta et al. | |
| 2007/0061254 A1 | 3/2007 | Blunck | |
| 2007/0067239 A1 | 3/2007 | Dheer | |
| 2007/0089047 A1 | 4/2007 | Joshi | |
| 2007/0130347 A1 | 6/2007 | Rangan | |
| 2007/0180380 A1 | 8/2007 | Khavari | |
| 2007/0244816 A1 | 10/2007 | Patni | |
| 2007/0282627 A1 | 12/2007 | Greenstein et al. | |
| 2008/0080017 A1 | 4/2008 | Ishizuka et al. | |
| 2008/0082454 A1 | 4/2008 | Dilip | |
| 2008/0086403 A1 | 4/2008 | Dilip | |
| 2008/0086426 A1 | 4/2008 | Dilip | |
| 2008/0091591 A1 | 4/2008 | Egnatios | |
| 2008/0091593 A1 | 4/2008 | Egnatios | |
| 2008/0091600 A1 | 4/2008 | Egnatios | |
| 2008/0098030 A1 | 4/2008 | Edd et al. | |
| 2008/0177848 A1 | 7/2008 | Wakhlu | |
| 2008/0189185 A1 | 8/2008 | Matsuo | |
| 2008/0208737 A1 | 8/2008 | Dilip | |
| 2008/0262901 A1 | 10/2008 | Banga et al. | |
| 2008/0275816 A1 | 11/2008 | Hazlehurst | |
| 2008/0288376 A1 | 11/2008 | Panthaki | |
| 2008/0288400 A1 | 11/2008 | Panthaki | |
| 2008/0288861 A1 | 11/2008 | Jones et al. | |
| 2008/0301023 A1 | 12/2008 | Patel | |
| 2008/0306846 A1 | 12/2008 | Ferguson | |
| 2009/0006582 A1 | 1/2009 | Daswani | |
| 2009/0007098 A1 * | 1/2009 | Chevrette et al. | 717/177 |
| 2009/0024505 A1 | 1/2009 | Patel | |
| 2009/0030771 A1 | 1/2009 | Eder | |
| 2009/0048999 A1 | 2/2009 | Gupta et al. | |
| 2009/0083759 A1 * | 3/2009 | Keil et al. | 719/313 |
| 2009/0112753 A1 | 4/2009 | Gupta et al. | |
| 2009/0234466 A1 | 9/2009 | Kunze | |
| 2009/0265211 A1 * | 10/2009 | May et al. | 705/9 |
| 2009/0276359 A1 | 11/2009 | Panthaki | |
| 2010/0030687 A1 | 2/2010 | Panthaki | |
| 2010/0063896 A1 | 3/2010 | Rose | |
| 2010/0094878 A1 | 4/2010 | Soroca et al. | |
| 2010/0121677 A1 | 5/2010 | An et al. | |
| 2010/0205065 A1 | 8/2010 | Kumar | |
| 2010/0205079 A1 | 8/2010 | Ferguson | |
| 2010/0217662 A1 | 8/2010 | Ramer et al. | |
| 2010/0293447 A1 | 11/2010 | Kadowaki et al. | |
| 2010/0299286 A1 | 11/2010 | Dilip | |
| 2011/0029491 A1 | 2/2011 | Joshi et al. | |

OTHER PUBLICATIONS

International Search Report and Written Opinion from International application No. PCT/US11/55767, issued Mar. 7, 2012.
International Search Report and Written Opinion from International application No. PCT/US11/056839; issued Mar. 8, 2012.
International Search Report and Written Opinion from International application No. PCT/US11/37143, issued Sep. 21, 2011.
International Search Report and Written Opinion from International application No. PCT/US12/22022, issued May 8, 2012.
International Preliminary Report on Patentability from International application No. PCT/US11/55767, issued Oct. 18, 2012.

* cited by examiner

COMPUTER ARCHITECTURE AND PROCESS FOR APPLICATION PROCESSING ENGINE

RELATED APPLICATIONS

This application claims the benefit of, and priority to, the following applications: U.S. Provisional Application No. 61/391,815, filed Oct. 11, 2010, entitled "Computer Architecture and Process for Application Processing Engine"; U.S. Provisional Application No. 61/405,398, filed Oct. 21, 2010, entitled "Account Opening Metrics"; U.S. Provisional Application No. 61/407,210, filed Oct. 27, 2010, entitled "Integrated Customer Communications Module (ICCM)"; and U.S. Provisional Application No. 61/435,000, filed Jan. 21, 2011, entitled "Account Opening Flow Configuration: Navigation Interceptor and Portlet Wiring." This application is related to International Application No. PCT/US2011/037143, filed May 19, 2011, entitled "Account Opening Computer System Architecture and Process for Implementing Same." Each of the above applications is incorporated herein by reference in its entirety.

BACKGROUND

Emerging systems and methods lack straight through computer processing for a variety of technological and/or computer driven processes to support both flexibility and global consistency, to standardize processes for an enhanced customer experience, and to reduce the need for IT support and other development resources. We have determined, however, that an organization's global footprint, economies of scale, and local expertise can all be leveraged for the benefit of computer service and/or resource users globally.

We have developed an application processing engine, supporting a variety of application processing services within an computer system.

SUMMARY

An application processing engine computer system, includes at least one computer database; and an application processing computer in communication with said at least one database, where the application processing computer is configured to process an application for at least one of a product and service using a plurality of coordinated, configurable services.

In some embodiments, the application processing computer includes an application data management service receiving and updating application data based on front end data from a front end application, internal data from an internal database, and external data from an external database.

In some embodiments, the application processing computer includes an application process flow management service generating an application record and executing at least one macro service. In some embodiments, the application processing computer includes a decisioning service determining a decision for the application based on the application data and/or an application processing host service retrieving the internal data and the external data, and processing instructions responsive to predetermined and configurable service rules to complete the application process.

In some embodiments, the application processing computer includes an application activity monitoring service monitoring application processing activity and providing activity data and metrics and/or a queue management service managing applications that are pending and unable to be processed via straight through processing of the application. In some embodiments, the application processing computer includes a system maintenance service supporting communications, application archiving, application aging, and application expiry processes, and restarting of pending applications based on user configurable criteria.

In some embodiments, a front end application comprises a user configurable front end user interface that is decoupled from the underlying application process provided by the application processing engine. In some embodiments, the application processing computer is configured to receive reference data and product data for the at least one of the product and service from an enterprise standard reference repository. In some embodiments, the application processing computer is configured to communicate with a customer data management system to generate a customer record or retrieve information from an existing customer record stored in at least one customer data management database.

In some embodiments, the application processing computer is configured to use a decoupled process to invoke an integrated customer communications module to provide one or more communications to a user based on user configurable criteria including business process, product group, product code, and user role, responsive to a call from the front end application or the application process flow management service. In some embodiments, the application processing computer is configured to communicate with at least one third party validation system to validate the identity of an applicant associated with the at least one of the product and service.

In some embodiments, the application processing computer is configured to communicate with a decision engine supporting the decisioning service. In some embodiments, the external database is a credit bureau database and/or a blacklist database. In some embodiments, the application processing computer is configured to communicate with a sales services system to track contacts with the user. In some embodiments, the application processing computer is configured to communicate with said front end application and a payment processing engine to execute one or more account funding instructions. In some embodiments, the application processing computer is configured to board an account to at least one product and service system.

In some embodiments, the application processing computer is configured to provide a product application data extract, a product applicant data extract, a transaction log, a product configuration data extract, a to-do data extract, and/or a queue management system data extract to a computer intelligence system. In some embodiments, the application processing computer is configured to generate work items in a queue management system based on predetermined rules of process errors and reason codes. In some embodiments, the reason codes include a priority associated with the work item and/or are unique for a given combination of entity, service ID, and sub-service ID.

In some embodiments, the application processing computer is configured to log all activity related to the application and maintain the state of the application and products within the application. In some embodiments, the application processing computer is configured to determine and configure whether a product option is at a product level or applicant level, and associate the product option with at least one of a configuration ID, a customer segment, and a business line.

In some embodiments, a front end application presents the product option responsive to at least one of the configuration ID and a user role. In some embodiments, the application processing engine receives from the front end application an Accept Offer and/or Decline Offer message to the resulting in a status change for the user for the at least one product and service, and invoking one or more downstream processes. In some embodiments, the application processing computer is configured to accept predetermined application data and preferred contact mode, generate a retrieval code based upon a code generation request type and/or save the retrieval code and the preferred contact mode to said at least one database.

In some embodiments, the application processing computer is configured to retrieve the previously saved application data from said at least one database, responsive to receiving the predetermined application data and the retrieval code, provided, for example, that the application has not reached a user configurable point in time for archival. In some embodiments, the application processing computer is configured to receive an application ID, an applicant ID, and a product tracker ID; insert an event type into an event tracker table indicating that gather application data is completed for the at least one of the product and service; and/or update a product status to accept when the product status is approved, gather application data is completed, and/or there are no to-do items pending.

In some embodiments, the application processing computer is configured to capture events that occurred in the application at a service level, the events comprising one or more of: application status changed, product status changed, validate identity status changed, user gather application data started, accept terms and conditions, accept product offer, user gather application data complete, decision status changed, user journey complete, product replaced-upsell/downsell, and/or sent final activity communication. In some embodiments, the application processing computer is configured to generate configurable to-do items at an applicant level, a product level, an applicant level and/or a product level for different user roles. In some embodiments, at least one macro service calls a sub service responsive to the configurable service rules.

In some embodiments, a computer implemented method for processing an application for at least one of a product and service, includes receiving and updating application data based on front end data from a front end application, internal data from an internal database, and external data from an external database. In some embodiments, the method includes generating an application record and executing at least one macro service; determining a decision for the application based on the application data; processing instructions responsive to predetermined and configurable service rules to complete the application process; and/or monitoring application processing activity and providing activity data and metrics. In some embodiments, the method includes managing applications that are pending and unable to be processed via straight through processing of the application; and/or supporting communications, application archiving, application aging, and application expiry processes, and restarting of pending applications based on user configurable criteria.

In some embodiments, the method includes decoupling a user configurable front end user interface of the front end application from the underlying application process provided by the application processing engine. In some embodiments, the method includes receiving by the application processing computer reference data and product data for the at least one of the product and service from an enterprise standard reference repository. In some embodiments, the method includes communicating by the application processing computer with a customer data management system to generate a customer record or retrieve information from an existing customer record stored in at least one customer data management database.

In some embodiments, the method includes invoking an integrated customer communications module by the application processing computer using a decoupled process to provide one or more communications to a user based on user configurable criteria including business process, product group, product code, and user role, responsive to a call from the front end application or the application process flow management service. In some embodiments, the method includes communicating by the application processing computer with said front end application and a payment processing engine to execute one or more account funding instructions. In some embodiments, the method includes generating by the application processing computer work items based on predetermined rules of work item processing codes unique for a given combination of entity, service ID, and sub-service ID including a priority associated with the work item.

In some embodiments, the method includes determining by the application processing computer whether a product option is at a product level or applicant level, and associate the product option with at least one of a configuration ID, a customer segment, and a business line. In some embodiments, the method includes saving by the application processing computer the application data to said at least one database. In some embodiments, the saving comprises accepting predetermined application data and preferred contact mode, generating a retrieval code based upon a code generation request type, and/or saving the retrieval code and the preferred contact mode to said at least one database.

In some embodiments, the method includes retrieving the previously saved application data from said at least one database, responsive to receiving the predetermined application data and the retrieval code, provided that the application has not reached a user configurable point in time for archival. In some embodiments, the method includes receiving an application ID, an applicant ID, and a product tracker ID; inserting an event type into an event tracker table indicating that gather application data is completed for the at least one of the product and service; and/or updating a product status to accept when the product status is approved, gather application data is completed, and there are no to-do items pending.

BRIEF DESCRIPTION OF THE DRAWINGS

FIG. 16 shows direct deposit cash/check as funding method.

FIG. 17 shows direct deposit internal transfer as funding method.

FIG. 18 shows time deposit cash/check as funding method.

FIG. 19 shows time deposit internal transfer as funding method.

DETAILED DESCRIPTION

The One HSBC Application Processing Engine (OH APe) product suite provides a common application processing engine for processing customer information from both internal and external sources and analyzing the data to arrive at a set of decisions that offer the customer the right options suited to their needs.

In various embodiments, OH APe is characterized in that is parameter driven and providing processing through service orientation; can be launched from a wide variety of customer channels; and/or adheres to principles of Straight Through Processing (STP) with limited human intervention.

In one or more embodiments, OH APe provides for: shielding of functional Service Consumers, like the browser, using standard defined contracts, which are termed Macro Services; providing of data transformations, service invocation logging, and execution results; integration with back end systems to fulfill requests from Service Consumers; informing Service Consumers of results for real-time requests; and/or providing of information to the necessary reporting platforms.

In various embodiments, OH APe may include one or more of the following functional components: (1) Application Data Management, which provides the functions necessary to gather, save, retrieve and update application data based on validated information collected from internal and external sources; (2) Application Process Flow Management, which provides the functions necessary to create the application, fulfill Macro Services that are explicitly requested by the Service Consumer, determine the next steps within the scope of the macro service, all in collaborative effort to complete the application and track status of the application; (3) Decisioning Services, which provides the functions necessary to execute the appropriate decision via a Decision Engine for the application based on captured data; (4) Application Processing Host Services, such as Internal Host Services, which provides the ability to enable calls to internal host systems to gather additional data or to send data in order to complete the application process and/or External Host Services, which provides the ability to enable calls to external or third party systems to gather additional data and processing instructions to complete, (5) Business Activity Monitoring, which provides the functions necessary to furnish system activity as required by Business Intelligence (BI); (6) Non STP Processing/Queue Management, which provides the functions necessary to manage pending applications due to a break in the straight through processing of the application; and (7) System Maintenance, which provides the ability to run the process in a batch mode to support communications, archival processes, and the restarting of pending applications based on business configurable criteria.

Figure 1:
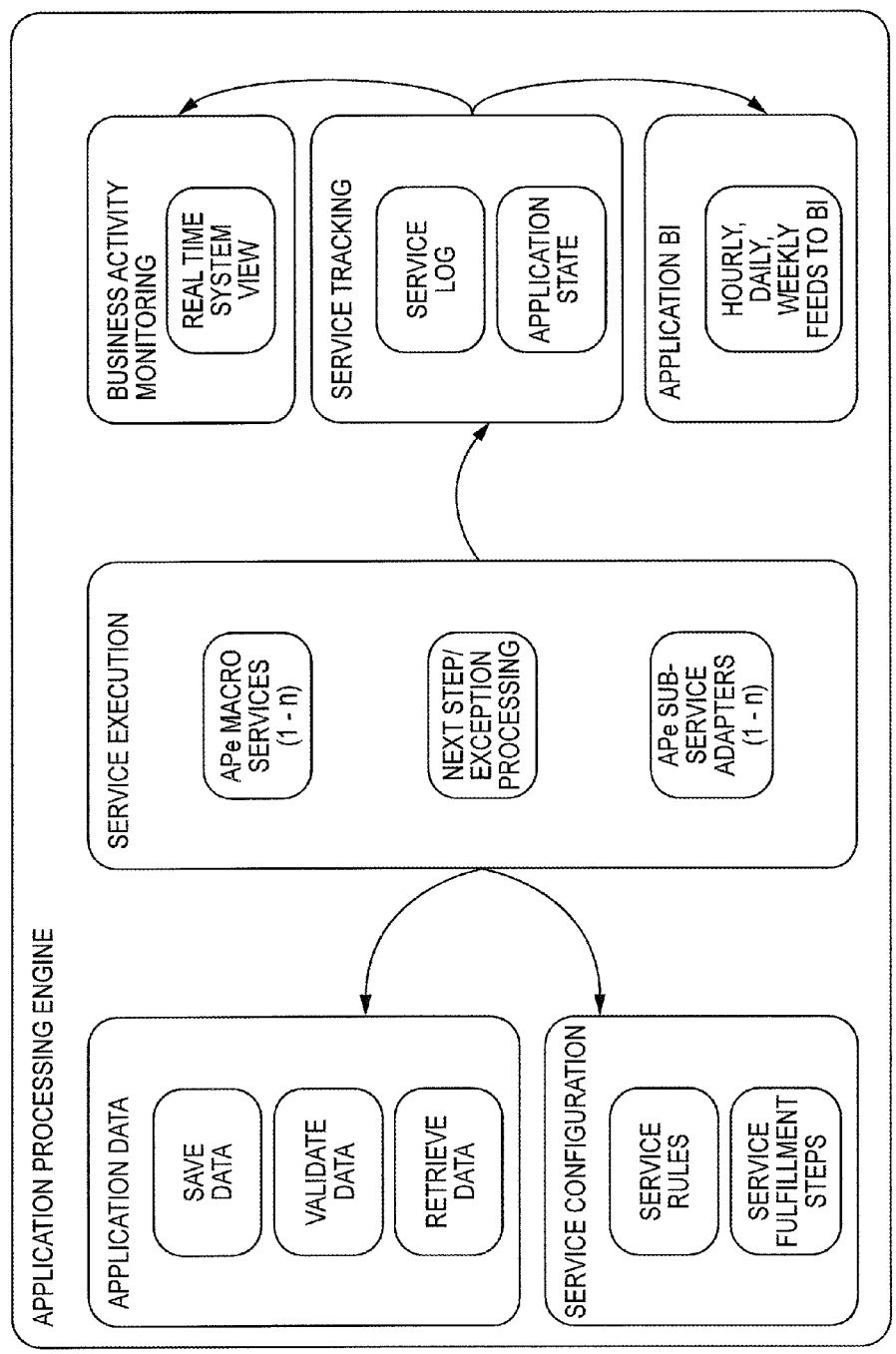
FIG. 1 shows a logical diagram of an Application Processing Engine, according to some embodiments of the invention.

FIG. 1 shows an exemplary logical diagram of OH APe. Descriptions of the logical components, according to some embodiments.

TABLE 1

| Logical Component | Description |
| --- | --- |
| Service Execution | APe will expose numerous Macro Business Services required to open an account. These Macro Services will be the entry point into APe, they will have access to Save and Retrieve Application Data, and they will execute the Macro Service via any number of Sub-Services per the Service Configuration tables. |
| Service Configuration | Includes Service Rules that define the entry criteria for a Macro Service. Enables multiple execution paths for different Macro Services, application types and conditions. |
| Service Tracking | Includes the logging of all activity related to the application, and maintains the state of the application and products within the application. |
| Application Data | The data that is either entered by the customer or the system as a result of completing an account opening process. The data is similar to what would be entered onto a paper-application form. |
| Application BI and Business Activity Monitoring (BAM) | Application BI will be generated via regular feeds from the Service Tracking tables. BAM will provide the ability to understand what is happening within the AO System - including the ability to retrieve statistics on the number of in-flight applications, saved applications, etc. |
| System Maintenance | Provides the functions necessary for general system housekeeping and administration. Provides application archiving, aging, expiry logic. |

Figure 2:
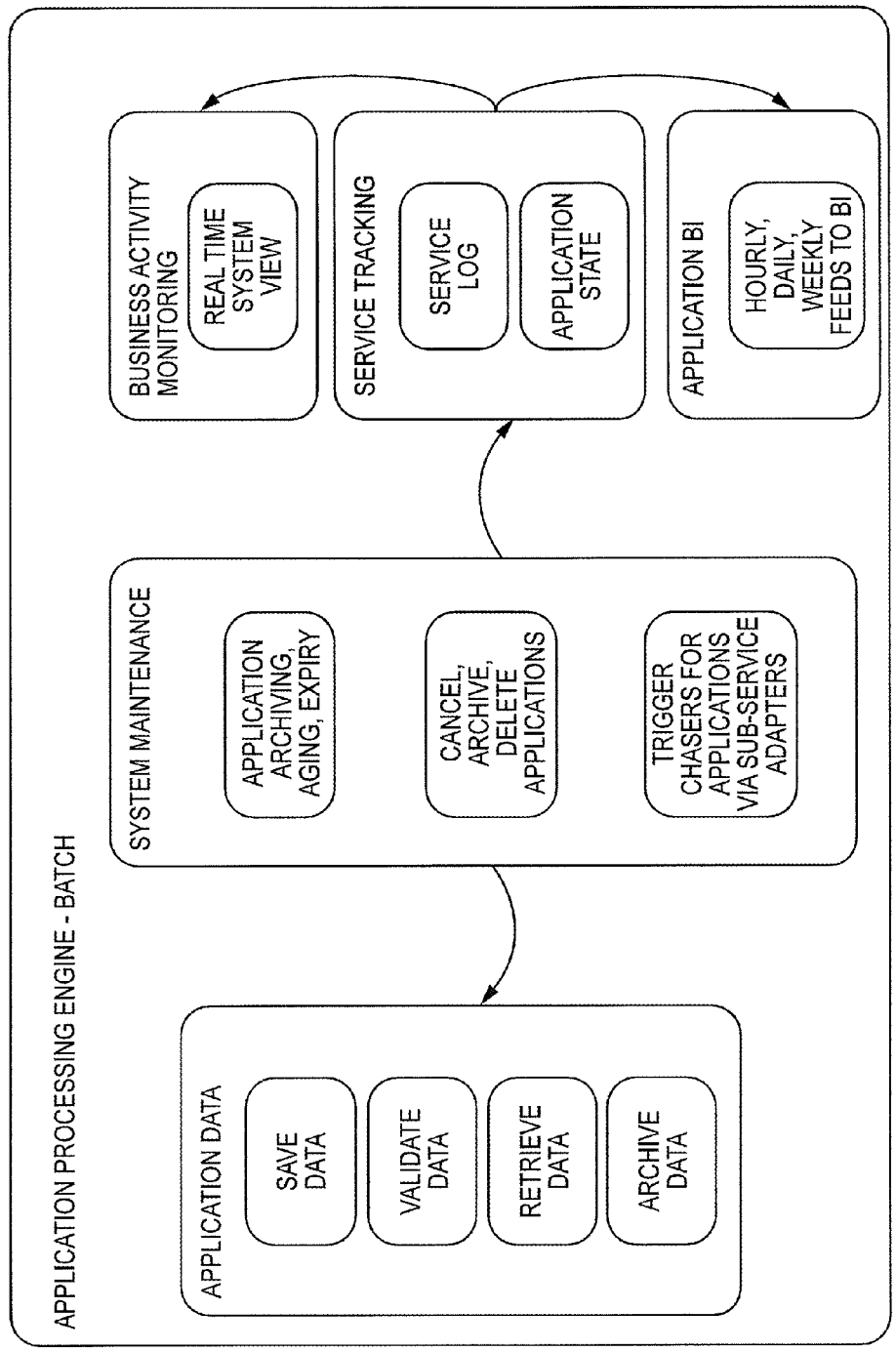
FIG. 2 shows exemplary logical functions for a batch process, which identifies applications pending for an extended period and triggers entity required activities.

If an application is resident within OH APe for an extended period or an application is at a persistent pending state a batch process may identify the applications and trigger entity required activities. These can include prompts to workflow or calls to a communications system. The logical functions for this batch operation are shown in FIG. 2.

The Application Processing Engine (APe) or Common Processing Service (CPS) is an instance of a Composite Service that implements the Account Opening business process. The Composite Service works in conjunction with a front-end (FE) orchestration framework to provide support for business process orchestration, the FE providing the Human Interaction elements of the business flow and APe implementing the systematic elements of the business process as well as providing the state management of the overall process. The front-end user journey will be decoupled from the underlying business process provided by APe. The content and fields as well as the flow of the pages presented by the FE are configurable and align with the APe configuration. The front-end can call APe, for example, using predefined service contracts.

During interactions with the APe, the FE can save the state of the human interaction. Once a journey has been started for a given application, APe will retain the state and if the process is resumed in another channel, the framework can pick up where the customer left off. In some embodiments, applications are explicitly saved each time APe is called. APe allows for applications to be retrieved using specified application data. APe also permits a search operation to be performed to search for existing applications to continue the application process. Thus APe allows for suspending applications and restarting at a later point. APe has no dependency on the interface channel.

APe can manage the Account Opening process from the initiation of an application through boarding of the account and in some instances post-boarding processes such as funding an account. Thus, throughout the account opening lifecycle, APe maintains the state of the application, the state of the AO process, and metrics that may be fed to a Business Intelligence (BI) system. APe can, for example, provide tracking of processes and view of all application statuses. In addition, daily BI extracts may be provided to track historic activity.

APe determines the Macro Business Service operations required to open an account, and executes any number of sub-services to fulfill each Macro Service operation. As used herein, a macro service is an entry point into OH APe. These are Business Services that are explicitly invoked by the consumer as part of the fulfilment of the AO business process that is in play. Micro (sub) services are Business Services contained within OH APe's Macro Business Services, which include configurable execution paths tracked by OH APe.

Each macro service operation call will consult predetermined service rules to then call the sub services required. The actions (sub services) of an APe macro service operation are configurable by the entity. In some embodiments, APe may be delivered with sub services for core interfaces (e.g., Customer Data Management). Each entity can author their own sub services.

APe is preferably the system of record for the application data, and knows the status and steps involved in processing the application. Macro service operations store any passed data in the application data store, maintaining the system of record. In some embodiments, APe may duplicate data at point of application from other systems in order to maintain an enduring application system of record. Preferably, the flow of the business process is configurable and aligns with the FE configuration.

In some embodiments, APe is a mainframe application written in CICS/COBOL (Customer Information Control System/COmmon Business-Oriented Language). Service operations into APe utilize R2DS for COBOL infrastructure on the mainframe (preferably following Global Sales Services standards). Database storage may be through standard DB2 on the mainframe.

Each sub-service operation is preferably a separate COBOL program. Each program will call an external service operation to fulfill a necessary macro service operation. For example, for the "Retrieve IP details" call for existing customers, the relevant macro service will be called by the instantiating application (e.g., the web front-end). The service controller will then call the sub-service that constructs the appropriate CDM service operation call to retrieve the details as the given service operation dictates. The sub-service will then store the data into the application data store and this data will then be passed back to the macro service operation which will then fulfill its service contract to the calling application.

Application Data Management

Get/Save. In some embodiments, OH APe's Business services, such as Get/Save Applicant Personal Details, Get/Save Applicant Contact Details, and Get/Save Applicant Employment Details, support the front end-driven functionalities that sustain Gather Application Data requirements. Applicant data is gathered, saved, retrieved or updated by the Front End (FE) or other internal and external sources and passed to OH APe. OH APe can return data, once saved in its database, to the FE or other external source where the data is needed to progress the application.

In some embodiments, explicit saves by the user or customer are provided on the Front End, however implicit saves are triggered at the end of each screen. The save requests are from the Front End to OH APe, and OH APe simply reacts to the various save requests.

Additional messages may be used for the FE-to-OH APe Commercial Banking (CMB) applicant data capture during the "initiating applicant" journey, such as Save Business Demographics, Get Business Demographics, Save Business Contact Details, Get Business Contact Details, Save Business Financial Details, Get Business Financial Details, and/or Save Business Application Details (e.g., relationship manager details for the company).

In some embodiments, OH APe's Save and Get Options is used to track Personal Financial Service (PFS) fulfilment-related instructions, whereas Save and Get Business Options would be used for the CMB version of the same. The system has the ability to determine or configure whether a product option is at a product level or applicant level. In a multi-product scenario, the system is able to pre-fill the values for the current product based on the previous products' options inputs of the same application, by means of information within these messages.

Each product option is preferably configurable to be a product level option or applicant level option. FE can set a flag in the Save Options message, based on the configuration defined for each option. The following exemplary option definitions may apply in a PFS context:

B=Both (Applicant and Product level), chosen by every applicant for each product, Example: E-Statement, in multi-product, multi-applicant scenario, applicant 1 selects saving=yes, checking=no. Applicant 2 selects saving=no, checking=yes.

P=Product, all applicants get same value for same option chosen by the primary applicant. Example: Primary applicant defines check book order and this information applies to all applicants.

A=Applicant, all applicants have to configure a product option once for all products. Example: applicant 1 configures Internet Banking once in a lifetime and this information is saved in the customer profile.

Preferably, the FE will display the option for the first product and save this to OH APe. When the applicant moves on to configuring a second product, AO FE will trigger the Get Options message, which allows FE to hide a product option because the information is available as to whether or not it had already been configured for the prior product. When FE fires a save for the second product, the FE will signal OH APe not to overwrite the previous value in the applicant option.

In the CMB context, only the initiator is expected to have access to Product Configuration, and the applicant-level options such as Business Internet Banking and Phone Banking will be offered at the company level (in this sense, the company is treated as an applicant). In certain embodiments, there are no individual-level options offered to co-applicants during CMB journeys.

OH APe's Process Validation Applicant Status is used to set the applicant's validation status. OH APe's Process Applicant Service provides the facility to create or update customer data in the customer data management system.

Product Offer. In some embodiments, Product Offer consists of recording in OH APe the applicant's decision to accept or decline the presented product's set of features, attributes, and eligible options. That applicant decision is transmitted to OH APe in a decision-specific message resulting in a status change for that applicant for that product. Depending on the applicant decision, either an Accept Offer message or Decline Offer message will be transmitted from the Front End to OH APe. This status change may trigger other downstream processes such as sending of communications and updating the customer data management system of the Terms and Conditions (T&C) acceptance or updating of contact history.

Delete Product/Cancel Product. Preferably, a staff or customer can delete product(s) from an application during the AO flow. This is supported by OH APe via a message to be sent from the FE, which may, for example, be provided via a button against each product on the Decisioning page. This is preferably applicable to a multi product journey only. In some embodiments, the user will not be able to delete a product if it is the only one left on the application, nor system will allow deletion once the AcceptOffer macro has been triggered by FE. The deletion event and associated attributes will be logged to BI.

Multiple Applicants. In case of a multi applicant scenario, the primary applicant can select to have more than one applicant for a given product. Preferably, the primary applicant provides a few basic details for the additional applicants, and then the additional applicants can retrieve the application and complete their journey. Each co-applicant will preferably see his/her own details only. In the case of CMB, corporate details such as Business Financial and Business Demographic details are preferably not visible to co-applicants.

In some embodiments, the application ID is presented on the summary page, and is the same application ID for all applicants. The application summary page for each applicant (initiating applicant or additional applicant) preferably shows only the products and data applicable to that applicant. In certain embodiments, additional applicants cannot configure product level options. The summary page may also display the 'Continue with Next Applicant' link if there is any additional applicant who has not started his journey.

On the application summary page, FE will call the OH APe Get Application Summary service to check if there is an additional applicant who has not started his journey. OH APe will provide the status for each applicant as a part of this service. Typical values of statuses are "Started", "In Progress" and "Completed". For example, when an additional applicant is added by the initiating applicant, the applicant-level product status for the additional applicant will be "Started". Once the additional applicant retrieves the application and continues with the journey, the status becomes "In Progress". When the joint or additional applicant invokes the Open Account macro, the status becomes "Completed". FE will look for the "Started" status to display the 'Continue with Next Applicant' link.

If more than one applicant has not started their journey, a drop-down box may be displayed, for example, with the first and last names of the additional applicants, and the 'Continue with Next Applicant' link next to the drop-down. Once the user clicks on the 'Continue with Next Applicant' link, FE will clear all the applicant data that belongs to the initiating applicant specific data from the front-end session such that the data of the initiating applicant will not be accessible by the additional applicant(s). FE will replace the current applicant's applicant ID with the selected joint applicant's ID when the joint applicant journey starts.

FE will invoke Get Application Summary to fetch the additional applicant details (e.g., First Name, Last Name, Product Code and Currency) and display the information on the 'Joint Application Retrieved' page. On the Joint Application Retrieved page, the user may be asked the question as to whether the customer is new or existing. In some embodiments, the secondary applicant will proceed according to what is described in connection with the Save and Retrieve functions.

In some embodiments, Staff will perform local verification to identify whether the applicant is a new or existing customer. Staff will then select on the Joint Application Retrieved page to indicate this information, that is, if new or existing. If the staff has selected 'New Customer', the essential data entered by the initiating applicant is preferably pre-filled by retrieving the data from OH APe through the joint's applicant ID. The pre-filled data will be made non-editable. If the staff has selected 'Existing Customer', on the same screen a text field will be displayed to prompt the staff for the 'CIN' (Customer Identification Number) of the joint applicant. The CIN will be copied manually to the AO screen from the local customer search function. Once the CIN is captured, FE will send the CIN to OH APe through the Update Applicant service. OH APe will perform data comparison between the information entered by the primary and the existing customer record. If the data matches, FE will retrieve the customer profile from OH APe through 'Get' services. Pre-filled profile data that is retrieved from OH APe may be made non-editable.

Exemplary single search fields include: Application ID, CIN, email, and in the case of CMB, business name, and business registration number as well. Exemplary combination fields include: first name and last name, ID type and ID number, and finally, first name, last name, email and DOB. In some embodiments, wildcard search is available in certain fields, for example: first name, last name, email address and business name.

If there is a mismatch between what the initiating applicant has entered for the joint versus what the existing joint profile has, an error message may be sent back from OH APe to FE. FE will display the appropriate message accordingly. If the search matches are successful, FE will retrieve the customer profile from OH APe through 'Get' services.

The Customer Channel flow is, for example, similar to the Staff Channel flow, except that when the applicant selects 'Existing Customer with PIB', FE will redirect the user to PIB login screen. After the applicant has logged in, he will be redirected back to AO with the CIN as input parameter to AO. On the application summary screen of the initiating applicant, there will be a link that will redirect the initiating applicant to a screen that allows him to amend the additional applicant's essential data. FE will use a get/save applicant details message to pre-fill the screen and will save the data to OH APe.

To configure at the product level whether additional parties are required to accept T&Cs, AO preferably utilizes the information in, for example, Enterprise Standard Reference (ESR), incorporated herein by reference. ESR has a service which returns product level T&C details. A flag in this service can determine whether this T&C requires the acceptance of additional applicants or not. FE will determine based on this parameter whether or not to show the T&C for the non primary applicant or not. FE will pass the parameter to OH APe as part of the Accept T&C message.

In some embodiments, additional non primary applicants on the Credit Card product are not considered 'additional applicants' that would be subject to some processes that would exist for non primary parties in a multi party application. The rationale for this is that the product itself is considered a sole product. Hence, additional cardholders are referred to as 'supplementary' cardholders. In order to use AO for the supplemental cardholder journey when there is already an existing cardholder, AO can leverage the concept of the 'one-click-buy' journey. This 'one-click-buy' journey can be configured by the local entity. For the one-click-buy journey, a specific product code can be used to indicate that the journey is for adding supplementary cardholder onto existing card products. Multiple OH APe macros will be used to save the Front End default data to OH APe, including Process Applicant, Accept T&C, Accept Offer, Save Options, Open Account, etc., as accordingly configured.

Save and Retrieve. Preferably, explicit application save is available to both authenticated and unauthenticated applicants at pages where the a save button is present, and an implicit save is performed in the transition from one page to another. In some embodiments, the entry of certain essential data (e.g., last name, first name, date of birth, email address) by the applicant is mandatory for the unauthenticated applicant's application to be saved; FE will ensure this data is collected. The term used for these minimum fields is "Essential Data". This essential data is configurable by the group entity implementing the service. The essential data may be a combination of any of the core fields as defined by the entity, but in some embodiments it includes first name, last name, date of birth and email address.

In some embodiments, when an application is saved, the expiration of that application is reset. For example, if the expiration is configured to be 30 days and after 10 of those days the user retrieves and then saves the application again, the expiration will be changed from 20 days back to 30 days. This ability to extend the expiry period is entity-configurable at the product level. The OH APe batch process for sending follow-up letters and performing the process for cancelling an application will compare against the last updated timestamp on a given application.

When save is activated/pressed, the FE can call OH APe to determine available contact channels via Get Applicant Contact Details service. If only one is available no action will be taken. If e-mail and mobile phone are available then a new page will be displayed asking the customer to select their preference. An update message will be sent to OH APe. In this scenario a retrieval code is generated within OH APe and then communicated to an end user to identify an incomplete application for their future visits to AO.

OH APe's Save Application Service may include an option indicator based on which OH APe can decide how to proceed. This service will accept the essential data and preferred contact and generate/regenerate the retrieval code based upon the code generation request type. It may also store the retrieval code details and/or preferred mode of contact into the OH APe database.

In some embodiments, OH APe will determine if the applicant has PIB credentials from the customer management system. If they do, a retrieval code will not be generated and a message will be output directing them to log into Internet Banking when they want to retrieve their application.

If the existence of PIB credentials cannot be determined the following two calling options may apply:

G—Based on this value, OH APe will check if the retrieval code is already present. If it is not present, OH APe will generate a new retrieval code and call Integrated Customer Communications Module (ICCM) service to send it to preferred dispatch mode. If the retrieval code is already present, OH APe will pick up the previously generated code and call the ICCM service to send it to the preferred dispatch mode. If the applicant has multiple applications, the retrieval code is preferably applicable for all applications as long as they can be matched using essential data.

R—Based on this value, APe will generate a new retrieval code and override the previously generated code and call ICCM service to send it to preferred dispatch mode. This option may be used for the "Lost My Code" function, as further explained below.

Regardless of option selected, the retrieval code is preferably generated for each applicant on a given application, and the new retrieval code service will be called the first time an unauthenticated applicant presses save. If option is 'Generate' and if the retrieval code is already present, the retrieval code will not be regenerated. In the case of the 'Regenerate' option, the retrieval code will be generated.

In some embodiments, the Retrieval Code is, for example, a random number generated by OH APe via a macro sub service, Generate Retrieval Code, using a random number generation program. The Random Number may be generated, for example, using COBOL Random Number generation program.

Figure 3:
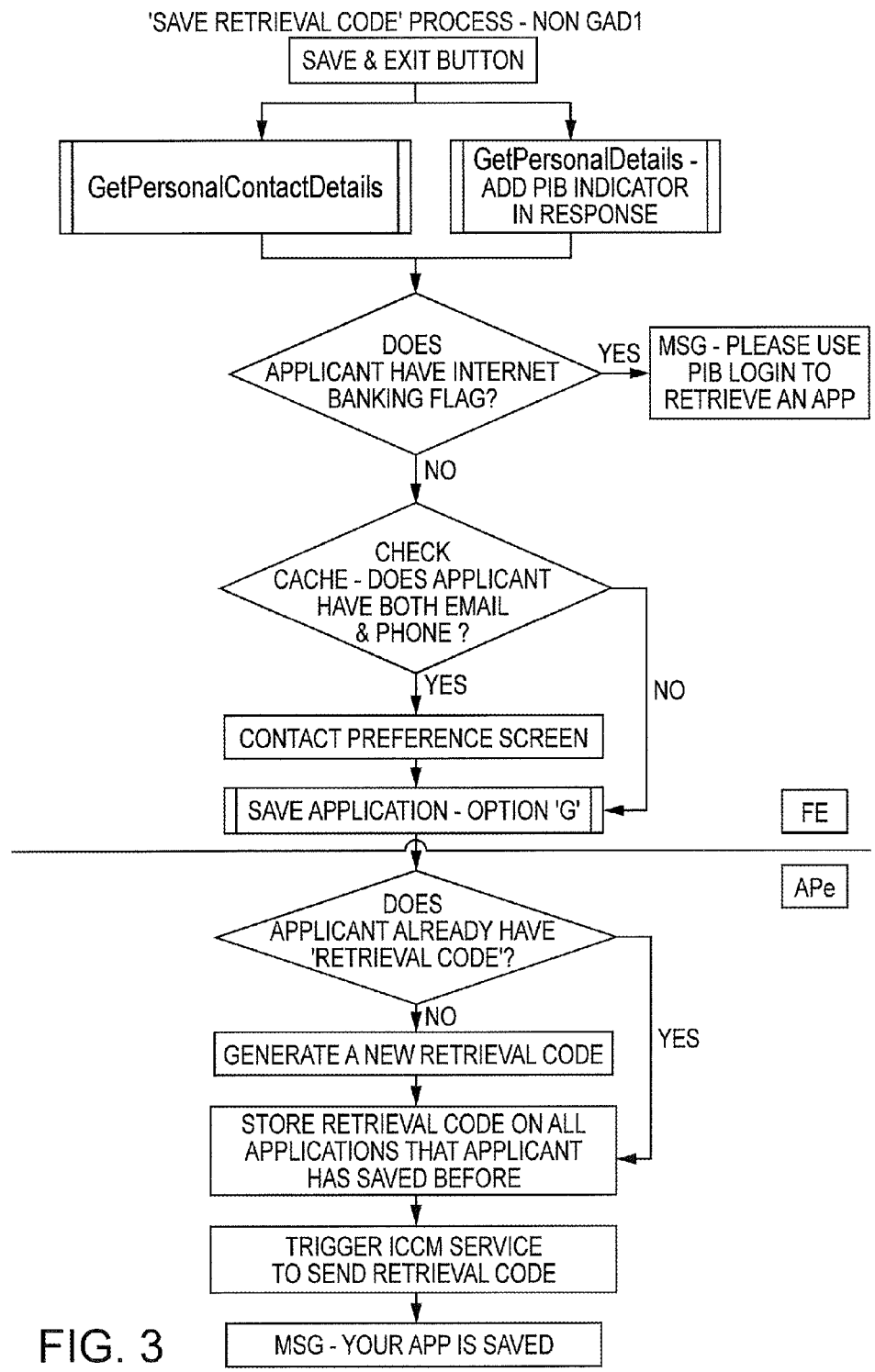
FIG. 3 is a diagram illustrating an exemplary Save Retrieval Code process.

Select exemplary Retrieval Code (RC) Scenarios are listed below:

1. Save & Exit—New Application, No Existing Apps: 4 key fields (Fname, Lname, DOB, email address) will be present, use these to generate retrieval
2. Save & Exit—New Application saved once, RC is already generated: User retrieves the same application, updates an app and clicks 'Save & Exit' button again without completing it; no new retrieval code will be generated, no comms will be sent
3. Save & Exit—New Application, 1 Existing Active App with Retrieval Code: The existing retrieval code from existing app will be applied to the new application; no comms will be sent
4. Save & Exit—New Application, 1 Existing App without Retrieval Code: New retrieval code generated and applied to all applications; a single new comms sent to applicant
5. Save & Exit—New Application, 1 Existing Inactive Application with Retrieval Code: New retrieval code generated and applied to all applications; a single new comms sent to applicant 6 Save & Exit—No existing apps: Applicant takes New application and closes the browser without clicking 'Save & Exit'; 'Generate RC' service is not triggered, no retrieval code will be generated, no comms will be sent 7 Save & Exit—1 Existing App with Retrieval code, Applicant takes another application and closes the browser without clicking 'Save & Exit': 'Generate RC' service is not triggered, no retrieval code will be generated, no comms will be sent 8 User Returns—Clicks 'Lost My Code': New retrieval code generated and applied to all applications; a single new comms sent to applicant 9 User requests staff to reissue a new retrieval code, Staff Clicks 'Lost my Code': New retrieval code generated and applied to all applications; a single new comms sent to applicant 10 Primary Applicant Adds Secondary Applicant, having No Existing Apps: RC will be generated and communicated to Secondary Applicant 11 Primary Applicant Adds Secondary Applicant, having Existing Active App with Retrieval Code (Active app=status is not any of the following: boarded, declined, denied, canceled): No new retrieval code will be generated, no comms will be sent A schematic of the 'Save Retrieval Code' process is shown in FIG. 3.

For unauthenticated users, a "Lost My Code" button may be added to the Search Application page to regenerate and reissue the retrieval code. If selected it will call a new page where the minimum data required for regenerating the retrieval code should be submitted. FE will use the same service Generate Retrieval Code with option 'R'. In this scenario, communications will be issued in real time.

In some embodiments, when selecting this option the following occurs: The previous retrieval code is invalidated (a communication is issued to the same email address/mobile phone number as the previous communication); the "retrieval code issued counter" will increment by 1; the "retrieval code issued counter" will be reset to 1 if the re-issue is initiated by staff, after which the applicant may request up to 2 re-issues online; and the "incorrect access count" is set to 0 (this may apply to staff channel only). The user will then be allowed to attempt the retrieve process again.

The maximum number of retrieval codes that an applicant may request without staff assistance is entity-configurable. In some embodiments, the default maximum number of retrieval codes that an applicant may request without staff assistance is 3 (e.g., 1 when the application is saved for the first time, with up to 2 re-issues if requested). Once the maximum number of reissuance has been reached, the customer should contact the bank for a new retrieval code to be generated in the staff channel.

OH APe may define one or more of the following exemplary counters at the "application ID+applicant ID" level:

1 DOSI_Counter_1—It will keep track of number of attempts to match DOB. If it exceeds the configured MAX limit an applicant will be 'Soft' locked. Within 'Soft'lock state, an applicant is allowed to make further login attempts after configurable time limit.

2 DOSI_Counter 2—It will keep track of number of attempts to match DOB. If it exceeds the configured MAX limit, an 'OLR Lock' will be set on an applicant. Within 'OLR Lock' state, an applicant is allowed to make log in attempts, but he/she is not allowed to reset retrieval code using the 'Lost My Code' function. In 'OLR Lock' status, an applicant should contact 'customer service' to reset the retrieval code.

3 Invalid Access Counter—It will keep track of number of invalid retrieval code matching attempts. If this counter exceeds the maximum limit, an applicant would be 'Hard' locked. Within 'Hard Lock' status, an applicant is not allowed to reset their retrieval code.

4 Retrieval code issued counter—It will keep track of number of times retrieval code is reissued. If this counter exceeds the maximum limit, an applicant would be 'Hard' locked.

Preferably, the "incorrect access count" can only take place if the essential data has been entered correctly but the retrieval code is incorrect. This counter is not reset when the applicant requests a new retrieval code reissuance online. Where the applicant requests a retrieval code reissuance via the staff channel, this counter will be reset to 0. The number of attempts allowed before lockout and the duration of the lockout is entity-configurable. If a hard lockout occurs, the user would contact the call center so that the "Lost my Code" process could be initiated by the staff user. Appropriate verification may then be undertaken by the staff user.

Figure 4:
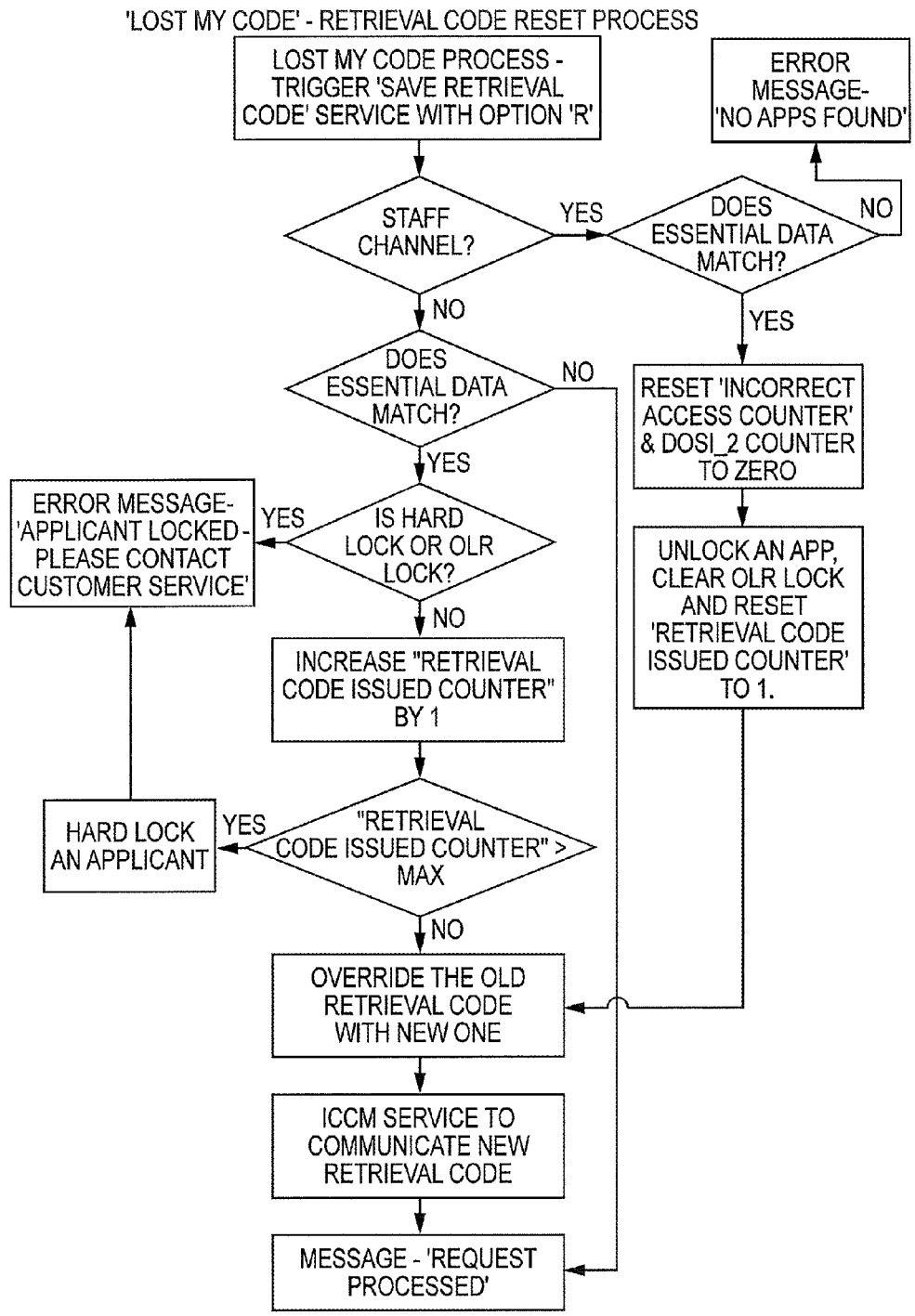
FIG. 4 is a diagram of a 'Lost My Code' Retrieval Code Reset process, according to some embodiments of the invention.

A schematic of the "Lost My Code"—Retrieval Code Reset Process is shown in FIG. 4.

For retrieval of outstanding items on the Internet channel, the user will enter the essential data and the retrieval code. In some embodiments, when the retrieval process has been successfully completed, the following applies:

For existing customers, all of their outstanding items will be available for view. The customer can select any and proceed with that item. As part of the retrieval process, the user will have the ability to input existing channel credentials if they have them. This replaces the need to input essential data and the retrieval code. If a user attempts to retrieve and enters invalid retrieval code/essential data a generic error message will be presented. The error message presented will not specify which error data item(s) have been entered incorrectly.

In some embodiments, the retrieval code is needed only for users who are retrieving an item that has been previously saved. A joint party or other subsequent user who is accessing their portion of an application or item for the first time will not be requested to enter the retrieval code (they have not yet saved their portion of the application or item). Instead they will be asked to enter the applicant ID.

A customer in an unauthenticated state may use this feature. A customer in an authenticated state should retrieve using channel credentials.

Front End makes the OH APe Search Application service call with essential data search type. OH APe returns an array of 'Application IDs' and associated 'Applicant IDs'. These are used by Front End to trigger the Get Application Summary service, which provides the product and applicant level details for each application. The response from OH APe may, in certain embodiments, be restricted to a maximum of 25 records. For this amount the FE will provide a component to allow the user to sort the list on any of the dates in real time.

For authenticated users the CIN will be present, which enables OH APe to return matched applications.

For unauthenticated users a mandatory retrieval code field will be added to the Search Application page. The Front End will send the retrieval code to OH APe. OH APe will validate the code and send an appropriate response if validation fails. The error message presented may not necessarily specify which error data item(s) have been entered incorrectly.

Regarding the ability to lock the user from accessing saved items if the user enters the Retrieval Code incorrectly more than an entity-configurable number of times, refer to FIG. 4.

In this scenario, the "Lost My Code" process previously described would come into play.

Preferably, for CMB, all roles which have access to the AO application will have the ability to 'save and retrieve'. The system will not allow 'save and retrieve' for co-applicants that do not have their essential data captured and are not required to capture their own personal details.

Figure 5:
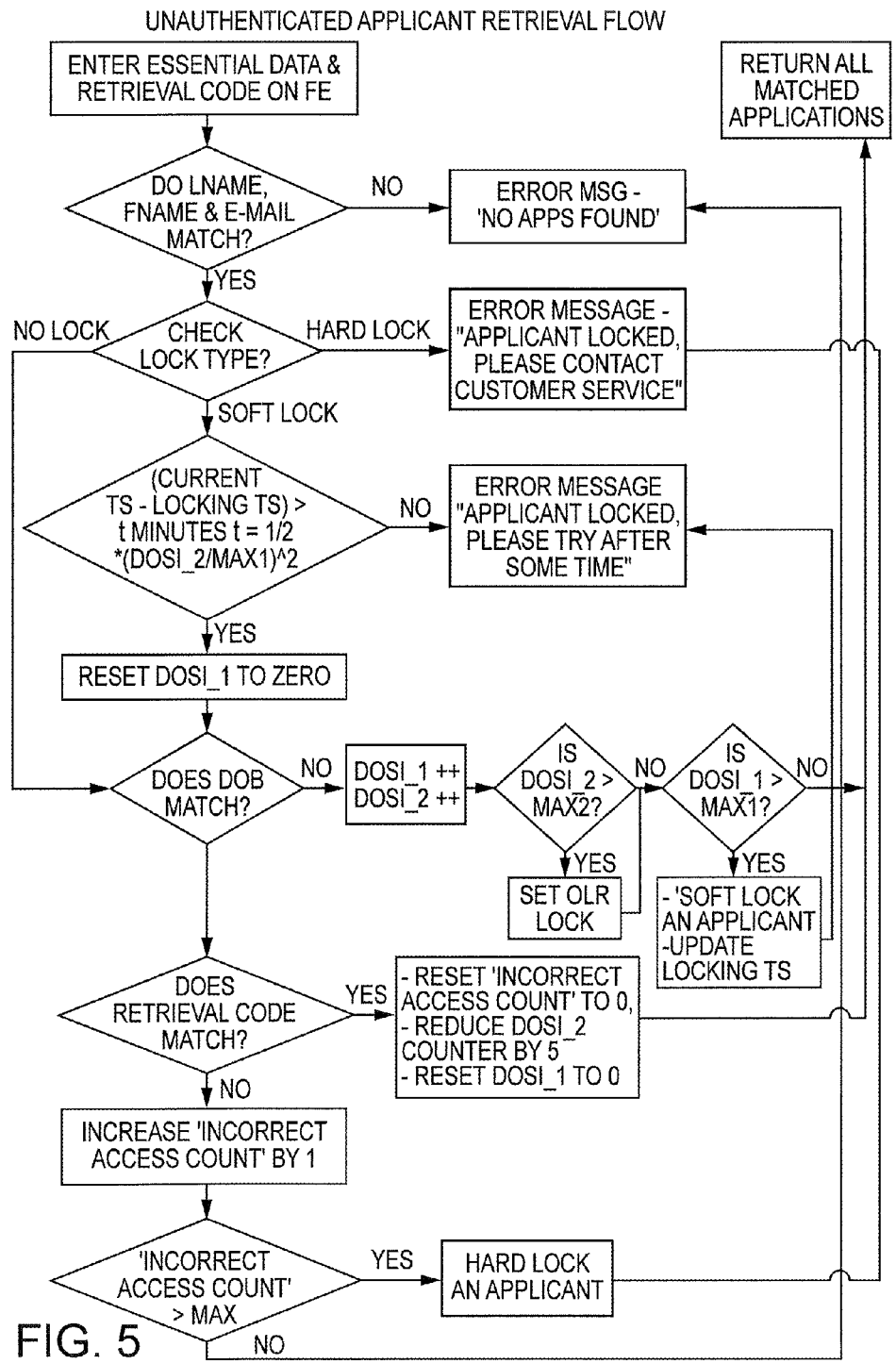
FIG. 5 shows an exemplary Unauthenticated Applicant Retrieval flow.

A schematic of an exemplary Unauthenticated Applicant Retrieval Flow is shown in FIG. 5.

Reference Data/Product Data. In some embodiments, reference and product data may be stored in various locations within, for example, an overall account opening system, leading to duplication of data and potential of some data-stores becoming out of date. Preferably, the Account Opening process standardizes Reference and Product data, allowing a common maintainable source for data.

In preferred embodiments, the OH Customer Data Management (CDM)'s ESR is the key repository for Reference Data for Account Opening. The interface to this data is preferably provided by R2DS in both the Java and COBOL spaces; however, in some embodiments, only a Java implementation for retrieving and caching reference and product data may be implemented.

Within Account Opening, Reference Data is used to represent static values that are used by multiple systems, such as Currency lists. It will also define basic Product Details.

In some embodiments, a real-time link between OH APe and the ESR is provided.

Local exit points support integration of Account Opening (FE and OH APe) with existing local product manufacturing systems.

OH APe Statuses. Regarding product status updates, product status is preferably set for each individual product in an application. Various functions within AO (e.g., Create Application, Get Started, Accept Terms and Conditions, Accept Offer, Save Validate Identity Status, etc.) change the product status throughout the application process. The following outlines exemplary functions that, in various embodiments, may change the product status.

Create Application. At create application time, OH APe sets the product status code to START for each product in the application. The status code for each product tracker ID on product master table is set to START. The system logs this event into an event tracking table. The event type is PRODSTATUS and the value is 'START'.

GAD Started. When GAD (Gather Application Data) starts, if the OH APe macro service receives the application ID and applicant ID but does not have product tracker ID, then the status code of all products in this application will be set to IN PROGRESS. Event type USRGADSTRT will be inserted into the event tracker table with a value of 'Y'.

In the above scenario, if OH APe retrieves application ID, applicant ID and product tracker ID, then only that particular product on this application will be set to IN PROGRESS. Event type USRGADSTRT will be inserted into event tracker table and the value 'Y' will be set for that particular product.

Accept Terms and Conditions. If an applicant accepts the terms and conditions, first the event type ACCPTTC with value 'Y' will be logged into event tracking table. Then the system will check the current product status. If the current product status is APPROVED and all applicants on this product have completed GAD, and there are no To-do items pending on T&C or on any other milestones then the system will update the current product status to ACCEPT. Event type PRODSTATUS with a value of 'ACCPT' for this product tracker ID will be logged into event tracker table.

Decline Terms and Conditions. If any of the applicants (primary, secondary, etc.) decline the terms and conditions, first the event type ACCPTTC with value 'N' will be logged into event tracking table. Then the system will change the product status to DECLINE in the product master table for this product tracker ID. This event will also be logged in the event tracker. The event type is PRODSTATUS and the value will be 'DECLN'. If this is a Bundled Product, all Products in the Bundle are marked with DECLN status.

Accept Offer. If an applicant accepts the offer, first the event type ACCEPTOFFR with value 'A' will be logged into the event tracking table. The system will then check the current product status. If the current product status is APPROVED, and all applicants on this product have completed GAD, and there are no To-do items pending on T&C or on other milestones, then the system will update current product status to ACCEPT. Event type PRODSTATUS with value 'ACCPT' for this product tracker ID will be logged into the event tracker table.

Decline Offer. If any of the applicants (primary, secondary, etc.) decline the offer, first the event type ACCEPTOFFR with value 'D' will be logged into event tracking table. Then the system will change the product status to DECLINE in the product master table for this product tracker ID and this event will be logged in the event tracker table for this product. The event type is PRODSTATUS and the value will be 'DECLN'. If this is a Bundled Product, all Products in the Bundle are marked with DECLN status.

GAD Completed. When GAD (gather application data) completes, if OH APe receives application ID and applicant ID but does not get any product tracker ID, then event type USRGADEND with value 'Y' will be inserted into the event tracker table for all products in this application. The system will further check the current product status. If the current product status is APPROVED and all applicants on this product have completed GAD, and there are no To-do items pending on T&C or on any other milestones then the system will update the current product status to ACCEPT. Event type PRODSTATUS with value 'ACCPT' for this product tracker ID will be logged into the event tracker table.

In the above scenario, if OH APe receives application ID, applicant ID and product tracker ID, then event type USRGADEND will be inserted into event tracker table for that product tracker ID with value 'Y'. If this product status is APPROVED and all applicants on this product have completed GAD, and there are no To-do items pending on T&C or on any other milestones, then the system will update this product status to ACCEPT. Event type PRODSTATUS with value 'ACCPT' for this product tracker ID will be logged into the event tracker table.

Save Validate Identity Status/Save Validate Business Status. At save VI/VB status time, if the VI/VB status is INVALD, first the event type VISTATUS/VBSTATUS with value 'INVALD' will be logged into the event tracking table. Then the system will update all products associated for this applicant with product status of DENIED. If there are other applicants associated with this product, the product is also denied for them. The same will be true in the case of CMB. This event will be logged into the event tracker table. The event type is PRODSTATUS and the value is 'DENED'.

Save/Update Decision Status. At save decision status time, the applicants' decision status will be evaluated for a product before the product status can be updated. Once all the applicants on a product are set to 'APPRV', then the product status can be updated to 'APPRV'. The event type PRODSTATUS with value 'APPRV' for this product tracker ID will be logged in the event tracker table. In a CMB application, decision status will be tracked at the Business level, individual level, or both.

If any applicant's decision status on a product is DENIED, then the product status will be marked as DENIED and event type PRODSTATUS with value 'DENED' will be logged in the event tracker table. If this is a Bundled Product, all Products in the Bundle are marked with DENED status.

If the Decision Status comes into Service Controller as 'PENDI' (Referred) the applicant's decision status is set to APPRV (but a Work Item is created). When all applicants on the product come in as PENDI or APPRV, the Product Status is changed to APPRV. This allows the application to progress, and the work item will keep the product from Boarding until the work item is resolved.

In some embodiments, the staff has the option of denying the product via the product status maintenance function. The decision status dropdown is read-only when the product status is not "Approved", "Accepted" or "Pend Board". In addition, this dropdown is read-only if the user has not completed the journey.

Where the product is currently in "Approved", "Accepted" or "Pend Board" status. The final product status will be "Denied" (DENED).

Save Product Status. The Pre-Boarding validation program checks if any open To-Do items will prevent Boarding. If so, the product will not be changed from ACCPT to PNDBD. The save product status function can be called from the "Ready to Board" subroutine in AO with value 'PNDBN', or from the "Boarding" subroutine with value 'BOARD', or from application maintenance with values of 'APPRV' or 'DECLN'. When one of these subroutines gets called, the product status will be set to PNDBD, BOARD, APPRV, and DECLN accordingly by OH APe. The event type PRODSTATUS with value PNDBD, BOARD, APPRV, and DECLN will be inserted into event track table.

Save Funding Status. When funding is marked complete, if the product status code is BOARD, and all applicants on this application finish the funding and fulfilment instruction(s) and all To-do items are completed, then the system will change the product status to COMPLETE. Meanwhile, the event will be inserted to the event tracker table, the event type is PRODSTATUS and the value will be 'CMPLT' for this product tracker ID in this application.

Save Fulfilment Status. When fulfilment is marked complete, if the product status code is BOARD, and all applicants on this application have finished the funding and fulfilment instruction(s) and all To-do items are completed, then the system will change the product status to COMPLETE. This event will be inserted to the event tracker table. The event type is PRODSTATUS and the value will be 'CMPLT' for this product tracker ID in this application.

Cancel Product. In the case that a product gets cancelled on an application via the System Maintenance 'housekeeping', the product status will be changed to CANCEL and the event tracker table will log this event. The event type is PRODSTATUS.

A member of staff may also cancel a product on the Application Overview screen via a "Cancel Product" button. This will trigger a Cancel Product macro. It will be hidden if product status is not "Start", "In Progress", "Approved", "Accepted" or "Pend Board". This macro will turn the product status to "Cancelled" or "Declined" according to the current product status.

In some embodiments, the following rules are observed in applying product status: (1) Where the product is currently in "Started" or "In-Progress" status, the final product status assigned is to be "Cancelled" (CANCL); (2) Where the product is currently in "Approved, "Accepted" or "Pend Board" status, the final product status assigned is to be "Declined" (DECLN).

Applicant status is set and updated an applicant when an applicant is added to an application or when the VI status is saved.

Add Involved Parties. Whenever an applicant is added on an application, the applicant status will be initialized to "UNKNWN". The event type VISTATUS with value 'UNKNWN' will be logged in the event tracking table.

Save Validate Identity/Validate Business Status. At save VI/VB status time, if the VI/VB status is IN REVIEW, VALID or INVAID, then the applicant status will be updated to INREVW, VALID or INVAID respectively in the applicant master table. The event type VISTATIS with value 'INREVW', 'VALID' or 'INVAID' will be logged in the event tracking table accordingly.

Regarding, application status updates, an application status can be ACTIVE or INACTIVE. An application status is set to ACTIVE at create application time by OH APe Create Application macro service. The active indicator on customer master application table is set to 'Yes'. System will log this event in event tracking table. The event type is APPSTATUS and the value is 'ACTIVE'.

If an application has only one product and this product gets cancelled, or it has multiple products but all of the products are in CANCEL, DENIED, DECLINE or COMPLETE status, then OH APe will set this application status to INACTIVE. Whenever this happens, OH APe will log this event in event tracking table. The event type is APPSTATUS and the value will be 'INACTIVE'. In the case of application expiry, the parameter (configurable number of days) that governs when an application is to be expired sits in the Application SLA table. When this period in time is reached, the Application Active Status will be set to 'N' and all associated Application rows will be copied to tape, and the DB2 table rows for the application will be deleted. The Application Active status will remain as 'N' on the tape record.

Application Process Flow Management

Creating the Application. OH APe's Create Application Service is responsible for assigning a unique reference number which can be used to retrieve the application at a later time, provided that the application has not reached the business configurable point in time for archival. It is at this time that Product Tracker ID is also created and provided in the response back to the Front End. In some embodiments, OH APe supports up to 20 products for one application.

Unique execution paths per product are established at the time that the Create Application Service is requested. Create Application also facilitates the technical solution for features required in Account Opening such as the ability to drive what product options to show on the Front End, by means of a key piece of data, Configuration ID.

FE receives the Configuration ID, Content ID, Business Line, Customer Segment from the channel application. FE passes the Configuration ID to OH APe via the Create Application call. Additionally, the FE will pass in Business Line.

Adding Involved Parties. Add Business is the data message that will be used for Front End to OH APe CMB applicant data capture during the initiating applicant journey, to establish the CMB master record in OH APe. In some embodiments, OH APe supports storage for up to 999 involved parties, each of which may or may not be an 'applicant'. For both PFS and CMB, each applicant (initiator and co-applicant)

will count as one involved party. In a CMB application, the business entity will count as one involved party, and each 'other account user' such as the company attorney will count as one involved party as well.

For an existing CMB customer, this will retrieve the company customer ID as well as establish the Business Type, and the 'role' of "Business".

OH APe's Add Involved Parties will be called to "add an applicant" to the application. For the existing customer OH APe will retrieve from the customer host system and populate the relevant data. The Service Controller is also invoked by this process to query the customer database for existing customers and download that data to the OH APe databases. This will establish the applicant role code as well as other attributes pertinent to CMB such as whether or not the applicant in play is the initiating applicant or primary business contact. In addition, in the case of existing customer relationships, this message will pass into OH APe the 'OOBO' indicator described below.

FE will pass the customer segment to OH APe via the Add Involved Parties service. Before displaying the product configuration page, FE retrieves the Configuration ID, Customer Segment, and Business Line from OH APe via the messages that support the Application Summary page. FE checks the product options properties files, displays the appropriate product options on the screen based on the Configuration ID and other input attributes. Configuration ID will be captured in OH APe, stored at the application level. The same Configuration ID will be applied across products within the same AO application.

Role. Within OH APe's internal processing, each role will have their respective To-Do's assigned for the role in play. This framework will allow for regional practitioners to apply variations within their entities to fit within this framework. An entity-configurable role table in OH APe will provide processing attributes at the role level. In various embodiments, the roles are as follows.

Supplementary card holders may be captured as 'data only' types wherein they do not play a role in the AO journey. If a deploying entity requires supplementary cardholders to go through decisioning and accept T&C's, for example, these individuals can be configured as such instead of the PFS model of only having these roles go through blacklist check and boarding only.

The company is treated as an applicant and will have its own "Business" role. Company data capture messages will be separate from individual data capture messages. The company, however, will not have its own journey. The initiating applicant's journey will be the vehicle or means to capture company data.

The initiating applicant has the ability to add other co-applicants to the application, each of which will be identified with an Involved Party Role. For example, initiating applicant can be a 'Director' and can nominate other director(s) too. This will mean essential data for other Director(s) will be captured along with their role(s) within the Initiator's journey. In some embodiments, a user can not generally be assigned to more than one role per product (account). Where an entity supports the needs for identification of multiple roles (e.g., user A is a Director and Shareholder), this second role can be captured via a local field and will not be used to drive the AO journey. It will be used as a reference (data) only.

The Business Role fields are present in the OH APe's Event Tracker to support BI reporting.

In some embodiments, access to product options will be defined at the business process role level. Presentment of product options can be configurable in a variety of ways based on the role matrix, however, in the case of CMB, only the initiator is expected to have access to the product configuration area. The initiator for the application will be noted as an attribute within the OH APe database while not tagged as a role in itself. Having this attribute enables the system to configure systemic behaviors, such as the sending of communications to the initiator, or ensuring that the initiator is allowed access to the application and viewing the status of the application, regardless of the 'Business Process Role' that is attached to the initiator. For example, if a secretary or clerk were to be the initiator, he or she would be given 'save and retrieve' capabilities, which would otherwise not be available for their roles if their data attributes did not include the 'initiator flag'.

Additional optional fields passed from the FE that further define the customer and application are Line of Business (LOB) and Customer or IP Segment. Preferably, the channel will provide the LOB and IP Segment values to the FE. Market Sector Code fields may also be provided to AO from the invoking channel. The Market Sector Code values are lower-level values that may or may not be used to further define a customer. Software House Core Banking (SWH CB) uses these items to provide details on the classification of personal and corporate customers, including what form of business they are in.

Line of Business indicates the application type (e.g., PFS or CMB). This will be captured and stored at application level in OH APe and passed to the customer data management system. The same value will be passed for all applicants on the application. Line of Business as an additional configuration parameter, used in conjunction with Business Process ID, will allow for the ability to share products between PFS and CMB.

Customer Segment indicates the customer type (e.g., Premier). This will be captured and stored at applicant level in OH APe and passed to the customer data management system.

Business Type such as Sole Trader, Partnership, etc. will also be captured in the FE and saved to OH APe, and logged to BI.

Existing Customer Relationships. In some embodiments, AO provides the ability for the initiating applicant to open a joint account with another party with whom there exists an established relationship within the customer data management system.

If the initiating applicant is an existing customer who has authenticated using channel credentials (or is in the staff channel), OH APe or FE will query the customer data management system to retrieve a list of existing relationships. These would be customers having existing joint (or multi party) accounts with the initiating applicant. This list is used by FE to populate a drop-down pick list. The initiating applicant can select an existing relationship from the pick-list and proceed with the account opening process.

Once a customer is selected from the pick-list, the corresponding customer's CIN will be passed into OH APe during the request of the service Add Involved Parties. OH APe will query the customer data management system to retrieve the co-applicant's details and populate these into the application. By using the drop-down list, the initiating applicant can avoid filling the essential data for the co-applicants with whom he/she has an existing relationship.

One flow possible at this point is the "open-on-behalf-of functionality or OOBO", that is, where the customer can open the account on behalf of the chosen applicant(s) without their input. For this to be enabled, the product in play would have to be OOBO-eligible. In addition, the chosen applicant would have to have established their acceptance of the OOBO relationship via a prior T&C acceptance covering the same product group. It is within that previously accepted T&C that the OOBO stipulation would have been reflected. The FE will have the responsibility to retrieve the eligibility information for the product. OH APe, on the other hand, would have retrieved the information regarding OOBO relationships within the original query into the customer system. If these are both in place, the OOBO attribute will then drive the OOBO process accordingly. For instance, an OOBO journey may be configured to have the VI and/or T&C acceptance steps as not being required. In terms of product configuration, the product level options will be configured by the initiator. If there are any applicant level options, these may be configured through Servicing. When the end of journey is reached for the initiator, this would be marked for the chosen applicant as well. The OOBO flag will be part of the logging specification and be made available for the BI extracts.

An alternative flow would be the non-OOBO or 'regular' flow, whereupon being chosen by the initiator, the associated CIN will be passed into the application and used for pre-filling of information. Based on journey assembly, the pre-filled data can be masked or set as read-only.

Support for Branch. In some embodiments, to capture and assign a branch ID, the following functionality will exist. During journey assembly, the practitioner will configure a list of branches available for selection for the journey in a FE properties file. The list of branches will be able to support all products in the journey. In a multi applicant application, only the initiating applicant is able to select a domicile branch.

For an existing customer, OH APe will retrieve the home branch from the customer data management system. If the home branch is in the FE pick list then the customer will not have the option to select the domicile branch and the home branch will be defaulted as the domicile branch. However, if the home branch retrieved from the customer system is not in the FE pick list, then the customer will be able to pick a domicile branch from the branch list.

For NTB (new to bank) customers, if there is only one branch in the branch list, then that branch will be set to default domicile branch. If there is more than one branch in the list, then the NTB customer can select a branch as domicile.

For the staff channel, the staff's branch will be displayed as selected, and the staff will be able to select a different branch. If the staff branch is not in the set of branches, the FE pick list will be shown without a branch selected and staff will have to select a branch from the pick list.

Once selected or defaulted, domicile branch will be stored in OH APe at the application level.

At product boarding time, OH APe will use the domicile branch stored at application level. For NTB customers, domicile branch value will be used to set home branch. Domicile branch ID will be logged to BI.

The selected branch will only apply to the domicile branch and not Sales Branch ID. Sales Branch ID, which is the branch credited with the sale of the product, will be passed in by channel to FE which will pass it to OH APe as part of the header.

For staff channel, sales branch ID and staff ID will be passed to AO FE, and in turn, passed to OH APe as part of the header of every message and logged in the Progress Log and the Event Tracker database. These databases are used by the Metrics process for reporting.

OH APe Internal Logging. As services are executed against the new application, the full details of every service execution are logged in the OH APe Progress Log table. If an error does occur, details of the error are also logged in the OH APe Error Log table.

CMB Service Entitlements. The first Applicant is preferably treated as Initiator and will be provided with a pre-defined set of capabilities (e.g., adding business details, adding co-applicants, adding other account users) in the AO journey. Only an initiator will be able to add co-applicants and other account users to the application. Roles configured as "Unauthorized Users" cannot be added as Co-applicants.

All roles in the Applicant group can initiate application and/or otherwise have access to the application. Personal data of people playing these roles will be included in the account opening application. They will preferably have their identity validated, sign T&C and otherwise held accountable from the account opening and servicing perspective. To-Dos and FE screens for co-applicants will be configured by the practitioners.

Other Account Users may be collected for account servicing needs. People playing these roles are attached to the application as "data". However, they may still be required to have their names checked against blacklists (e.g., supplementary cardholders).

Service entitlements will be captured as "data" meaning that the integration of Service Entitlements with target product systems is a local effort. Some information such as limits would be attributes passed on as part of the Fulfilment messages to the respective product systems.

FE User Interface (UI) components allow for the capture of this data. OH APe messages such as those listed below allow for the save and retrieval of the information:

Maintain Entitlements
Retrieve Authorization Arrangements
Retrieve Authorization Group Members
Retrieve Authorization Groups
Retrieve Permission
Maintain Board Resolution and Preference
Retrieve Board Resolution and Preference Signing Authority Groups are preferably set up in order for the account to be operated on. The Business view is that if the initiator chooses not to set this up (e.g., responds "no" upon coming to this page), then a work item is to be created which be closed manually by the Relationship Manager (RM) after these have been set up offline. This work item does not hold up boarding. It will be the responsibility of the RM to come back to the application to close this work item as there is no systemic requirement to do so.

Validate Identity/Validate Business. The OH APe VI Handler sub service shall execute 'validate identity' or VI rules when the Front End submits a request to process the applicant validation status. This may be applicable to the initiating and additional applicants, per journey configuration.

"Unknown" is the default VI status value. This "Unknown" value will signal the VI process to invoke a third party service call, after GAD is completed. FE will pass the results as valid, invalid or in-review. When status is "Valid" or "In Review", the Front End will continue the journey; otherwise, if the status is 'Invalid', the Front End will display error message and stop the journey. If the VI status is "In Review", OH APe will trigger the Create Work Item sub service as the next step to inject a new entry in the Queue Management System (QMS) if the reason code demanded a work item creation. VI Handler may also trigger a new Send Communications sub service to request ICCM to send correspondence to customer.

For CMB, Validate Business/Validate Identity may be enabled/disabled on a role basis (for example, for a given entity all Directors might have to validate themselves while Shareholders would not be required to do so). If VI or VB is required, then there should be respective To-Do's assigned—VIVALID & VBVALID, for example. These To-Dos's will be set to stop boarding; and will be marked complete by OH APe when Process Applicant Validation Status is fired and passes as 'valid'. Preferably, OH APe will only interrogate the To-Dos and their status in the Pre-Boarding validation.

Figure 6:
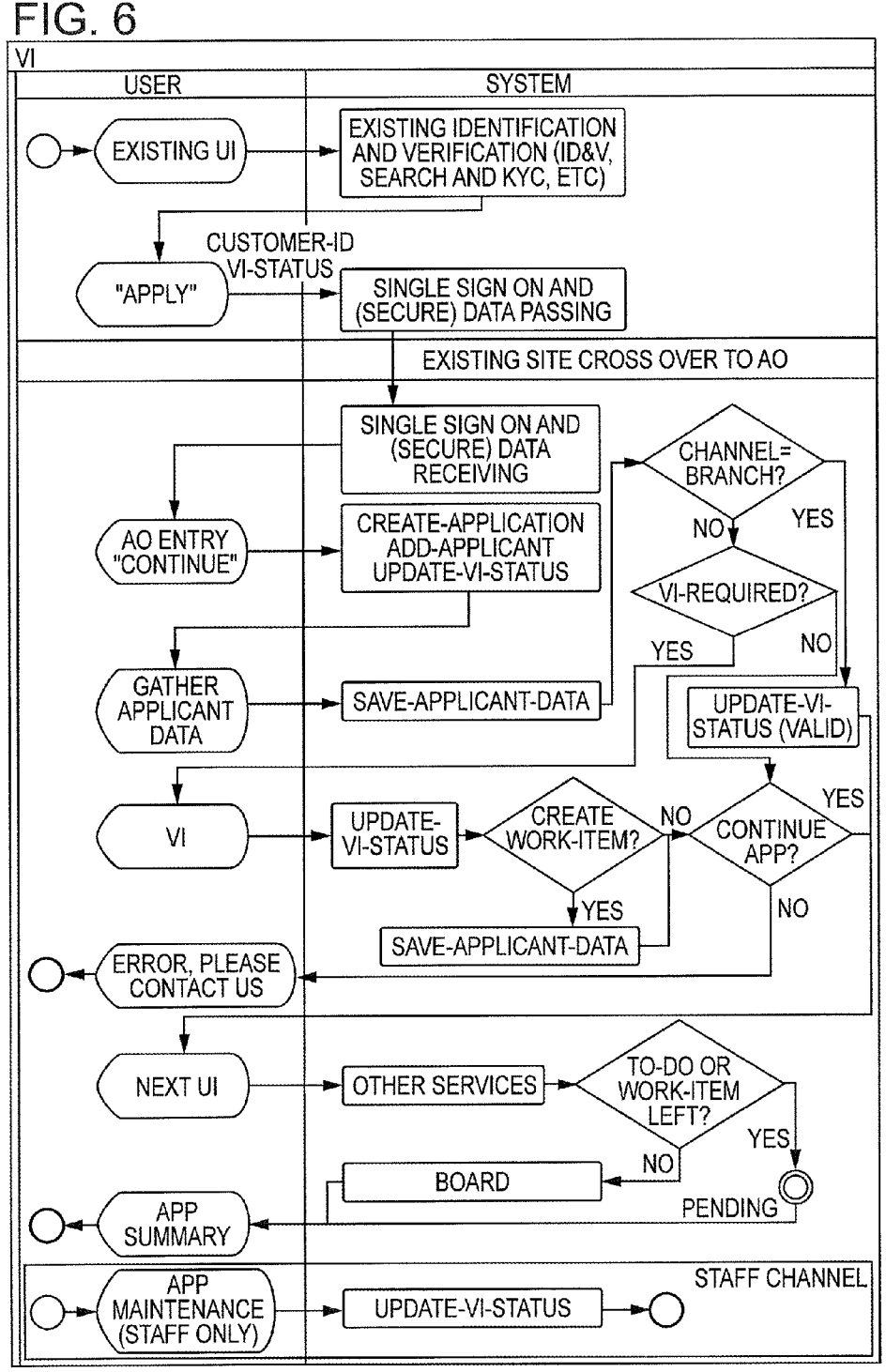
FIG. 6 illustrates a Validate Identity (VI) process, according to some embodiments. A similar process may apply to Validate Business (VB).

FIG. 6 outlines the VI process. The same process would apply for VB.

Customer Communications. AO communications can be sent at various stages within the applicant's journey to one or more applicants and to 'other' account users such as cardholders; for a multi-product, bundled product, or single product, and can be sent via a real-time or batch frequency. Business users, through configuration, can add, update or expire the available communications. Another configuration point within communications is the ability to associate the doctype ID (communication) to a business process, a product group, product code, or applicant role.

For example, Decision Application is a macro service and Send Comm is a sub service. If the business wants to send a decision notification, they can add the configuration within the OH APe internal tables related to the service definition, such that whenever AO FE triggers the Decision Application macro service, subsequently the Send Comm sub service will also be executed, which will send a communication to a customer regarding the decision outcome. If the Business does not want to send a decision notification, they can remove the Send Comm service from the internal OH APe configuration tables, so it will not be executed even when FE triggers the Decision Application macro service.

The Business Process ID will allow the business to try out champion/challenger strategies. The Product Group Code is a unique ID used to group similar products together to facilitate configuration. This field will enable the business to have different Document ID types for different product group codes.

Communication History is defined by the business as a communication log record created whenever a communication, via letter, email or SMS, is sent to a customer, as is currently stored in the current ICCM COMMS history log. In some embodiments, it is only used for very specific detailed reviews of the actual communications sent to a customer. The summary of key COMMS events can be seen in Actions History.

When business users introduce a campaign through the Sales Campaign Manager (SCM), a new doctype ID, stored in the LTR Config Table, will be pulled from the table and sent by OH APe to ICCM based upon specified criteria (e.g., a denied product with a downsell offer; other examples could include anything conceivable as a marketing campaign). As the application progresses through the milestones, the business can configure rules within this centralized location (OH APe LTR Config table) that allows for Application/Applicant/Product oversight across the entire AO journey.

A business user can add and configure the triggering of all of the communications logic such as business process, product group, product code, or applicant role, within the OH APe configuration table, while additional communications metadata (subject line, from address, code resolution, communication screen name) can be stored within the Business Development Environment (BDE) configuration files. Once all has been set, the communication can be called by OH APe or the AO FE (through OH APe) for a request bound for ICCM.

OH APe has decoupled the hard coding invocation of communications services from COBOL programs to give the business flexibility to both suppress and add communications at will, requiring no coding changes.

OH APe provides the ability to configure communications at a macro service level. Macro services drive the customer journey and will be used mainly for real-time communication. The communication will be offered as a sub-service. This means that the business can choose to plug it in with any macro service.

For example, in some embodiments, OH APe will send a product config ID through the Send Comm message to ICCM. ICCM will use the config ID to determine which content or image fragments should be displayed within a communication. This field will be available within all of the existing "send communication" message types (examples are WL for Welcome Letter, TC for Terms and Conditions).

Figure 7:
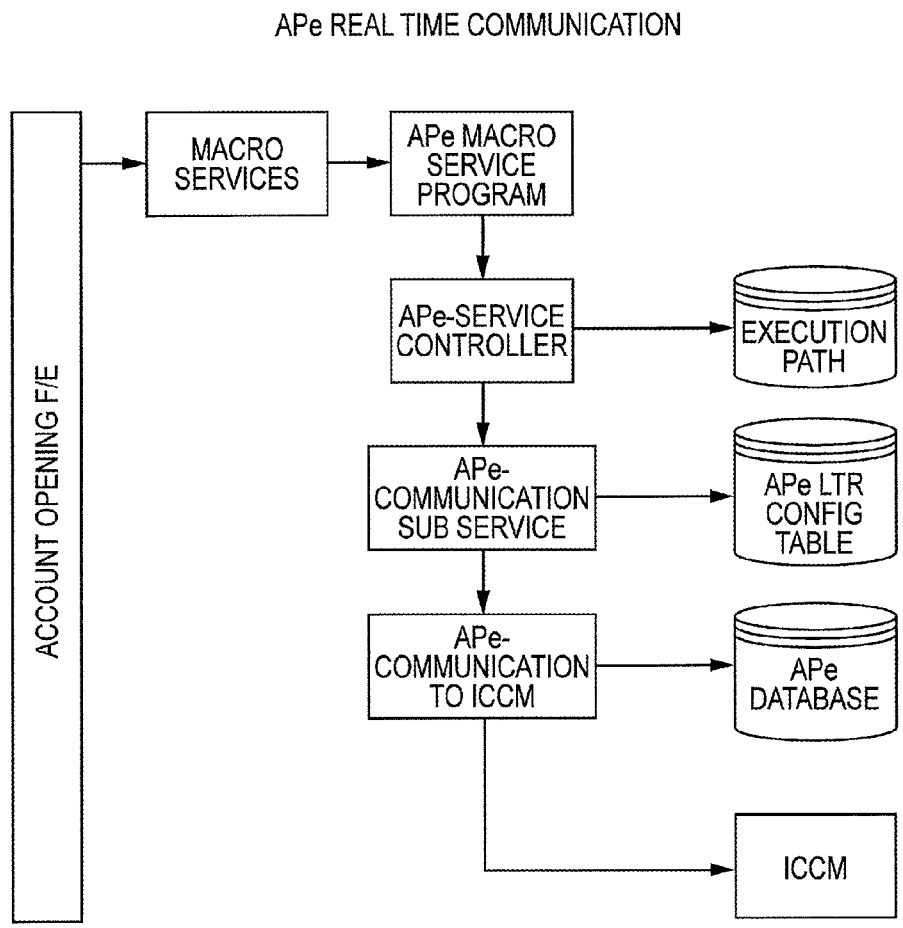
FIG. 7 is a diagram of APe Real Time Communication, according to some embodiments.

A schematic of APe Real Time Communication is shown in FIG. 7.

The communication sub-service will be executed with the help of the execution path and service controller. OH APe will use the configuration table to retrieve the doctypeID and other communication related information. OH APe will also pass the customer preferred language but if it is not available then the default language, also present in the configuration table, will be passed.

To trigger batch communication OH APe will use its Service Level Agreement table, which will contain the details of the communication that needs to be sent and the elapsed time criteria. This table resides in OH APe. OH APe batch programs will have rules coded within for each type of communication. The batch program will scan all applications and applicants that meet the criteria specified and will apply specific rules.

In the case of a multi-product scenario, decisioning notifications and welcome letters will be combined by OH APe into one letter dependent on the product status. In the case of communications that inform the primary or initiating applicant about the pending activities of secondary or additional applicants, all the additional applicant information will be combined into one communication that satisfies the criteria. For multi-party applications, OH APe will also ensure that the communications are bundled and avoid redundant communications. Where the Welcome Letter is printed at the branch, OH APe will check in an internal table if a particular communication has been already sent and if so, it will skip the communication.

In the case of CMB, communications sent to the 'primary' for PFS will be sent to the Primary Business Contact. In addition, the framework supports the ability to configure which 'role' should receive communications.

The OH APe batch program will then create a file containing all such communication requests. This file will be picked up by another OH APe program which will gather all customer-related data required to fulfill the ICCM message contract. These batch files will be systematically sent to ICCM. ICCM will process the batch files and return a file to OH APe containing an acknowledgement for each record. The acknowledgement will contain a unique number created by ICCM along with the status of the communication. OH APe will update its database with this unique number and status field.

Figure 8:
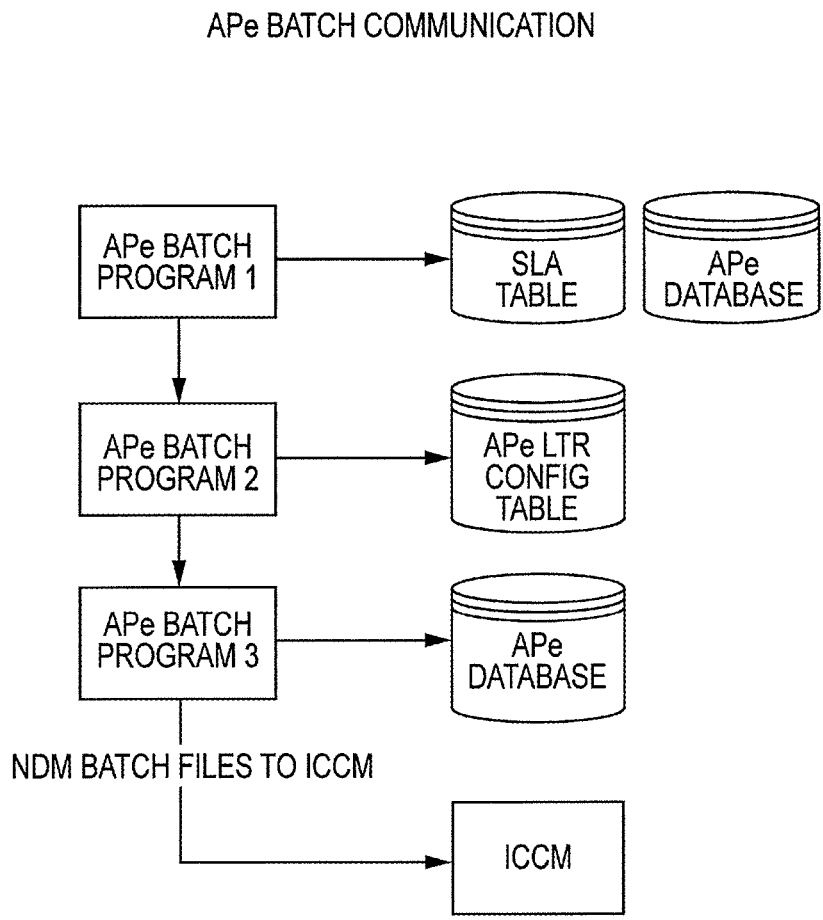
FIG. 8 is a diagram of APe Batch Communication, according to some embodiments.

A schematic of APe Batch Communication is shown in FIG. 8.

OH APe also supports Manual Triggered Communication. Staff will have the ability to trigger a pre-defined ICCM communication to an applicant in a particular work queue who is present within a branch or on the phone with an agent.

OH APe will provide the dynamic data required for the requested doctypeID of the product for the current applicant. A reusable UI component will interact with an existing OH APe macro-service for capturing the details. AO FE can trigger communications by invoking OH APe services or sending ICCM message to the OH ICCM back end using APIs provided by the ICCM front end.

OH APe may also provide one or more of the following services: (1) To get and save the application communication suppression flag; (2) To allow AO FE to send document thru email, mail and SMS; (3) To provide a generic customer profile service for ICCM FE to retrieve customer/applicant data from OH APe database.

In preferred embodiments, OH APe includes a process to handle error messages. There are two synchronous error categories, link failure between OH APe and ICCM and real-time failure by ICCM. For link errors, OH APe will make an entry into the OH APe database and mark communication status as "FA" (failed). If the communication was manually triggered by staff and fails then staff will be notified. If communication is triggered systematically, OH APe will mark the communication as Failed. The communication will be resent during nightly batch. If it is the last communication for being sent to the customer it will be targeted for resend in batch.

If there are validation errors returned by ICCM (e.g., for a wrong email address), OH APe will send the application to the work queue. All such failed communication will be picked up by the OH APe daily batch process. If the customer journey is not completed then OH APe will re-send the communications in the batch file. Before the nightly batch, if customer journey is completed, then OH APe will ignore the error and will not resend communication. Where there is a manually triggered communication by staff, OH APe will pass the error back to the FE for display.

In some embodiments, OH APe will create different sets of files, one for each message format. For example, there will be a separate file for a Welcome Letter failed communication and separate file for a T&C type of communication. These files will be systematically sent to ICCM daily. ICCM will send back a different set of response files to OH APe. OH APe will check the status of each record in the file and update the OH APe database with the correct status and communication ID. Staff will be able to view the communication history on the Communications History portlet.

For asynchronous errors, ICCM will generate a daily file (only if such errors are reported). OH APe will not build any functionality to consume this file.

Terms & Conditions. Terms and Conditions processing consists of recording in OH APe the collectible attributes of the Terms and Conditions documentation presented to an applicant for review, and the decision by the applicant to accept or decline those Terms and Conditions.

Default entitlement for T&C presentment may be configured at role-level. This information is made available to the Front End by OH APe via the Get Applicant Info and Get Product Info messages.

The framework can be configured to support the following three scenarios via configuring To-Do's: (1) Suppress T&C in the customer journey (acceptance will be manual via app maintenance); (2) Present T&C but with no acceptance ability in the journey (acceptance will be manual via app maintenance); and (3) Present T&C with acceptance ability in the journey (explicit or passive acceptance).

The capability through Application Maintenance screens will allow for offline T&C acceptance where needed.

OH APe services may also have a direct hand in providing the user the ability to select preferred T&C dispatch method for the applicant (mail or email), provide the system the ability to send the T&C to customer via email or mail, and allow for deferring T&C acceptance later in the journey.

In some embodiments, OH APe Identify UTC Acceptance service is as follows. Following retrieval of the Terms and Conditions document ID for the product from the system's external reference source, the Front End will identify whether or not this document ID is a Universal Terms and Conditions (UTC) covering an entire category of products. If so, a check to see if this particular UTC has already been accepted by this applicant on a previous product application, or a previous product on this application will be performed. In some embodiments, the FE may separately query the customer database to see if the UTC is already on file for the customer. If not, the FE will send Identify UTC Acceptance to OH APe to check for the UTC on a previous product that is part of the current application.

Following display of the Terms and Conditions details to the applicant, the Front End will send a message to OH APe to record the presentation event. This indicator will be used as reference in any customer dispute and its associated timestamp can be used as a trigger for a periodic communication to be sent when no Terms and Conditions acceptance/decline decision has been recorded.

OH APe may also provide a Send Comms service (e.g., via the ICCM work stream). Following Terms and Conditions display, the Front End can submit an applicant's request to have a copy of the Terms and Conditions mailed, or emailed to an applicant's address. This request will come into OH APe, which will collect the necessary customer information including dispatch preference and invoke OH APe's ICCM adapter to generate the request to ICCM.

OH APe Accept/Decline Terms and Conditions services are used to record the applicant's decision regarding Terms and Conditions. Associated attributes including the Terms and Conditions document ID, and its coverage scope—single product or Universal, are stored with the decision result. Additionally, for Accept Terms and Conditions, this data is preferably sent to the customer database to be part of the customer record. On "Accept/Decline Terms and Conditions", associated attributes may also include, for example, T&C Version number for the document ID, and the date/time of acceptance. These should also be stored as part of the customer record. For CMB, recording of acceptance will be both at the company level, as well as the company delegate level.

The Front End will trigger the OH APe Open Account service at the end of an applicant journey. This is used to attempt to explicitly board the eligible products and applicants within the application. This service can perform other sub services, for example those listed below. However, the flexibility does exist based on entity configuration to move processes outside of this macro service, such as execution of Funding or Fulfilment instructions.

1 Initially set the product status to 'Open Account'
2 Pre-Boarding Validation
During pre-boarding validation, the following processes/ checks are performed:
    Validating the product record has the 'Journey is Complete' status set and that if this is a multi applicant application and the "Board all" flag is on for this product, that the status is not updated to PNDBOARD until all applicants have their journey completed
    Release all work items for a product
    Validate that all work items that have not been closed and are required for boarding are in a closed status
    Check if funding needs to be executed before boarding by using the 'To Dos' and if so, release the funding instructions
    Check that all the 'To Do's' that are required for boarding are closed
    Check that the product is in the correct status before allowing the boarding program to be initiated (if this is a Bundled product, this check should be performed for all products in the Bundle; if they are all completed then this process should release the other products in the Bundle for Boarding)
3 Boarding to Servicing Systems
4 Set Status to Boarded
Based on the product, Open Account may have one or more of the following services.
5 Execute Funding Instructions
6 Execute Fulfilment Instructions
7 Send Correspondence (Welcome Letter)
Error Handling. Services will be called by messages, and in response to messages there are attributes to state the success/failure of the service call as follows. Response Code states success or failure of call. It also shows the severity of the error. Reason Code expresses the extra information about the error, the area of error, the reason of failure, or warning information. Tracking Code provides a code that can pin-point the error in the Host system's error logs (if provided).

Different service providers may have different Response and Reason Codes. The system can uniquely react to different provider's Response/Reason codes. For this purpose, OH APe plays an important role to unify the codes.

The following are exemplary standardized response codes. Preferably, all back-ends should return these codes as a result of service calls.

000 Success (e.g., continue to next component in flow)
004 Warning (e.g., continue to next component, and either show the warning to the user or log it)
008 Host Validation Errors (the user can recover from this error if they modify their data input)
016 Fatal Error (e.g., direct user to the Application Error page)

As mentioned before, different service providers return their proprietary reason codes upon errors. These reason codes will be passed from OH APe to AO FE without change. AO FE will display appropriate message to the user based on the received reason code.

Preferably, OH APe will return one response code per macro request. If OH APe micro services return more than one response code, the most serious response code will be returned. In some embodiments, OH APe is returning only one reason code to the FE.

Figure 9:
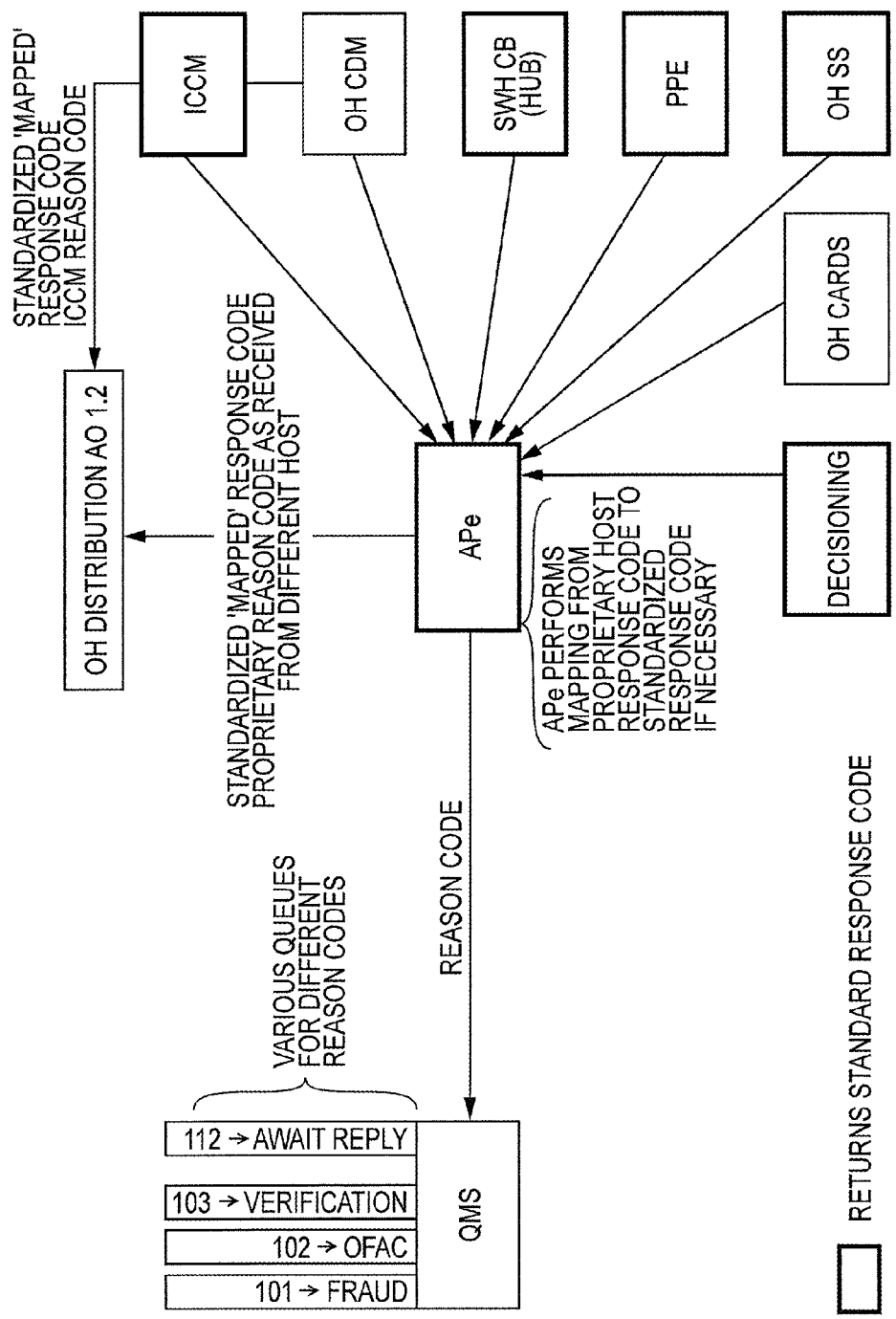
FIG. 9 is a diagram illustrating an exemplary Error Handling process.
Figure 10:
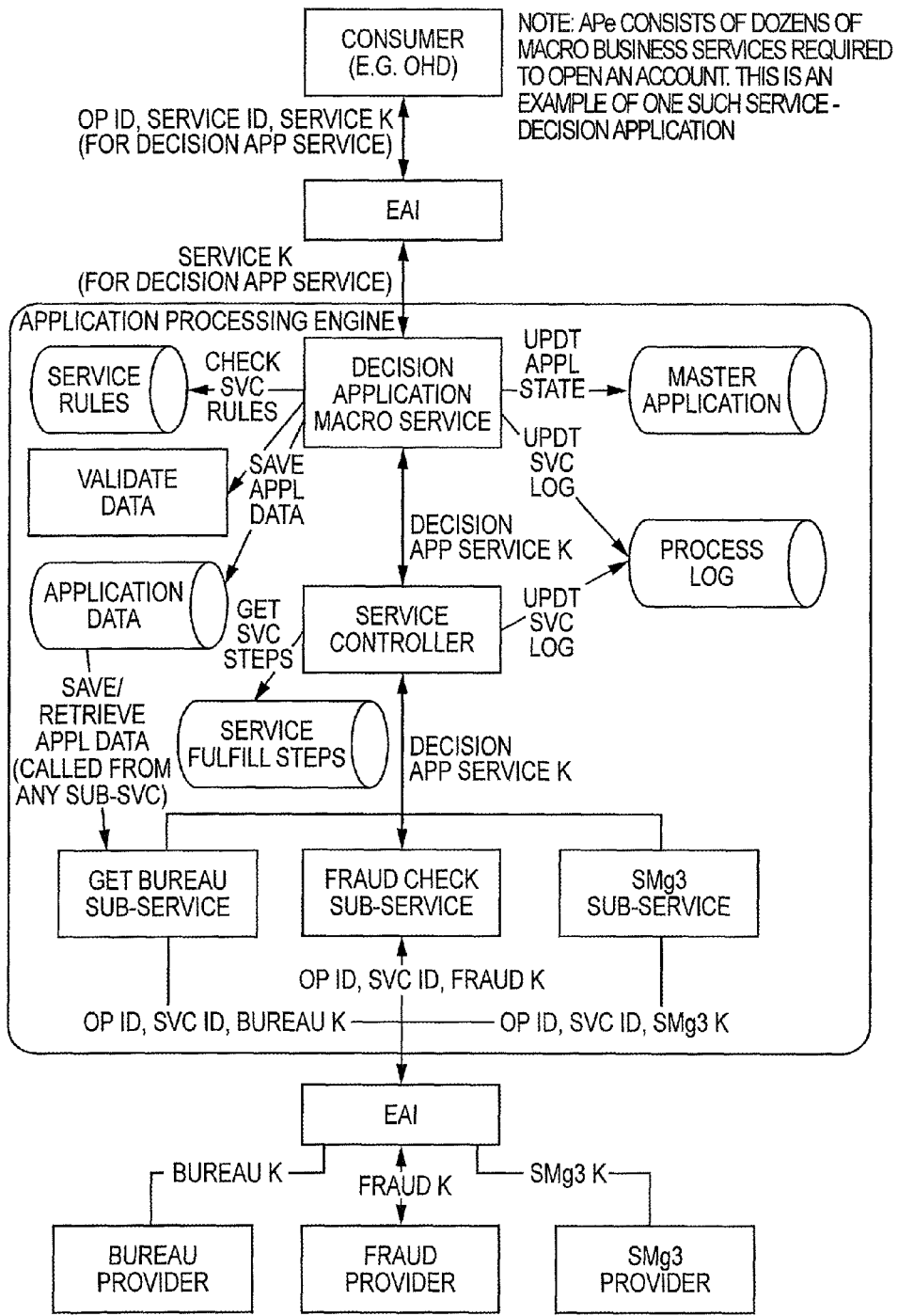
FIG. 10 is a diagram illustrating an exemplary Decision Application process.

An exemplary Error Handling Process is as follows:
1 FE calls to OH APe Macro Services
2 OH APe calls one or a few Micro Services
3 The response returns back from the called micro service; OH APe receives a non "000" Response Code; the Reason Code(s) will now be looked at
4 OH APe will proceed to call next micro service, if any
5 OH APe will return the Macro Service result, which contains the standard Response Code, along with proprietary Reason Code
6 FE will proceed to next step, or display appropriate messages in case of errors/warnings This error handling process is illustrated in FIG. 9.

OH APe may also provide a 'Bulk Restart' Process. As discussed in the previous section, there is an internal OH APe table, the Response Configuration table, where any expected error codes will be defined. One of the attributes associated with the error code is a flag which will indicate that this code is intended to be handled via the 'bulk' method. When OH APe encounters an error, this table is queried and if it is found that the bulk method is the intended handling, OH APe will insert a row into the "Start Service Control table". After this, the "Start Service" process will run (either batch triggered or time triggered) which will then sequentially go through the contents of the Start Service Control table and kick off the service controller, essentially re-invoking the subservice where it was last left off. An example where this feature can be utilized is where there is a serious system inavailability problem for an integral service such as SMg3.

Progress Log. The Progress Log provides the detail of every service executed against OH APe. The logging of each service happens automatically via the OH APe core framework programs. OH APe keeps a timely record of when the last action was taken on an application. A Sample Progress Log Table is shown in Table 2.

TABLE 2

| Application ID | Product Tracker ID | Channel ID | Service ID | Service Tracker ID | Service_Name | Status | Start_timestamp | End_Timestamp | Oper_Id |
| --- | --- | --- | --- | --- | --- | --- | --- | --- | --- |
| 2008195001 | 161 | F.E. | 1 | S12323 | Create Appln | error | 06.19:000000 | 06.19:000006 | WEB |
| 2008195001 | 161 | F.E. | 1.1 | S12323 | APe Validation | Ok | 06.19:000001 | 06.19:000002 | WEB |
| 2008195001 | 161 | F.E. | 1.2 | S12323 | Get Product Group Id for product | Ok | 06.19:000002 | 06.19:000003 | WEB |
| 2008195001 | 161 | F.E. | 1.3 | S12323 | Generate Appln | Ok | 06.19:000003 | 06.19:000004 | WEB |
| 2008195001 | 161 | F.E. | 1.4 | S12323 | Update Service Version Table | error | 06.19:000004 | 06.19:000005 | WEB |

Exemplary functional features of Application Process Flow Management, according to some embodiments of the invention, are listed in Table 3.

TABLE 3

| Functional Specifications - Application Process Flow Management |
| --- |
| APe will store a single branch at the application level and that branch is passed in from the channel and otherwise host defaulted.
Applicants (New-To-Bank and existing customers) are required to have their identity validated prior to account boarding in most cases. Ape should have the ability to allow boarding of the account without a customer identify validated by configuration.
Ability to execute Validate Identity (VI) rules in Core immediately upon receipt of VI results code" from 3rd party validation system (e.g., Equifax) rather than waiting until decisioning.
Ape is required to track VI statuses. Valid, Invalid, In Review + Reason Code. BI is also required to track VI status change, reason code, and applicant status change. A Core set of event-logging codes is required.
Terms and Conditions presentment
Joint Applicant Error during board Check Account without the secondary signor being validated - the BE should be intelligent enough understand what products do not need dual validation
The system should have the ability to send the T&C to customer via email and mail
Communication Triggers - Configure, Add, Update and Support for Real-Time and Batch/DocTypeID & Trigger Relationship
Comms Intelligence - Merge Multiple Comms or Eliminate Redundant Comms Due to Multi-Step AO Session Error Message Handling
ABILITY TO COLLECT INFORMATION ABOUT THE PEOPLE WITHIN THE APPLYING COMPANY AND PASS THAT TO HOST SYSTEMS TO CREATE RECORDS
ABILITY TO USE ROLES
Ability for the Initiating Applicant to open joint account within an existing relationship without the input of an additional applicant here should be a pick-list of existing relationships.
Ability for the Initiating Applicant to open joint account within an existing relationship without the input of an additional applicant. There should be a pick-list of existing relationships.
Open account with an existing relationship without the input of an additional applicant (Open-on-behalf-of (OOBO) Journey) |

TABLE 3-continued

Functional Specifications - Application Process Flow Management

Ability for the Initiating Applicant to open joint account within an existing relationship without the input of an additional applicant. There should be a pick-list of existing relationships.
Open account with an existing relationship with the input of the selected additional applicant) (non OOBO)
ABILITY TO ACT UPON A USER DEFINED QUORUM, CAPTURE SERVICE ENTITLEMENTS, CAPTURE "OTHER ACCOUNT USERS"
Service Entitlement information should be captured during a CMB application for both Applicants and for Other Account Users. This information is required to replace the paper mandate currently used by CMB staff members and also to populate host systems.
The ability to board Service Entitlement data to applicable positions on a host system
During the journey, the Initiating Applicant will have:
The ability to specify for each Applicant if that Applicant has the ability to administer/operate the account (This is known as "NF Capacity")
The ability to specify for each Applicant if that Applicant has the ability to perform financial transactions at:
1. Branch, 2. Internet, 3. Phone, 4. Self Service (This is known as "FT Capacity")
The ability to specify for NF Capacity either (1) the number of the specified Applicants that are required to operate the account (e.g., one of the specified Applicants, two of the specified Applicants, all of the specified Applicants), or (2) specific Applicants that are required to operate the account
The ability to specify for FT Capacity either (1) the number of the specified Applicants that are required to perform financial transactions in each of the 4 channels (e.g. one of the specified Applicants, two of the specified Applicants, all of the specified Applicants), or (2) specific Applicants that are required to perform financial transactions
The ability to dynamically list the selections in points above in a consolidated fashion along with text so that the result can be used to replace the paper mandate to be viewed and printed per the above requirements
The ability to input the "Date of Board Resolution"
The ability to specify the name of "The chairman of the board meeting"
Ability to configure T&C
Capture Applicant CMB Data
Create Messages

OH APe's Decisioning Services

Decision Processing. OH APe's Decision Application service is triggered when sufficient data has been gathered in order to render a decision for the application. This service can render sub services such as: Pull Credit Bureau; Get Decision; and Refer the application to QMS, if needed.

OH APe will collect the essential data from its application database and external system(s). Once the data has been collected, APe will send the request to the Decision Engine to determine whether the customer qualifies for the products they are applying for. The Decision Engine interface and data collection specific to entity needs for the Decision Engine is considered local implementation work.

The service provides the ability to communicate directly with a Decision Engine. One "out of box" core solution utilizes SMg3 as the decision engine. OH APe utilizes, for example, standard Decision Processing Services (DPS) as the mediating mechanism, which is a suite of products that consist of both vendor-supplied and internal software intended to support SMg3 installation. Access to decision engines other than SMg3 may be part of local/regional work.

Figure 11:
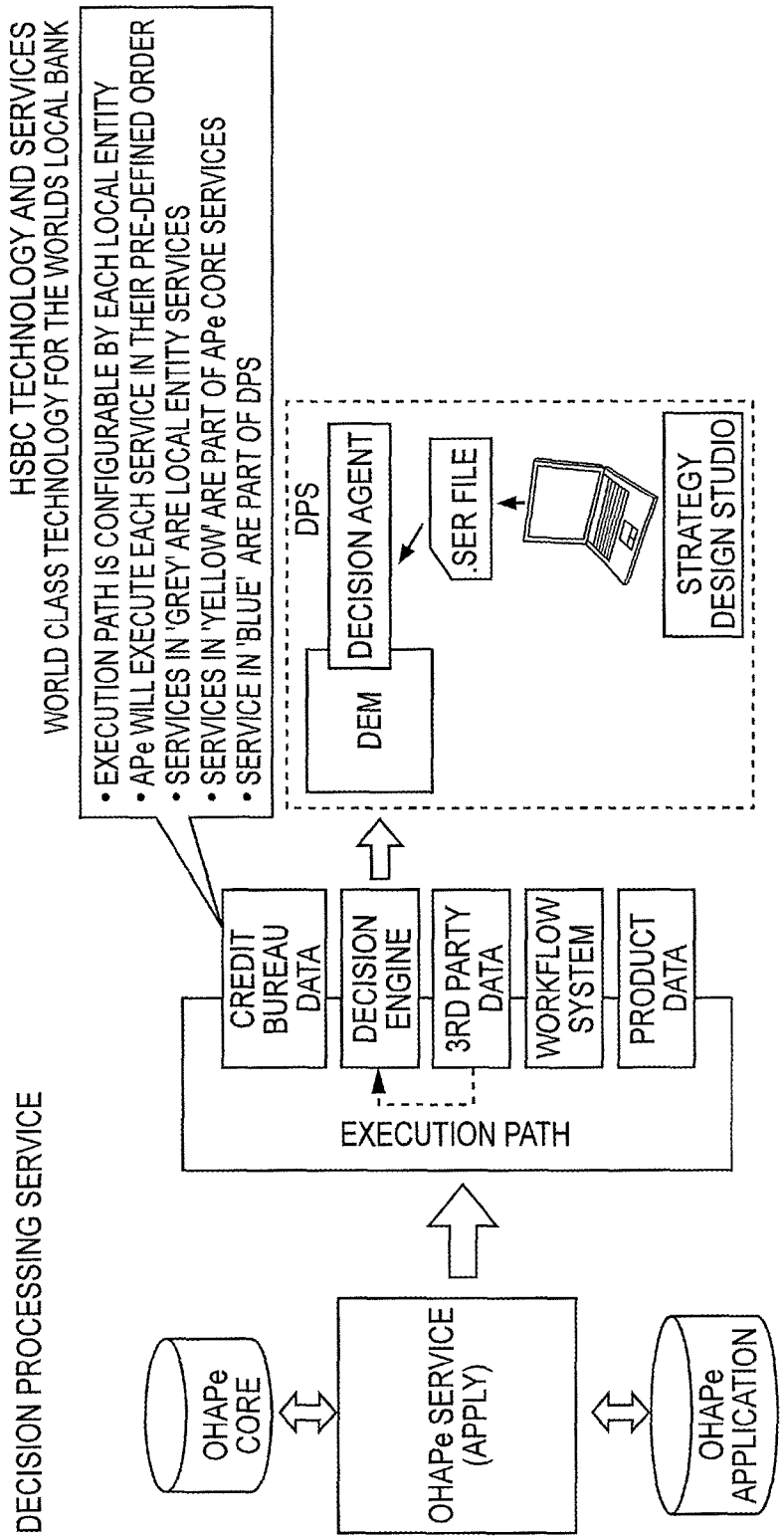
FIG. 11 illustrates a Decision Process service, according to some embodiments of the invention.

A schematic of the decision processing service is shown in FIG. 11. This service decisions for every applicant and product in the application and has the ability to process the various applicants and product combinations appropriately (multi-product and multi-applicant combinations), based on business-defined processing rules. In a CMB application, decision status may be tracked at the Business level, individual level, or both.

The ability to suppress individual steps in a re-decisioning scenario is a preferred feature of Account Opening. In some embodiments, as part of the OH APe core build, the service will run as configured, and the selective suppression of steps will be part of local implementation.

The Offer Expiry date is preferably set within the Decision Engine. By having it set by the Decision Engine, it will not be reset each time the system accesses the application.

The Offer Expiry date will be checked during the Accept Offer service. If the offer has expired a reason code will be sent back to AO FE.

Offer expiry is set at the product level; once the offer has expired the product status will be "Cancelled" while still viewable upon subsequent application retrieval.

Applicant Level Decisioning. OH APe provides the ability to decision at an applicant level. In some embodiments, OH APe may create a new flag within the system, Decision_All_At_Once, whose use shall only have significance in a multiparty application. When this flag is set to N, the implication is that the system will account for the decision status at the applicant level and allow the decisioning to take place with only the information of the applicant in play. Another flag, Board_All_At_Once, may also be used in conjunction within this process; a value of N shall allow an applicant can go all the way to boarding to the product system. These flags will be set up within OH APe at the product level and will be configured to reflect what the associated product system supports.

Upsell/Downsell. OH APe has the ability to return the upsell/downsell offers coming back from decisioning engine, contained within the response to the FE when the Get Decision service is triggered. For any upsell or downsell products being offered to the customer, the offered product statuses are to be considered automatically approved (which is a configuration setting), and will not be declined during subsequent steps of the AO journey.

In some embodiments, the system will only support upsell and downsell for sole applications, as well as the initiating applicant (only) in the case of multi-party applicants. However, a regional entity may choose to implement differently.

In the absence of automated decisioning, the regional entity shall provide the capabilities for upsell and downsell.

Passing Account, Product & Application Information to Decision Engine. AO supports the ability to gather information including, but not limited to, the following, and pass to the decisioning engine:

Existing products/accounts (exposure) held by the customer (e.g., loans, mortgages, O/D, Credit Limits)

Existing AO applications and products contained in other previously declined AO applications (including multi-product and products contained in a bundle) submitted prior to the current application The products being applied for in the current application (this includes multi-product, and products contained in a bundle)

Previous address for a new to bank customer who has not lived at their present address for more than two years (this information is also passed to the Customer Data Management system)

Other applications that are in process within AO (or other AO system like AAPS as part of a local implementation effort)

For an existing customer, a micro service exists in OH APe in order to retrieve all the account numbers for that customer. This may be a regional integration point that will call out to the Product and Customer systems, and update the internal OH APe Customer Account Table with the aggregated attributes returned by the Host System. The aggregation of product/account data may be part of Local Implementation.

In addition, OH APe will update an internal Work in Progress table for the purpose of housing all the in-flight applications within Account Opening.

The attributes collected from the Host Systems and Work in Progress table will be used by the Decision Engine for Decisioning.

Connection to other AO systems like AAPS and host systems will be part of local implementation.

Bundled Products. In some embodiments, a separate call to the Decision Engine is made for each product in the bundle. An indicator will be passed to the Decision Engine to identify the product as part of a bundle package. The field is defined in OH APe as 'bundle id'. Information from other products in the Bundle will be passed to the Decision Engine such as credit limit, and the resulting decision for the product. Local and additional data, such as credit bureau information and fraud flags, will also be passed to the Decision Engine as part of the local implementation.

In some embodiments, a rule that resides within the Decision Engine will be enforced such that when a product within a bundle is declined; the entire bundled is considered declined.

In catering to the flexibility to allow decisioning and boarding individually (applicant level decisioning), in the case of the Bundle, if any of the products require that all applicants be decisioned 'all at once' and not individually, then this will be the overriding behavior for the rest of the products in that bundle (and will carry forward to be the overriding behavior in boarding as well).

Preferably, there is no upsell or downsell processing for bundled products. However, a regional entity may choose to implement upsell and downsell for bundled products.

Figure 12:
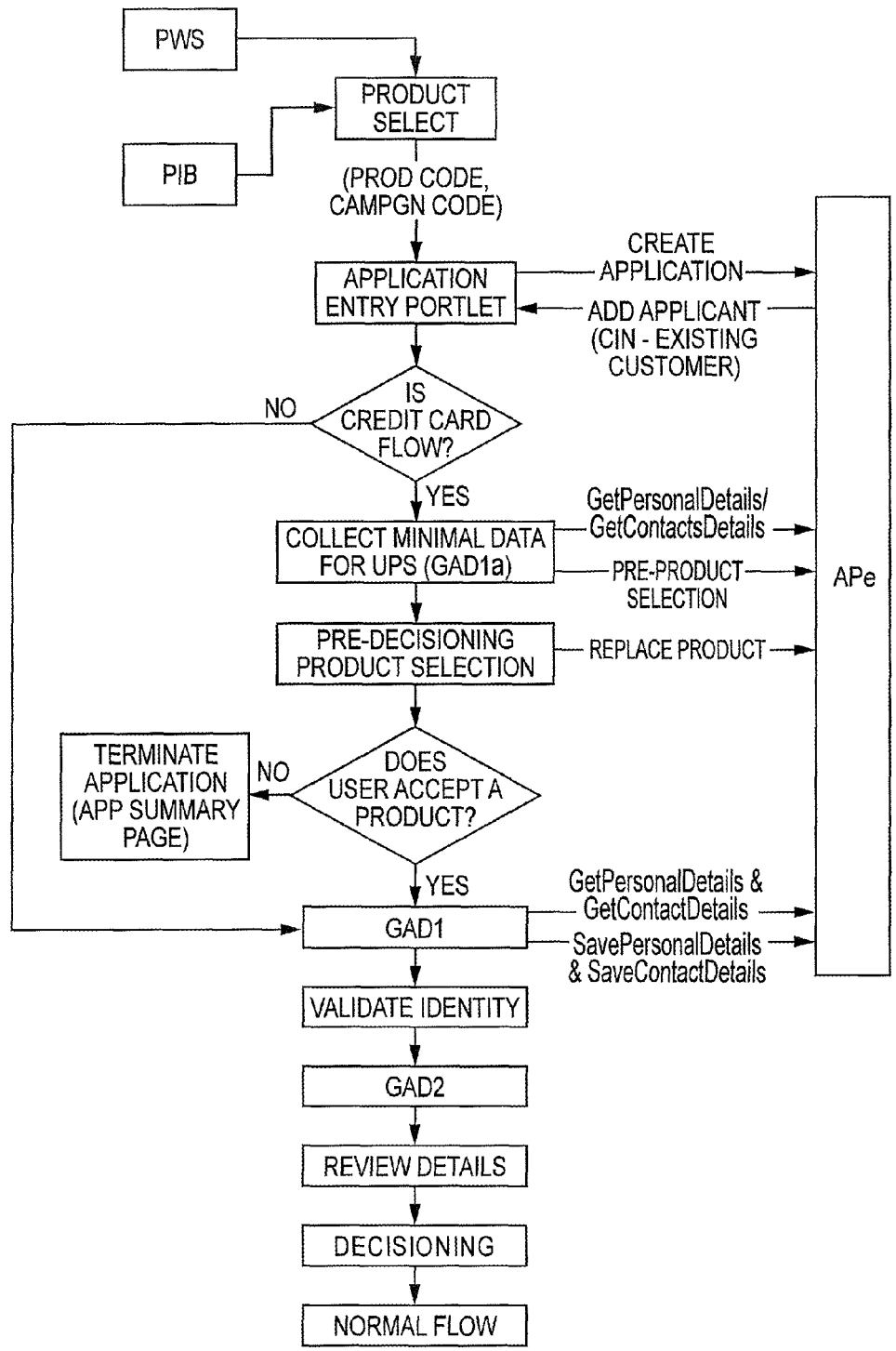
FIG. 12 is a diagram illustrating an exemplary Pre-Product Selector process.

Pre Product Selector. Pre Product Selector is the process in which the system uses minimal data to determine what product the customer pre-qualifies for. The information needed to make a call out to an external system consists of 'minimal data', as determined by a regional entity. This information is then fed into a Decision Engine to return a set of products that the customer is pre-approved for. The customer will then select the product(s) of their choosing. A schematic of the Pre Product Selector process is shown in FIG. 12.

The Front End can leverage existing GAD screens using hide/show techniques to target the appropriate data needed to facilitate this process. Entities may also introduce a local implementation of a new screen which would target necessary Pre Product Selector service data elements. Practitioner teams developing these screens will adhere to OH APe message specifications.

Pre Product Selector is a Macro Service that may be configured to collect additional application data, call out to an external third party system and then call out to a Decision Engine. Data elements to be feed to the Decision Engine will be part of Local Implementation. Regional entity may leverage the 3K entity data.

Because the customer has not yet selected a product at this point in time, a generic product ID will be assigned. This is done for the purpose of creating an application within OH APe. Once the system has returned the products that could be offered to the customer, an OH APe service Replace Generic Product ID will replace the initial generic product ID with the product selected by the customer.

The conclusion of the Pre Product Selector process is the entry point into the AO user journey as it is known, beginning with 'regular' GAD, proceeding on to Validate Identity, etc.

Duplicate Check. OH APe is responsible for determining whether an applicant within an application is a duplicate against in-flight applications by the same applicant based on rules and search keys. In some embodiments, the Search logic will be as follows regardless of the applicant role: Customer Number; if no match then ID Type and ID Number; if no match, then First Name and Last Name and Date of Birth. In addition, for CMB, Business Name and Business Registration Number are searchable fields as well.

In some embodiments, for all search cases, the match needs to be exact; there are no partial or wild card searches. An internal OH APe Work in Progress table will be used to search for in-flight applications. When a duplicate applicant is found, OH APe will set a flag and pass this information along with work in progress attributes to the Decision Engine. The Decision Engine interface and data collection for the Decision Engine may be considered local implementation work.

If duplicate applicant information plays a role in the strategies defined within the entity in play, the Decision Engine may return a reason code which will potentially warrant work item creation if this is the configured behavior. If this occurs, a flag and/or OH APe response reason code will be sent to AO Front End to indicate that a work item was created. This flag will be used to indicate whether a message should be showed to the Staff Channel.

To control the number of applications that can be in-flight at the same time, OH APe may include a system configuration for the number of in-flight applications. OH APe may also create a Micro Service to check this configuration. This Micro service can be configured to be triggered within any Macro service. Once the condition is found to hold true, it will set a reason code to indicate that the number of in-flight applications is greater than the maximum number of in-flight applications allowed. AO Front End will then receive the reason code and stop the journey.

Blacklist Check. Blacklists are "lists" of categories of undesirable behavior, such as terrorists, narcotic traffickers; and those engaged in activities related to weapons of mass destruction; and other threats to national security. Applicants appearing on such lists may receive greater scrutiny/consideration than those applicants who do not appear on such lists. The product requested may or may not be provided based on the business processes that will be invoked. Based on the information gathered from the Blacklist systems, OH APe may take any number of standard actions.

The information collected from the Blacklist database may be used at the time of Decisioning or at other keys points within the journey, based on how the business assembles the journey. This data will be used to facilitate determination whether a customer should be offered the product that they are applying for.

Blacklist checking may be configured to be performed on the primary applicant only, or on specific designated 'roles', or on all the applicants within an application. In addition, supplementary cardholder data stored in OH APe will be available for the corresponding blacklist checking process, if needed. For a CMB application, the Business may also be subject to a Blacklist check, if required.

As Blacklist Systems may be regional, the core set of attributes for interfacing with these Blacklist systems will be defined by each region, and the interface and data collection for the system would be done as part of local implementation. One such Blacklist System a region may elect to interface with is SCDM. SCDM (Security Compliance Data Matching) is a Group application used to screen new or amended clients against watch lists of individuals, organizations or known false identification data.

The physical storage of the immediate results from the Blacklist interface is preferably local implementation. OH APe provides the framework to allow invocation of external blacklist and storing of the end results.

OH APe supports the flexibility to configure the particular action based on the response from the Blacklist system. Some examples are: feed the data to a Decision Engine, stop the user journey, put the application on a queue, send out a communication, etc. The ability to show and hide additional fields based on the response from the Blacklist System is part of Local Implementation.

Checking of any additional lists such as a White List, and handling of responses from those lists may require local amendment.

Overdraft. The system will support the ability to capture the intent for an overdraft. The collection of additional information on the GAD screen for an overdraft will be done as part of local implementation by leveraging the existing core capabilities. AO will utilize the Save Options message to save the customer's intent for an overdraft in OH APe. In the case of PFS, the overdraft intent will be shown only for the primary applicant.

During the call to the Decision Engine, the customer intent for overdraft is passed along with the product with which the overdraft is associated. For a multiproduct scenario, the intent will be for all the products. The overdraft intent flag will be sent to the Decision Engine for each product. The business can use this flag and apply it to the product(s) that have overdraft. For the product(s) that does not have overdraft, the rules will ignore the flag. The Decision Engine interface is part of the local implementation. OH APe will send all the necessary information needed for Decisioning. Data to be sent to the Decision Engine as part of the core implementation include applicant(s) contact information, applicant employment information, product(s) information, work in progress information, applicant account information, overdraft intent, and local data (e.g., credit bureau information).

The overdraft limit along with the business rules that apply are built within the Decision Engine. These rules will control the overall limit based on information from the other applicants in the application. These rules may also allow for spreading the overdraft limit across all products in the application.

As part of the Decision Engine response, an overdraft limit will be sent back to OH APe. OH APe will save this along with the rest of the product options. FE will send a message to OH APe to retrieve the overdraft limit to be shown to the customer.

In some embodiments, during Product Configuration, the overdraft limit will be displayed; the ability to display the overdraft limit to the customer will be handled with the Configuration ID. The overdraft field will be made editable to allow the primary applicant to select a lower overdraft amount. The Product Configuration screen will ensure the newly entered overdraft amount does not exceed the system generated amount. There will be validation to ensure that the credit limit be only whole numbers and end in a zero. FE will send a message to OH APe to save the new overdraft limit set by the customer.

In the case of a multi-party application, editing of the overdraft limit will only be applicable to the primary applicant, whereas for the non primary applicant this field will be read-only. If the product requires all applicants to be present for Decisioning, the overdraft limit will be made available when the last applicant has completed their journey. The overdraft amount will be communicated for a multi-party application in the Welcome Letter in this scenario. If desired by the customer, the adjustment of the overdraft will be performed as a servicing function.

In the absence of automated decisioning, the overdraft limit will be entered by the RM.

In order to apply the overdraft limit in the host system, an OH APe micro service will send the overdraft limit to the product system. The micro service will be triggered after the account has been boarded and an account number has been generated so that the association with the boarded product can be made.

Cross Sells. In some embodiments, cross sells originate from the FE and its interactions with the Sales Campaign Management component.

When the applicant selects the cross-sell option, a new application is created. FE will request OH APe service Create Referral Application, passing in pertinent information such as the application ID, product tracker ID, and applicant ID, if available. OH APe will copy all relevant customer data from the existing application to the new application, and attach applicant data to the new product tracker ID.

Milestone statuses will not be carried over from the original application to the cross-sell application; however, the field values underlying these 'statuses' will be carried over, such as the result of the VI step.

CMB Decisioning. Decisioning for CMB applications may, in some embodiments, be supported as a non-STP process and handled manually via Application Maintenance. The same may hold true for upsell/downsell, which may be handled by the RM manually.

FE will invoke the Decision Application macro at the end of initiator's journey. OH APe will make a determination that the Decisioning step is ready to commence by checking the GAD complete indicators against the internal "To-Do" table which governs which applicants are to be included in the decisioning process. When decisioning is indeed ready to begin, OH APe will create an application level work item and then immediately release all work items created at that point into QMS. (In the PFS model, work items configured to be held may be held until the Open Account macro is fired). At this time, the "Pend Decision" status will be in effect. This status will be captured and fed to OH BI.

Where an entity is ready to adopt automated decisioning for CMB, the interface to the decisioning engine can be leveraged and enhanced to support CMB data elements and decision rules (e.g., decision only certain roles). Where automated decisioning is available, the 'Decision All At Once' scenario will prevail, and decisioning will occur at the end of the application, once the last applicant's details are received. Decisions may be captured for the Business, applicant, or both.

In the Credit Card space, a company limit will be determined (by the Decision Engine, if available) based on the maximum exposure for which the company may qualify. Amendment to, or establishment of the company and individual limits may be addressed by the RM during the initial site visit, or through Account Servicing.

In the absence of automated decisioning, the company and individual limits will similarly be addressed by the RM/staff user as part of the site visit. The functionality to override company limits and apportion individual limits will be developed and integrated with application maintenance.

The individual credit limit of each cardholder can be defined up to the company limit; however, the total cumulative limit should not exceed the company limit. Validation will be performed by the Front End.

Any party to the application, whether 'applicant' or 'other account user' can be configured to go through a decisioning step, regardless of decisioning method (e.g., automated or manual). As described in connection with Roles, a To-Do will be set up corresponding to the 'role', which ultimately determines participation in decisioning. Similarly, being subject to a fraud or blacklist check is governed by the aforementioned To-Do's.

The preferred business process, according to some embodiments, is as follows. If the company or initiating applicant failed fraud/blacklist/SCC, the whole application is to be configured to fail. If a supplementary cardholder ('data only' type) failed fraud/blacklist/SCC, the application is to be configured to proceed.

Exemplary functional features of OH APe Decision Services, according to some embodiments of the invention, are listed in Table 4.

TABLE 4

| Functional Specifications - Decision Services |
| --- |
| Ability to suppress individual processing steps within decisioning |
| Offer Expiry Timeframe |
| Multi Applicant Decisioning |
| Funding, Fulfilment and Boarding can occur for each of the products in the bundle individually, per journey configuration. |
| Ability to present upsell and downsell offers to the user |
| Ability to check information across products held (existing customers) and multiple applications during decisioning |
| Multiple in-flight applications |
| Where there are multiple in-flight applications by the same applicant, ability for the system to pend the application prior to boarding (Decision engine). |
| Local Decision Engines should receive all the required data to ensure it can take care of decisioning for all products and in-flight applications. This requirement is only to pass the information to the DE for decisioning on the current application. The application that are currently in-flight will not be re-decisioned. |
| Ability for the local entity to define which of the above information needs to be recognized and passed along for decisioning. |
| The scope of applications covered in the duplicate application search includes all applications in APe where the application status is not declined/cancelled/completed |
| The checking for duplicate applications shall be applicable to all PFS and CMB applications and all products under the customer, no matter whether he/she is the main borrower, supplementary card applicant, co-applicant or third-party of the applications. |
| Ability to control the number of applications that can be in-flight at the same time. Business definable message displayed to customer/user and journey cannot continue. |
| Where decision on a product is required products are sent as items within a set to Decision Engine for individual decisioning. APe interprets the overall result to determine the overall "all or nothing" decision E.g. if one fails then the bundle fails. |
| There is a known gap which is that for each call, the Decision Engine is not aware of the other products in the bundle; e.g., for each subsequent call, ideally the received credit limit on the prior call should be passed |
| Funding, Fulfilment and Boarding can occur for each of the products in the bundle individually, per journey configuration. |
| APe will only release the products for boarding when all products in the bundle have been issued the OpenAccount( ) instruction |
| If there is a work item on a product within a bundle APe will board the other accounts within the bundle. APe should wait until the work item is fixed and board in an "all or nothing" fashion |
| A Bundled product should be treated as a single product in the AO FE and APe system |
| The rationale behind a bundled product is "all or nothing" |
| Users should be able to specify whether the entire bundled product is for a sole applicant or for joint applicants |
| Where a joint applicant is selected, it applies to products within the bundle that allow joint owners. For products within a bundle that do not allow joint applicants (e.g., Credit Card), the primary applicant owns the specific product in the bundle, whereas the secondary applicants will be added as authorized users where appropriate (e.g., Credit Card in a bundled product is owned by the primary applicant, the secondary applicants are considered as additional card holders). Ability for business to configure for each product within a bundle whether the product (1) can be opened jointly; (2) allow additional authorized users (e.g., cardholders) |
| Since a bundled product is considered as a single product from AO FE and APe perspective, the location of the joint/sole selector shall conform to whatever is applicable to a sole product journey |
| Decisioning is to take place on the entire bundled product level when all the applicants have completed their journey. Where a product within a bundle is declined, the entire bundled is considered declined |
| Decisioning needs to take credit exposure into consideration for all the products within the bundled that the applicants are applying for |

TABLE 4-continued

Functional Specifications - Decision Services

System has the ability to capture the essential data such as application information and product attributes
System has the ability to call out to an external system to collect additional data.
Provide a "Core" set of data elements that will be feed to the Decision Engine
The "Core" set of data elements should be configurable.
System to return the appropriate product offering based on the essential data captured.
Ability to begin the Account Opening journey for the product offered.
System need to provide the mechanism to store the results returned from a Blacklist system.
System need to have the ability to connect any Blacklist database.
Once the data has been collected from the Blacklist system, OH APe will need to perform (trigger) several actions that are configurable - e.g., feed to the Decision Engine, trigger a queue item, an action to the AO FE, send a communication, kill the application, etc.
ABILITY TO CONFIGURE SYSTEM BEHAVIOR WHEN AN APPLICANT IS ON A BLACKLIST (OR OTHER LIST)
Ability to use "Roles"

Application Processing Host Services

Contact History. Contact History is a feature in sales systems to track contacts with the customer. Account Opening should update this history for occurrences of Customer Contact or Events such as application status changes, lead generation/maintenance and sent communication.

Contact History is defined by the business as the sales or leads-related contact activity, such as 'customer contacts' and 'events' that are logged for onward use by customer relationship management systems to synchronize sales activity. 'Customer contact' describes a communication event within a conversation between the Financial Institution and another individual (such as a customer or potential customer), whereas an 'Event' includes communications, accounting and maintenance transactions as well as posting entries.

The OH APe's Update Contact History subservice is built with One HSBC Sales Services (OHSS) interfaces, which can be triggered under the respective macro services as configured for the region or entity. If the implementing local region chooses to utilize an alternate customer relationship management product, it may need to develop adaptor software to integrate the alternate product with the OHSS interface which would be incorporated during local implementation. In short, OH APe provides the framework to create entries to OHSS or any equivalent system, but may require regional work.

Figure 13:
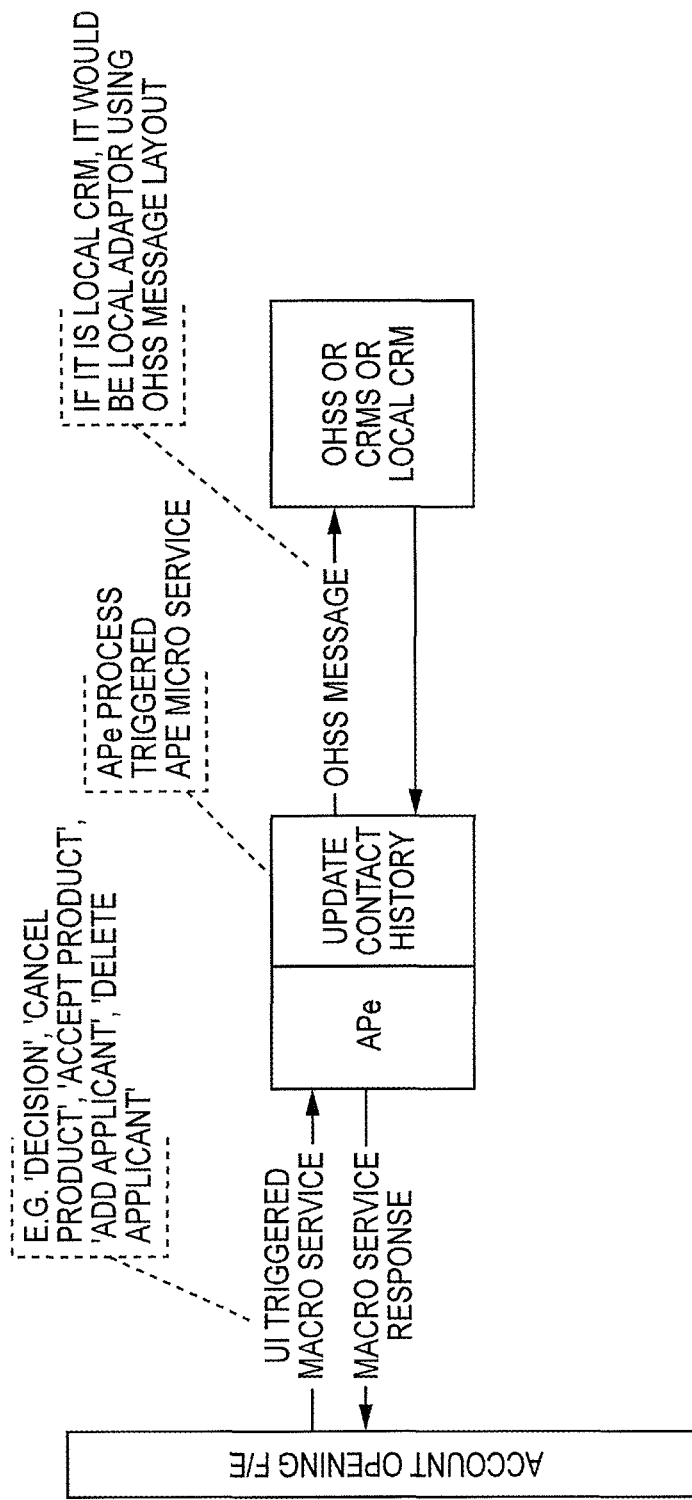
FIG. 13 illustrates an Update Contact History service, according to some embodiments.

Update Contact History, if employed, will be triggered for each applicant and for each product that the applicant has applied for. For example, if an applicant applied for three products under one application ID, three 'Update Contact History' requests would be sent to OHSS at each product event. For a Bundle product, 'Update Contact History' would be triggered for each product within the bundle. A schematic of Update Contact History is shown in FIG. 13.

In some embodiments, OH APe does not store any lead information such as lead ID or lead status. Lead information would be managed by OHSS or the local customer relationship management system. Lead generation event is not determined by OH APe, it would be decided by OHSS or the local Customer Relationship Management system (CRMS) based on one or more of the following OH APe events: an AO application is initiated; a change in any of the product status that is being applied for within an AO application occurs; a change occurs in the products being applied for, including changes as a result of decisioning, or accepting any up-sell or downsell offers.

"New to bank" (NTB) applicants are preferably not subject to Update Contact History events processing until after the account has been boarded.

Contact History is differentiated from "Communications History" and "Actions History". The former is maintained by ICCM. The latter is held within OH APe, defined as entries generated during the business process lifecycle used mainly by agents to see the history of who (customer, agent, system) and what (the route and key steps that had been taken through the business journey to reach the current status) happened through the journey over time.

Customer Data. OH CDM is the Group standard system for managing involved party data. It provides a complete view of a person's or company's relationships with the bank.

The system provides the framework to use OH CDM or HUB as the base of customer data, but existing local customer profile hosts can be integrated to AO by local integration effort. Table 5 gives high level descriptions of exemplary interactions between OH APe and the Customer Data Management (CDM) System.

TABLE 5

| OH APe Process | Customer Data Management System Services Consumed |
| --- | --- |
| Send CIN # and Retrieve IP Details and update OH APe database | Retrieve IP Details |
| Retrieve data from OH APe tables and send request to CDM for updates | Record IP Details |
| Send T&C acceptance, T & C template version, Date and Time when user accepted T & C, and a flag which tells whether it is UTC (Universal Terms & Conditions) or not | Record IP Details (T&C) |
| Link customer to account | Record Product Arrangement |
| Link application to customer | Record Product Arrangement |
| Record EBN, IB and PB flags per applicant/Assign Portfolio | Record IP Details |

For applications submitted by new-to-bank customers (or on their behalf by Call Center staff), APe determines when it is appropriate to create a customer record in CDM. Preferably no customer records are created on the local host customer systems until time of account boarding. Information on existing customers can be provided to APe as part of the application details.

The process to link the application to an existing customer supports customer contact search against OH CDM within the Staff Channel workstream. This process accomplishes the task of communicating any new application IDs that are in play for an existing customer of the bank. This micro service Link Application to Customer can be configured to be triggered within the Add Involved Party macro, or within the Update Applicant macro that is requested for a non primary applicant.

For NTB, the creation of CIN is traditionally created within the Open Account macro. An entity may wish to move this earlier in the journey and have the CIN available sooner as well. In this case, the process to link the application to the 'customer' may also occur for NTB, which would then be configured to be called within the Process Applicant service.

In both cases, OH APe will communicate the application ID to OH CDM and set an 'active' status for the application.

When all the products associated with an application reach final status and application status is changed to inactive, such as within the services Decision Application, Open Account, Decline Offer, Decline T&C, the same micro service Link Application to Customer will be executed to update the application status to 'inactive' in OH CDM.

In some embodiments, the following will be applicable to CMB. At the appropriately configured point in the business process (e.g., following manual review, just prior to boarding), company and applicant data captured during the journey and stored in OH APe will be sent to the customer master system via locally replaceable API's. OH APe will send CMB profile component data records to:

- Create Company—message to create company (account owner entity) using the Record Involved Party Details.
- Create Individual—existing Record Involved Party message will be enhanced with CMB specific data fields such as portfolio and owning branch (portfolio ID being at the company level). Involved Party Role will be used to determine which parties are linked to the Company record. This association is configurable within OH APe.
- Link Individual to Company—message(s) developed to link any applicant or involved party to the company (e.g., to record that John plays the role of a director in Company XYZ) using Record Customer Stakeholder Role Details, Record Customer Consultant Role Details, and Record Customer Contact Role Details, where applicable. Such linking will be entity configured by role, in OH APe, for all IPs, including those classified as "unauthorized users"/supplementary cardholders or "other account users", per entity configuration.

In addition to the above, messages to retrieve IP details may be employed as well.

HUB Integration. HUB Integration, also known as 'Direct to Site' (DTS), will provide an alternative interface to HUB that provides the necessary flexibility required for those countries who do not utilize OH CDM. The following sections are specific to HUB.

OH APe provides sub-services to invoke additional services provided by HUB. Some of the DTS integrations will require additional data to be supplied by FE and saved in the OH APe databases. Current messages may be impacted by new data, such as the addition of CDM address discriminators. Exception situations could require manual follow up and consequently the use of QMS which may need the addition of new queues.

The CDM-specific micro service developed within the AO core process will allow the service to interface with either CDM or HUB as required by the product in play.

(1) Duplicate Customer Checking: When boarding a customer there needs to be a mechanism to ensure multiple involved party records are not created. The duplicate check is preferably available at any point in the process for NTB customers. OH APe will invoke the process for the applicants that are configured to do so, via the internal "To-Do" defined at the applicant level.

The Identify Involved Party Summary message will be used to consume the duplicate check service. HUB will return the results of the duplicate check to OH APe where that data will be stored and become accessible to the decision engine. For PFS, an exact match is identified as the same ID value (e.g., passport number) and the same last name. A potential match occurs where the last name and first names are identical. For CMB, an exact match is identified as the same Business ID value and ID type such as Business registration number. A potential match occurs where the registered business name is identical.

In the case of an exact match the customer boarding will fail. In the case of a suspected match the customer boarding will proceed.

For CMB, in the absence of a decision engine, a local exit from OH APe will allow a regional entity to process the duplicate check scores coming from the HUB service. The response back from the exit point would be Reason Codes which would then allow OH APe to react accordingly. The reason code(s) are configured to effect the creation of a work item, for the exact match result as well as the partial match result. In terms of business process, for both cases the RM should manually intervene to either fail the application or continue on since this is a non STP scenario.

(2) Blacklist Checking: In some embodiments, blacklist checking is a requirement in AO and the results should be made available to the decisioning process. One or more of the following lists may be required for checking: Politically Exposed Parties (PEP), UN Sanction List, US OFAC list, Terror list, Local lists.

OH APe may provide an additional service consumer for the HUB Blacklist which covers all lists except the US OFAC list and PEP list. A weekly WOLF scan within HUB will access the OFAC list but does not cover the PEP list. The additional list for PEP will preferably be added in to the feed from WOLF.

The additional service consumer can be configured in the AO process to invoke the HUB service for all applicants, including supplementary card holders, as well as the Business, in the case of a CMB application. The result of the blacklist check will be stored in OH APe so that it is accessible to the decision engine. Each region/site will need to configure the decision engine to process an application based on these results. In the case of CMB, in the absence of a decision engine a local exit will allow a regional entity to process the results from the blacklist check. The response would be a Reason Code which would then allow OH APe to react accordingly. The reason code(s) would be configured to effect the creation of a work item. The RM will have to manually intervene since this is a non-STP scenario.

(3) Product Data Selection: The channel can display product data to support product configuration and rendering of T&Cs. The data to support this varies by product. For CMB, recording of T&C acceptance may be on the company level as well as the company delegate level. In both cases, recording will include company customer number; however, in the case of the delegate, additional details (e.g., delegate ID and ID type) may be needed for recording.

HUB has provided OH APe with the Retrieve Deposit Rate message. OH APe will populate this message to HUB in order to retrieve the deposit interest rate for TD accounts in the HUB response. The timing of this message will be configurable by the Business. OH APe will execute the message whenever it is initiated by the FE.

(4) Derivation of GHO Classification & Market Sector code: In some embodiments, Group Head Office (GHO) Classification and Market Sector Codes (MSCs) are mandatory fields used in OH CB when creating new customer records. These values impact other data within HUB and are essential for ongoing servicing and marketing on a customer.

For existing customers opening new accounts the values will not be changed automatically through AO.

MSC code will be defaulted by OH APe based on the values of Line of Business and IP Segment sent in from the Channel. This data will be moved to MSC1 and MSC2 respectively. If values for all MSC codes have not been set prior to customer boarding, OH APe will pull the MSC values from an OH APe table. Values will be entered on the table based on Journey ID.

Where the GHOs do not have values at the point of sending the customer boarding instruction then the values will be derived by OH APe and populated to the boarding message. Values will be entity configurable and based on product type. OH APe will provide local exit points for regional extension of derivation logic. OH APe will not override any existing values.

(5) Prospect Record, Contact History and Lead Creation: To create prospects in the AO journey, when an incomplete application is ready to be purged from OH APe during the batch house-keeping schedule, a record will be written to a file where each record contains sufficient data to create a prospect and lead in CRMS. The file will preferably be in the format used to load third party prospects and leads as supported by CRMS. Upon completion of the file OH APe will systematically forward the file to CRMS.

The file will contain data, obtained from the OH APe data store, to include the staff member who is responsible for acquiring the lead. For CMB applications, the Primary Business contact information will be included in the file. If the lead is a result of self service through the internet then a default value will need to be assigned and configured in CRMS. An incomplete application will be added to the file if the applicant has completed and accepted the gather data step, and where the application includes a product type identified in a configurable list (e.g., a premier product).

(6) Internet Banking Registration: New to bank customers need to be able to register for internet banking A customer may register instantly upon completing the AO process, or they may choose to register later. For instant registration when an applicant has completed the internet journey but has not achieved STP boarding they will be given a link to take them to 2G registration.

Upon successful 2G credential creation the GUID, Username and Applicant and Application ID will be passed to OH APe. This data will be stored until the customer and accounts are boarded, at which time OH APe will pass the data in the IBconfig linking message to HUB to complete the internet banking registration.

(7) Extracted Performance Data from HUB: Additional information about the customer and their relationship with the bank may be required to support more advanced decisioning rules in the decisioning system. This data may include, for example, involved party details, sanction lists and derogatory behavior, deposit, loan and cards account performance. OH APe will provide three sub-services to invoke the Cards, HUB Deposits and HUB Lending systems to extract the data required and make it available to be passed into the decision service.

(8) Special Category Customer: The system supports the ability to fulfill Special Category Customer checks (SCC). The check is fulfilled against the SCC records stored in HUB in which the association is keyed against customer number. The system has the ability to carry out SCC checks at any point within the journey, providing an interface to HUB which supports checks against the business entity as well as individuals, as configured by the Business via the OH APe internal "To-Do" for this process, defined at the applicant level.

The SCC check may be performed for an existing customer. For NTB, the prescribed process is to invoke the duplicate check service. In the case of a partial match result, OH APe will invoke the SCC check service for each customer returned from the partial match result set. If there is a match on the SCC database, OH APe will create an work flow entry for manual follow up.

(9) Minimum Balance Requirement: AO preferably includes system logic to detect sufficient credit balance in the account being opened before triggering the fulfilment of check book ordering and the issuance of internet banking tokens. The minimum balance validation is preferably handled by a manual process as part of the RM's review of the application at hand. If the entity chooses to utilize the To-Do configuration within OH APe, the boarding of the account will be stopped if the systematic "to-do" has not been closed by the RM.

Funding. Within the proposed AO process there may be a need to execute transactions for the purpose of funding new accounts. For example, the applicant may need to move money to a new Savings Account, pay a fee for the account being opened (e.g., credit card application fees), or to transfer a balance from an existing lending facility (e.g., to pay off an existing store card from a newly opened credit card). OH APe provides the ability to send funding instructions submitted by the FE, through OH APe, the Payment Processing Engine (PPE), and ultimately, to the target back office host system. In some embodiments of Account Opening, the Collect and Execute fees instruction by OH APe is not included. The entity host may collect fees through the new account; however, this is entity host processing. In some embodiments, balance transfer supports the capture of the balance transfer instruction, but the execution itself of the instruction is local integration work.

The Save and Execute message types, along with other aspects of the design of the AO FE and OH APe dictate how Funding Transactions are captured and executed. The FE advises APe whether funding transactions should be executed or saved, based on where funding is placed within the overall journey. FE invokes macro services, (e.g., Get, Save or Execute Funding) and macro services can invoke micro services (e.g., an Execute Funding Macro service could invoke an Execute Funding Micro Service to pass the instruction to the Payment Processing Engine, invoke an Execute Communications Micro service to send a communications request to ICCM etc.). The order in which Macro Services and Micro Services are executed is configurable.

In support of bundled products funding instructions will be captured and executed individually for each product within the bundle. Configuration will be limited to only allow collection for each product in the bundle and not on a bundled product level. Funding instructions will also be captured and executed individually for each product in a multiproduct scenario.

Cash and checks as a source of funds will rely upon existing cash and check systems and handling processes. PPE will not be involved in the processing of transactions involving cash and check, as the existing Teller functions will generate the transactions. Any funding with foreign currency should be converted to the currency of the new account prior to the deposit. With a cash or check transaction, where the funds will be brought to the branch by the customer at a later date, the application will be saved and the account opened but the funding step being marked as complete or pending is a configuration point, and applicable to products that can be opened with a zero balance. Communications can be sent to the customer by OH APe as a reminder of the customer's intent to fund the newly opened account. The funding milestone will be updated by the staff user at the time the customer does complete the deposit. Internal transfers for funding in this phase of AO can only be transacted from existing accounts. In some embodiments, funds cannot be transferred from accounts external to the bank.

When used to fund term deposits, APe specifies the source of funds as 'Cash' or 'Check' depending on the funding option used, and may send details of the member of staff originating the account opening as part of the TD account creation message. From this, SWH CB will determine the Till associated to the Staff ID, and will schedule the appropriate Till and GL entries to account for the deposit of funds. The member of staff should be assigned to a Till (or vice-versa) to be able to open a TD account. When the funding instruction is captured, the status should be marked pending. When staff indicates that boarding can proceed, then the funding can be marked complete.

When cash or check is used in the internet (or call center) channel, the customer can select their funding option (cash or check) and enter the amount (or be told the amount in the case of fees). The customer will be advised they need to come to a branch with the cash or check (or mail the check in). The item is then added to the 'To Do' list and the process is completed manually by the branch user.

OH APe is responsible for receiving the messages related to transaction processing from the FE and may then either save or execute the instruction as directed by the front end. Messages will be triggered per each funding instruction. OH APe will also be responsible for receiving transaction responses and status updates from PPE and responding to the AO FE (if the end user session is still active) and/or generating the appropriate requests to ICCM to initiate a customer communication (only for the Execute stream), and QMS to create workflow items, according to internal business logic. Interest rate and exchange rate are included in the communication where applicable. Actual funding figures, such as used exchange rate, and actual funding currencies, should be saved within OH APe, so that the appropriate summary screens can capture the information.

Transactions can be supported in all channels and executed as two different options, immediate funding or delayed funding.

Immediate funding means that the funding transaction can be fully completed after the end user confirms the funding request, and the success or failure of the transaction will be confirmed to the end user when the page reloads.

For funding via internal transfer to be immediate all of the criteria to complete the account opening have been met, and the account to be credited be open and able to receive the funds (or, in the case of TD's be able to opened in real time). 'Propose Funding' will call the Payments system (PPE) to inquire on a particular account the user is wishing to fund from. The required information should be passed back to the FE (Funding Review).

Delayed funding occurs when the funding transaction cannot be executed while the end user waits for a response to their transaction confirmation. The delay could be caused by the position of Funding in the journey, the incompleteness of other milestones, or as a result of the account boarding process not being in real time. In these cases there are two options:

The AO FE does not try to execute funding, and just Saves the transaction.

The AO FE tries to execute the transaction, but OH APe determines the transaction cannot be executed immediately. The Execute Funding request is rejected (having previously saved the transaction) and the FE confirms to the end user that it will subsequently be processed. Actual funding should only occur within the Open Account service.

Account Information Services (AIS) is a component within OH APe that will be used to get customer accounts. The solution delivered by the OH APe system is a modular design approach, configurable at the following levels:

Customer account list retrieval from the customer data management system

Collection of data from back end systems (OH Cards, HUB Core Banking, etc.)

Business process specific filtering of the data retrieved

AIS will be responsible for filtering and aggregating the necessary information from the customer data management systems and the product systems (e.g., OH Cards, HUB Core Banking) so that the required data is available for the AO system to present adequate information to AO users when they are entering funding instructions.

FE will send CIN and specified search criteria to AIS using the Get Funding Acct List service. AIS will invoke the customer data management system to retrieve a list of product arrangement records using the Retrieve IP Details interface. AIS will aggregate the list of funding sources and return the aggregated list to FE. Filtering capabilities include the suppression of accounts that are inactive, non-debitable, business specific types, or accounts that are not of the same currencies as that requested on the input message from the FE. AIS is also responsible for mapping the account data on the account list to a standard code set so that clients only need to recognize a single set of values.

Figure 14:
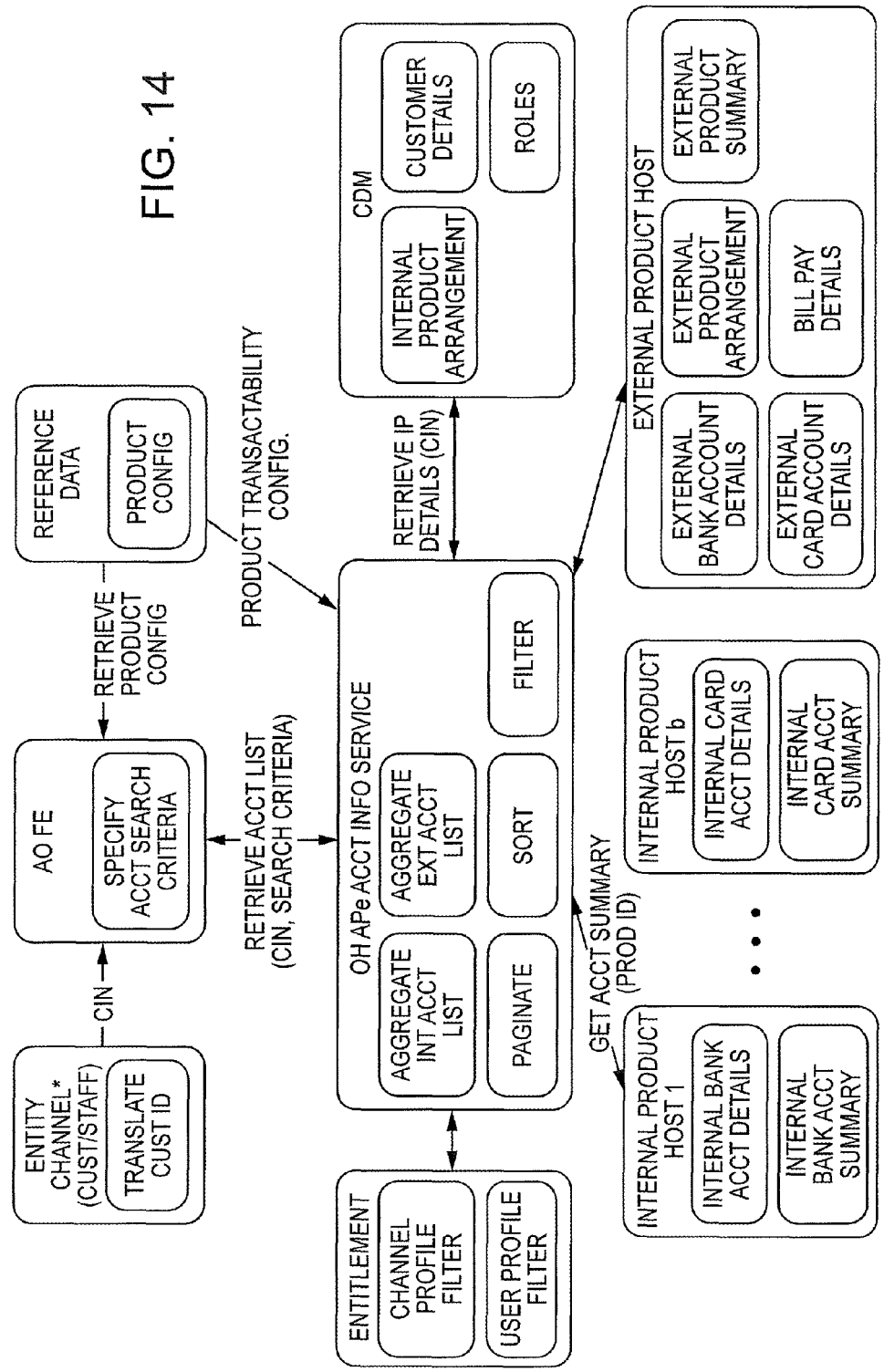
FIG. 14 shows an exemplary functional architecture for Account Opening (AO) Funding.
Figure 15:
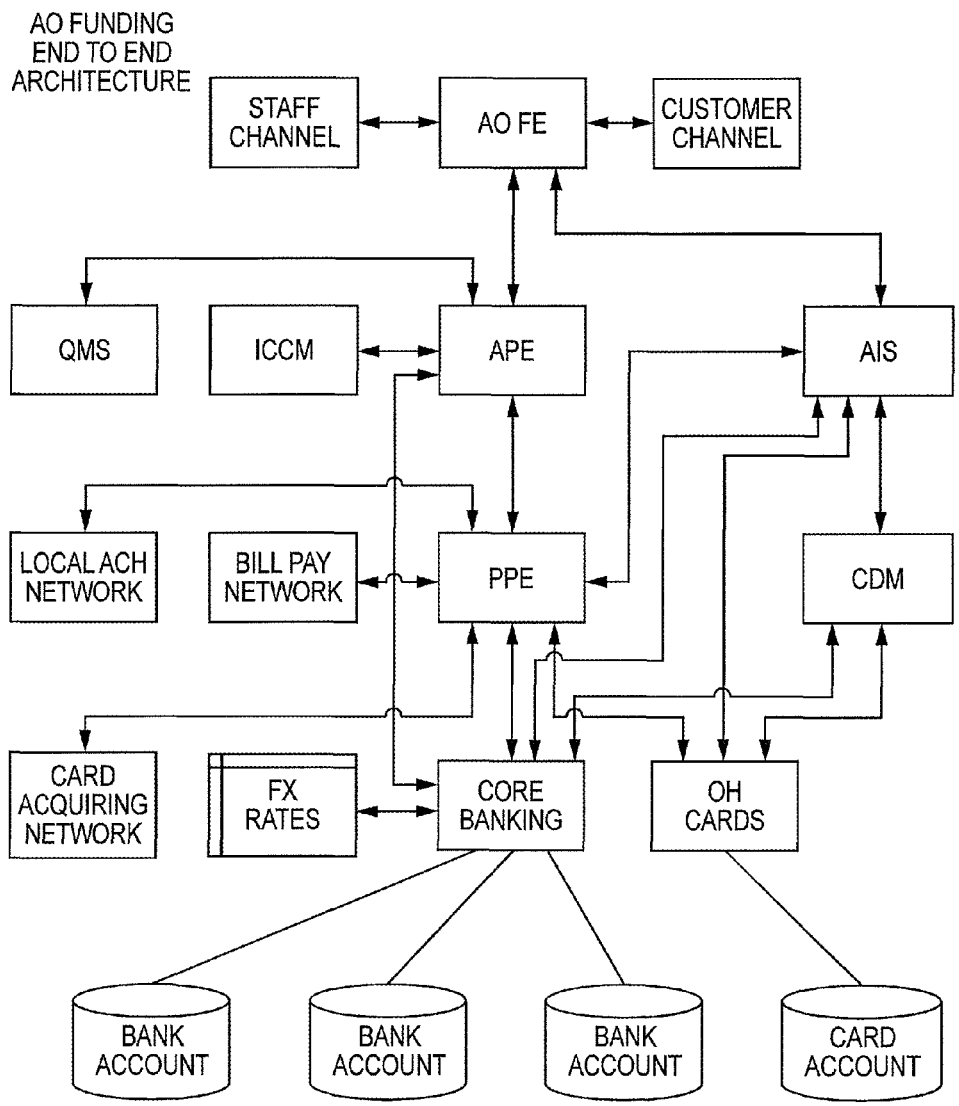
FIG. 15 is a diagram showing an exemplary end-to-end (E2E) architecture for AO Funding.

FIG. 14 shows a schematic of funding services. FIG. 15 is a diagram of the end to end flows for the different types of transactions to be supported by AO Funding.

Figure 16:
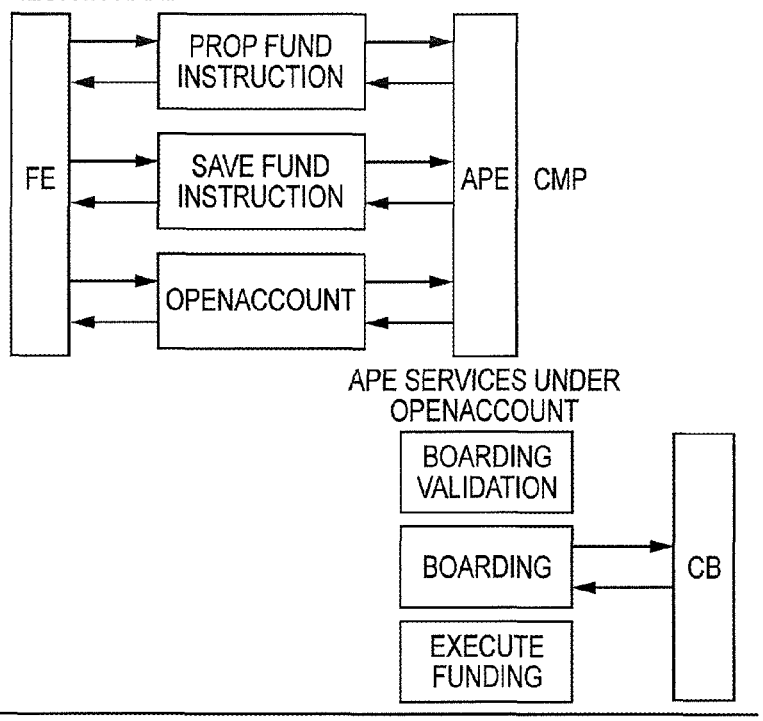
FIGS. 16-19 illustrate exemplary program flows for funding based on funding methods described in various embodiments of the invention.
Figure 16:
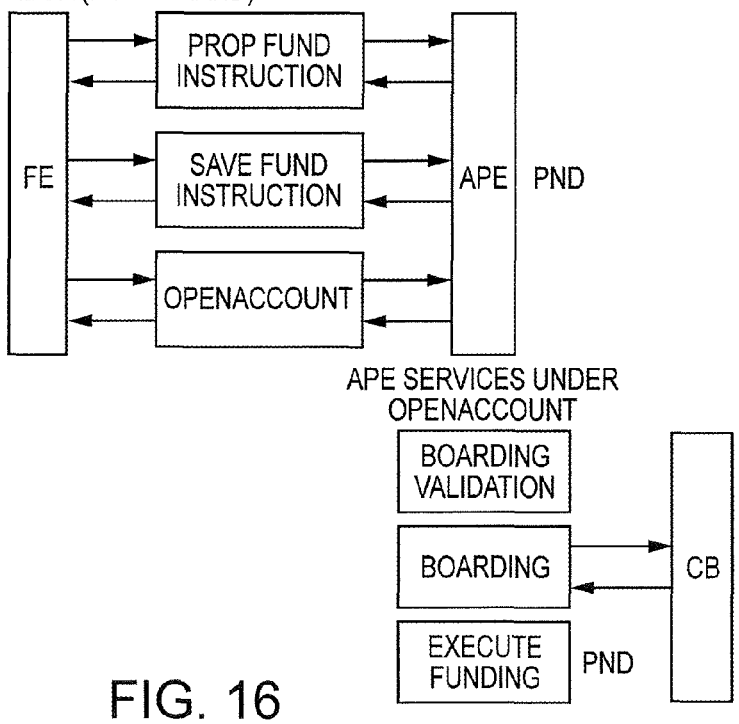
Figure 17:
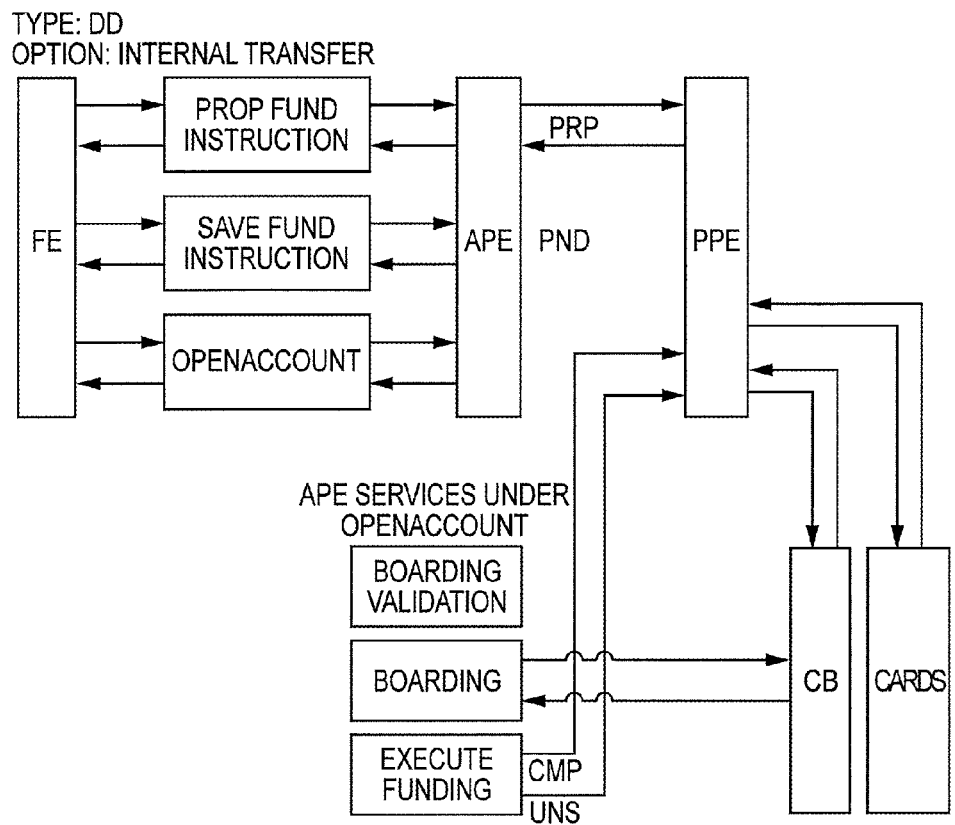
Figure 18:
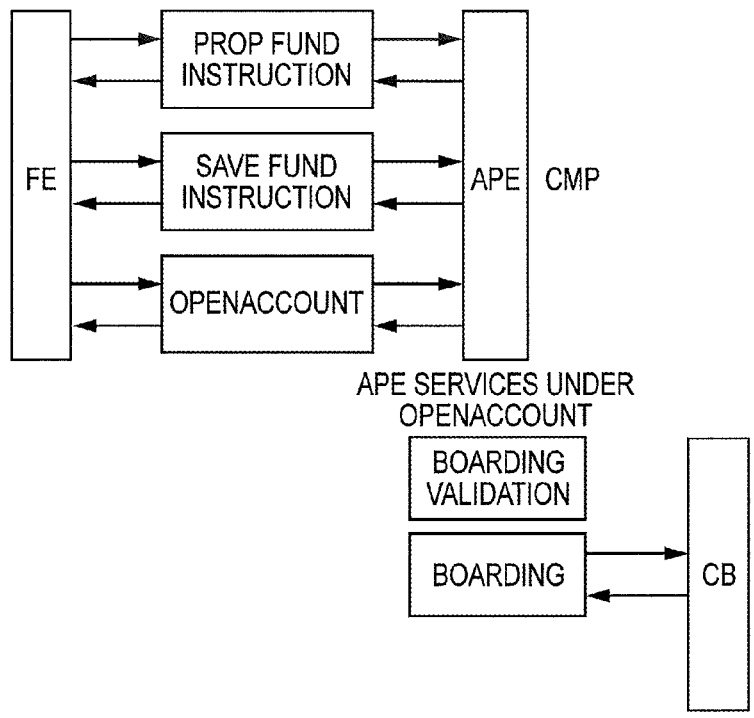
Figure 18:
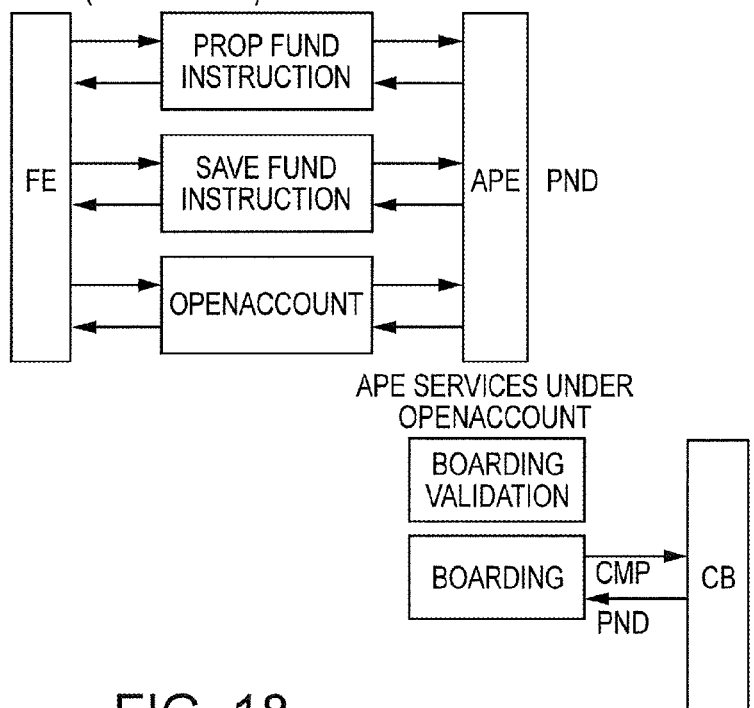
Figure 19:
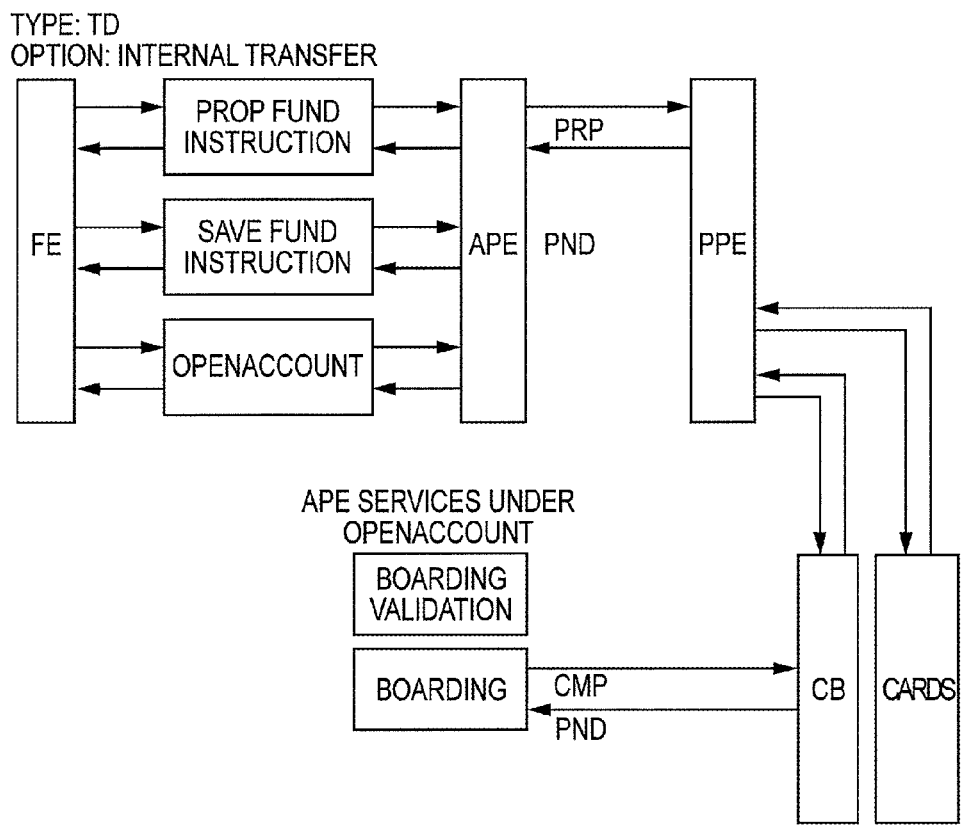

FIGS. 16-19 illustrate the program flows for funding based on the funding methods. FIG. 16 shows Direct Deposit Cash/Check Funding Methods, FIG. 17 shows an exemplary Direct Deposit Internal Transfer Funding Method, FIG. 18 shows an exemplary Time Deposit Cash/Check Funding Method, and FIG. 19 shows an exemplary Time Deposit Internal Transfer Funding Method.

Funding for CMB. In some embodiments, where full host integration is in place, execution for funding will follow the same process as provided in the AO Core framework, but will include the capture of the Contract Booking Number. This applies to Savings/Checking products as well as Term Deposits.

In scenarios without full host integration (e.g., boarding is manual), funding execution may be handled as an offline manual process, as follows. All references regarding transfer of funds are at the company level, not individual.

For Savings/Checking products:
The transfer of funds from the customer debit account to the new account will be invoked as a manual process outside of AO.

For Term Deposit products:
The transfer of funds from the customer debit account to the GL account can either be an AO process (as per entity configuration) or a manual process outside AO via servicing screens.

The transfer of funds from the GL account to the new account needs to be invoked as a manual process outside of AO via servicing screens.

Boarding to Product Systems. OH APe will provide standard messages to integrate to product systems. These interfaces will be implemented by SWH Core Banking and OH Cards to integrate with AO. Messages can be adapted regionally (e.g., outside of the OH APe layer) as per the host system requirements. Accounts may be opened to both Core Banking and Cards provider systems after the creation of a customer record in CDM. APe is responsible for linking these new accounts back to the customer's profile in CDM.

In some embodiments, OH APe will have a pre-boarding check module which performs the function of 'gatekeeper' in terms of determining whether or not an application, at the product level, is ready for boarding. One 'readiness' check relates to work items, which when present, are attached to the application at the product/applicant level. OH APe shall maintain a flag at the reason code level that will allow the system to determine if a work item that is present will prevent boarding or not. In other words, there exists the ability to configure 'severity level' for reason codes which will define if a condition would stop boarding or not. Those work items that do not prevent boarding may be maintained within a 'post boarding review' queue.

In addition, the system will consider the product type in play. Multiple products present in an application are treated independently in terms of assessment for readiness to board. One product that is 'ready' shall go ahead and board, independently of another product within the same application in play. However, if the product in play is a bundle, boarding will have to occur in an 'all or nothing' fashion, from a product perspective (not to be confused with a prior discussion on applicant level boarding).

The Front End will provide the ability to select the Bundle as a Sole or Multi product. If a Bundle is selected as a Multi Product and any product within the Bundle does not support Joint ownership, the secondary signers will be treated as supplementary applicants. The Front End will trigger the Open Account service for each product within the bundle. OH APe will maintain integrity of the bundle by waiting until all the products in the bundle have all open items cleared and ready to be boarded. When an exception occurs during boarding, OH APe shall manage the attempt to open the rest of the products within the bundle by means of creating a work item for those product system exceptions when boarding. For example, it is possible that in a bundle involving both SWH Core Banking and OH Cards, when one system is unavailable, boarding can still occur to the other product system.

Linking to a Debit Card: In some embodiments, OH Cards will receive debit card information from OH APe in four different fashions: new account and a new debit card, multiple accounts and a new debit card, new account and an existing debit card, multiple new accounts and an existing debit card. The requirement to link a new account to an existing debit card using the existing OH APe Service call Board Debit Card, shall enable the capture of Debit card information and passing of this to OH Cards, in a layout defined by them. In addition, functionality to link to an 'in-flight' debit card shall also be provided.

Figure 20:
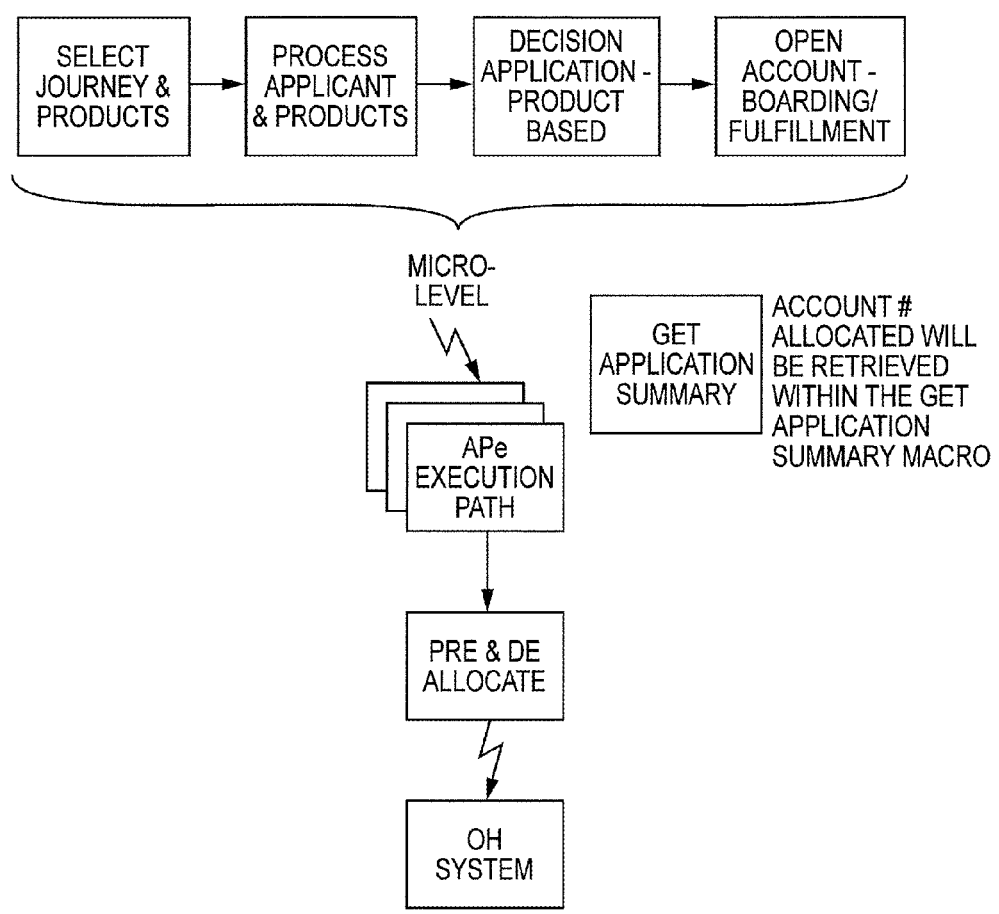
FIG. 20 is a diagram illustrating an exemplary Pre-Allocate and De-Allocate process.

Pre-Allocate/De-Allocate Account Numbers: In some embodiments, OH APe will consume SWH Core Banking services to pre-allocate, and de-allocate an account from a given pre-allocation of account numbers. This will apply to new customers only and only for the single applicant journey. Pre-Allocation will not work for a multi-applicant flow within HUB. The pre-allocation of account numbers is to support cases when an account cannot be boarded right away, such as when KYC or other regulatory practices have to be performed. Pre-allocated account numbers will allow the user to feel that they have completed a journey. Pre allocation of account numbers will not be supported for Credit Cards. The account number obtained from this service will be retained within OH APe. The Front End can obtain the pre-allocated account by executing the existing Get Application Summary Service, and display as necessary, within the AO journey. At boarding time, the pre-allocated account will be retrieved and sent to the respective servicing system. This functionality shall only be provided when supported by the local host system. De-Allocate sub-service will work in conjunction with Pre-Allocate. Entities will not configure one without the other. This new micro-service will be configured within the negative flows of AO (e.g., Cancel Application). The Pre-Allocate and De-Allocate process is shown in FIG. 20.

Figure 21:
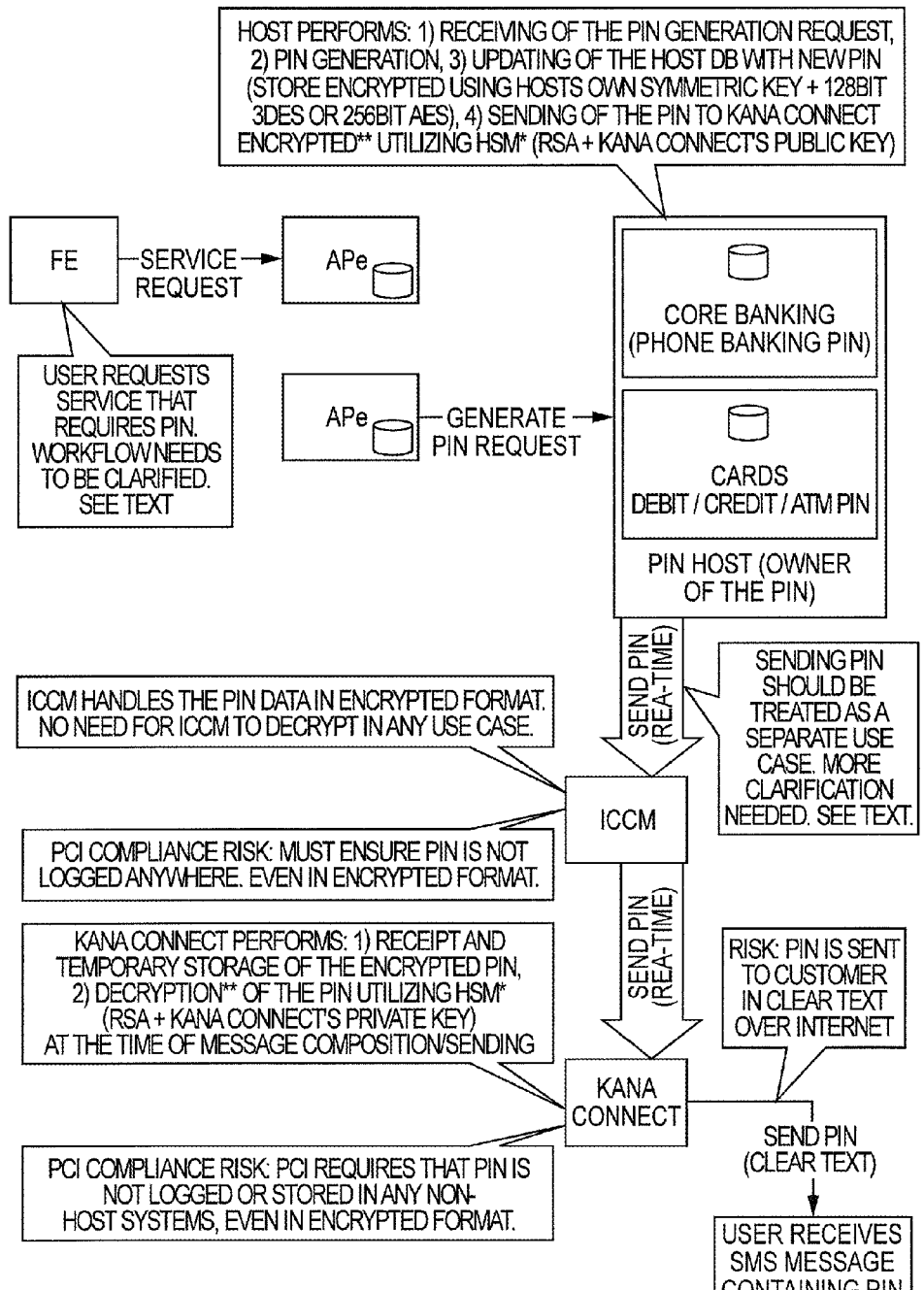
FIG. 21 is an exemplary schematic of an AO E2E Systems Interaction for Customer/Agent Request PIN.

PIN Generation: Account Opening allows users to set their PIN manually by entering it on-screen, or to request a new system generated PIN. There are two possible scenarios: (i) where the customer manually enters and sets their own PIN, and (ii) where the customer or agent requests the generation of a PIN by the system. In some embodiments, the customer entry of the PIN is not supported. FIG. 21 is a diagram showing AO E2E Systems Interaction when Customer/Agent Request PIN.

In some embodiments, the online generation or selection of PIN may require local work. OH APe will have the PIN fields available; however, local integration work may be required to further the process.

Boarding for CMB. Current boarding messages from OH APe to the Core Banking system for opening a PFS account (e.g., Savings, Checking, Term Deposits) will be reused to open a CMB deposit account.

For boarding a Corporate Card account, similar messages as those being used for opening a PFS account will be utilized, with the addition of fields to cover CMB details to establish the corporate record, and the corporate account. Other additional messages may be required to create the "relationship record", as well as linking the new corporate relationship record to the corporate account and to the individual cardholders to the corporate customer profile.

Fulfilment. OH APe shall build a Fulfilment Service that will handle the request for each product-specific fulfilment item within the process flow in play. For each fulfilment item, OH APe will post that request to the appropriate service provider, and record in OH APe the success or failure of the initiation of that fulfilment item. OH APe will initiate requests to SWH Core Banking and OH Cards for various fulfilment items/activities.

(1) PFS Related Fulfilment: OH APe will initiate requests to Core Banking for one or more of the following exemplary fulfilment items/activities: Check book ordering, PIB/BIB Configuration set up, account nickname set up, request debit card, phone banking configuration set up.

OH APe will initiate requests to OH Cards for one or more of the following exemplary fulfilment items/activities: debit card plastic and PIN, credit card plastic and PIN. In some embodiments, one or more of the following may be outside of OH APe scope: PIB/BIB Credential, OTP Token will be handled by BIB/PIB registration; phone banking credential will be handled by Core Banking Utilizing the role concept, access to applicant-level product options is given to role-players who are configured to have an AO journey.

(2) CMB Related Fulfilment: In the case of CMB, the 'initiator' is expected to be the one having access to product configuration and make appropriate selections, however the system is not limiting the capability. In other words, co-applicants may or may not be presented with applicant level options—this will be based on configuration of the roles matrix.

The initiator will specify for each co-applicant if the individual should receive fulfilment materials, or need access to Business Internet Banking, Phone Banking and ATM. This selection will automatically trigger delivery of fulfilment materials such as Internet banking PIN, Phone Banking PIN and Debit/ATM plastic.

For Business Internet Banking and Phone Banking, the assignment of a user's entitlements for the newly requested product is captured within the Entitlements section of the AO application. Similar to the functionality for PFS, if the company is found to be an existing subscriber, the new account will be auto-linked to IB or Phone Banking profile and the option will not be presented on the user interface. Assigning an individual by the initiator to receive fulfilment materials related to these options will automatically trigger delivery of these, such as PIN, etc. In the case of ATM and Debit cards, the initiator will be able to specify each co-applicant's withdrawal limit and other servicing functions applicable to ATM within the Entitlements section. For "Link to Existing Card" feature, FE will continue to aggregate existing debit cards retrieved from the customer data management system as well as in-flight applications within OH APe. However, the CIN used to query the customer system and OH APe will be the company CIN, not that of an individual role-player. The ATM PIN will be auto-generated therefore the user will not be required to request a PIN. In some embodiments, a user cannot link both PFS and CMB accounts to a CMB ATM card. CMB ATM cards can only be linked to other CMB accounts under the same customer number. CMB ATM card can never be linked to a PFS account.

Correspondence address will be configured at the company-level and can be selected per-product. If provided, it can be used as default address for sending fulfilment materials to the company. Billing level (possible values include Individual, Company and Both) will be captured by the FE. In some embodiments, this is a product-level option applicable to Credit Card products only. Billing date will be configured for each product in the host system. It will not require a user input at the FE.

In the case of DD products, statement information captured here applies at the product-level at the company level. In the case of credit card products, the statement information captured will apply to individual, company or both based on the billing level specified by the user.

Account Nickname option is applicable at the product-level and associated with the company. Only Initiator is expected to have access to Account Nickname. As in the functionality provided for PFS, Account Nickname can only be specified if the company is (a) an existing internet banking subscriber or (b) opts for Internet Banking within AO product configuration.

Record may also be provided by AO. It may, for example, be implemented as a simple yes/no indicator. The intent is captured from the user; however, in some embodiments there is no fulfilment supported. Other product level options for DD products include Overdraft Protection, Checkbook order, Term Deposit Customization and Maturity Instructions.

In the Credit Card space, the initiating applicant can specify which co-applicant will receive the card plastic provided that the total number of cards is within the allowable supplemental cardholder limit (e.g., eight for business card). The maximum number of cardholders will be a local internal product configuration in the Front End and implemented as a business rule.

In the scenario of a multi-product journey, the initiating applicant can associate each applicant to a specific card product being applied for.

The following are some card options that may be delivered as part of the core deliverable:
Company Level Card Options (affect all products under a company record)
Credit Line (Credit Limit)
Business Internet Banking, Business Phone Banking
Relationship Manager
Credit Protection
Correspondence Address
Product Level Card Options (affect the selected card product for all cardholders, but some can be overridden at the individual level)
Account Nickname
Credit Apportionment (Individual Credit Limit)
Secondary Cardholders
Billing Date
Billing Level (Centrally/Individually/Combined)
Business Name on Card
Credit Card PIN delivery option
Statement, Card and PIN Mailing Address (Company/Cardholder)
Individual Level Card Options (affects each individual cardholder, to be filled by initiator)
Name on Card (default name is pre-filled from Product Level)

To support various card products, different configuration files can be set up. For instance, a Centrally Billed Commercial Card product can be configured such that the Billing Level option is defaulted to "centrally" and the option of where to send the Statement is defaulted to the company's address for the initiating applicant. Both options can be configured to be read-only (not amendable).

Business Debit Card will be a provided as a product option to some deposit products for configuration at the Business level.

(3) RM Assignment: To assign a Relationship Manager (RM), the following exemplary process may be followed. For new applicants, initially there will be no value set for RM. However, for existing applicants, after the Add Involved Parties service is triggered, the Portfolio ID will be retrieved from the customer data management system and saved by OH APe. If there is no Portfolio ID defined in the customer profile, no value will be saved by OH APe. Before the display of the product options screen, FE will call Get Application Summary where Portfolio ID may contain a value. If Portfolio ID does not contain value (for new applicants and existing customers with no portfolio defined in their profile) the RM will be defaulted based on branch ID passed by the channel. FE will maintain a properties file with a list of branches and corresponding RM information.

For display of the RM product option, the following exemplary process may be followed. In the customer channel, for new and existing customers, no input field will be shown. In the staff channel, for new and existing customers with no RM defined in their profile, the staff can update the RM information. The input field will be shown based on entitlement policy or built as part of the journey. In the staff channel, for existing customers with RM defined in their profile, no input field will be shown.

FE will pass RM information to OH APe in Save Options message. During fulfilment, OH APe will invoke the Assign Portfolio Service and pass in the CIN and RM ID to the customer data management system. The RM information will be logged to BI. Ability for OH APe to send a communication to RM will be enabled per core capability of OH APe.

This functionality may not necessarily be used for CMB applications. However, should an entity choose to utilize this feature, this capability should be available.

Entity Data. In some embodiments, standard data contracts (for all FE-to-OH APe messages) will be supplemented by an extra 3000 characters of customizable data space.

For example:
ApplicantPersonalDetails data+3 k entity data extension
ApplicantEmploymentDetails data+3 k entity data extension
ApplicantContactDetails data+3 k entity data extension OH APe will automatically store and retrieve the 3000 characters of data for the entity. "Housekeeping" for entity extension data is preferably the responsibility of the entity (e.g., formatting, passing to downstream systems, validation). This strategy allows for customization and flexibility against the system without requiring a core OH APe release.

Exemplary functional features of Application Processing Host Services, according to some embodiments of the invention, are listed in Table 6.

TABLE 6

Functional Specifications - Application Processing Host Services

Card Linking
Storing of prospect information (Leads Mgmt tab)
Ability to board account with existing Workflow Items
Entities should have the ability to allow a user to select/generate a PIN via any method/channel they require.
The solution should be built with the flexibility to allow the business to be able to define different delivery methods per item.
Pre-allocation of account
Ability to log contact history information as the AO journey is progressed (Leads Mgmt tab)
Ability to extract information that is being logged to be made available to other systems either via real time logging to the CRM (e.g., OHSS) systems or batch extracts
Funding Instruction Capture and Execution
Cash & Check as Source of Funds
Internal Transfers - Funding Transactions
Internal Transfers - Application Fee Transactions
Account or Product Fees
Internal Transfer - Balance Transfer Transactions
Data Entity Description or Messaging Specification
Ability to Filter Accounts
Ability to Display the Necessary Information for Internal Funding Sources
Funding Bundled Products
Ability to collect information about the people within the applying company and pass that to host systems to create records
Information collected during an application will be used to systematically create all appropriate profiles/records/credentials in the applicable host systems, and link those together, Specifically;
customer record (the record of the company)
account record (the profile of actual product being opened, linked to the customer record, etc.)
user record (the appropriate applicants within the application [see Roles]). These records will be linked to the company record)
Internet Banking profiles and credentials (per applicant where applicable) at the company level, i.e. no Personal Internet Banking credentials will be created
ABILITY TO CAPTURE A CONTRACT BOOKING NUMBER
Ability to configure products
The initiating applicant can select to register for Record Check.
The initiating applicant can select a limit for each of the credit cards that will be issued
In a multiproduct journey, the ability for the Initiating Applicant to specify which applicants will be involved in the Card portion of the journey.
In a single product journey it is assumed that each Applicant will go through the journey.
Ability to nominate "Assigned Users" (same concept as supplementary card holder in PFS). This may be disabled by a Group Entity.
Ability for the Initiating Applicant to:
Input a "Total Credit Line" amount - a figure that will be shared between the applicants or assigned users
Apportion a Credit Limit amount to each Applicant or User (the total of all these amounts cannot be greater than the Total Credit Line
Ability for the Initiating Applicant to:
Select a Billing Date
Select a name on card for each cardholder
Select a Business name on the card. The default is the Trading Name (e.g., in the case of a Sole Trader say Mr Dean Campion T/As Fashion Goods, the card would be embossed with "Fashion Goods" as the Business Name)
Select if ATM access permissible and whether a PIN be should be issued Business Activity Monitoring OHBI Data and Reports. OH BI utilizes information provided by OH APe, FE, QMS and other sources to create different reports in order to enable the business to monitor and analyze the performance and activities on applications.

OH APe may, for example, create ten daily extract files and one hourly transaction log. The following sections summarize the data elements that are required to be extracted from the OH APe back end database to support OH BI needs.

OH APe Extract—Product Application Data Extraction. Product application data extraction contains product sale type, branch ID, number of applicant, etc. Product sale type allows OH BI to identify if the product being sold is part of the following: Up sell, down sell, Bundle, or Multi-product. Branch ID is the initial branch ID for the product application.

Product application data extraction also contains the business process indicator and the user journey indicator. These two indicators will allow OH BI to split all relevant metrics reporting by business process and user journey ID.

The tracking ID, voucher code and referrer details included in this file enables business to identify an opened account based on a tracking ID, voucher code, or a referrer code. Referrer code can also be used to count the number of sales based on 'referrers' including direct sales agents.

This extraction file also provides a field on current status of the product application. Exemplary valid status values include: STARTED, IN PROGRESS, APPROVED, DENIED, ACCEPTED, DECLINED, BOARDED, PEND BOARDING and CANCELLED.

In some embodiments, when the user journey is completed, the completed application status will be set to PEND BOARDING.

The STARTED and IN PROGRESS statuses allow business to differentiate "empty" applications from "started" applications. If an application's status is "STARTED", then it is considered as an "empty" application whereas if its status is IN PROGRESS then it is considered as a "started" application. Application will be in STARTED status and not moved to IN PROGRESS status till the product is selected when the pre-product selector process is in play. FE needs to ensure the calling of the proper macro service to change the status to IN PROGRESS once the user selects a product and starts the AO user journey.

OH APe—Product Applicant Data Extraction. Product applicant data extraction provides applicant status data such as GAD Started, T&Cs signed, decision status, etc. OH BI uses the decision status along with the additional information provided by OH APe—Work Item Data Extraction to distinguish between 'Full' approval (no work items arising from the decision), and 'Soft' approval (work items resulted from the decision).

This extraction file also provides a NTB (new to bank) indicator which allows OH BI to distinguish a NTB vs. Existing customer.

OH APe—Transaction Log. The transaction log provides an hourly progress report on an application. It includes a 'real-time' view of application activity that has happened within the current day.

In some embodiments, the OH APe transaction log includes staff ID, application ID, previous application status, new application status, override indicator, override reason code, etc. The override indicator tells OH BI whether a manual override happens on application or not. Based on this indicator, OH BI can avoid double counting the application on its report due to the status change. For example if a product application's previous status is "Pending", after re-decision runs, the product status changed to "Approved", then only the "Approved" will be shown as the final product application status.

The transaction log holds all the major events that happen on an application including two major events 'Accept Offer' and 'Accept T&C'. The transaction log provides the details on event name, date and description so OH BI can distinguish between "Accept Offer" and "Accept T&C".

OH APe—Product Configuration Data Extract. The product configuration data extract provides details on configuration ID, associated product and/or applicant level options selected for the respective application. OH BI will use these data to identify the configuration options selected by the customer/applicant.

OH APe—To-do Data Extract. OH BI needs to create reports to show applications that have not completed VI/VB, T&C, and Funding prerequisites. To-do items are created systematically for all the mandatory milestones (VI/VB, T&C, Funding, etc.) when applicants and products are added to the application.

The To-do data extract provides detailed To-do items associated with each milestone on each application. The extract includes application ID, product tracker ID, applicant identifier, milestone indicator, To-do code, To-do completion indicator, etc. If a milestone has multiple To-do items, then To-do completion indicator for that particular milestone will not be set to "Yes" until all of the To-do items are resolved. The applicant identifier in this extract enables reporting on To-do completion based on primary or non-primary applicant.

OH APe—QMS Data Extraction. The Business preferably has the ability to identify STP/non-STP and Unassisted/Assisted activity. To fulfill this requirement, QMS data log extracts application ID, reason code, work flow ID, work item type ID, work item status, milestone, etc. from the OH APe back end system. If an application has a work item in this log file, OH BI will then set this product application to NON-STP, otherwise it will set it to STP. OH BI will also look for the operator ID in the OH APe progress log; if the operator ID is blank then the product application will be set to 'unassisted', otherwise it will be set to 'assisted'.

The QMS extract also contains customer entity code. This field allows QMS to filter its report content based on customer group.

OH APe—Reason Lookup Data Extraction. The daily reason code data extraction may include, but is not limited to, QMS, decision codes, etc. A Business entity can configure the reason codes, descriptions and severity codes. If a new reason code is added to the source systems then the new reason code will be added into this file and loaded into the OH BI system so that OH BI is aware of the new code and its descriptions.

In some embodiments the OH APe back end logging functions may provide other extractions, for example:

OH APe—Application Data Extraction

OH APe—Resolution Lookup Data Extraction

OH APe—Funding Data Extraction

OH APe—Work Item Data Extraction

OH APe Progress Log

Exemplary functional features of OHBI Data and Metrics, according to some embodiments of the invention, are listed in Table 7.

TABLE 7

| Functional Specifications - Data and Metrics |
|---|
| Back end storage of unique IDs - CQ ID: Unique codes include the following:<br>1) Tracking ID: Code used to tie an application and/or service to a campaign in order to measure effectiveness. Invisible to a user.<br>2) Voucher code: Code used to provide customers with specific marketing incentives (e.g. pricing & gifts) related to an account and/or service. Customer enters/quotes a voucher code.<br>3) Referrer ID: Code used to identify sales based on this identifier which may be used to support counts of sales based on 'referres' including Direct Sales agents<br>The business require the ability to differentiate 'empty' applications from 'started' applications |

TABLE 7-continued

Functional Specifications - Data and Metrics

'Completed Application' should be defined as the 'Pend Board' status and this should be reflected in all data stored and relevant reports
Metrics account type changes 'Number of Applicants' has been introduced to the Dashboard report only.
Business Process and Flow ID
Pre-Product Selector A data item should be captured and stored illustrating any application that incorporated the pre-product selector.
Branch ID
Identify Products Need the ability to identify if the product being sold is part of the following: • Upsell• Downsell• Bundle• Multi-product
Queue (Real Time) Reporting QMS002 Filter based on Customer Group will be supported in QMS reports. This information is currently not available in QMS but will be obtained from APe and stored in QMS to support the report filter.
Application (Real Time) Reporting
Queue (Real Time) Reporting QMS001
Queue (Real Time) Reporting QMS003
Applicant status data needs to be available within BI for each Applicant (primary and non-primary(s)) within an application
Decision Statuses and Reason Codes need to be available within BI as generated by the 'Decision Application' service
It should be possible to distinguish between 'Full' approval (no work items arising from the decision), and 'Soft' approval (work items resulted from the decision)
'New to Bank'/Existing Customer
Status Progression -Need to avoid double counting as a result of status progression.
Accept Offer/T&C - Two separate key events are required to be logged by the front-end, namely:• 'Accept Offer' • 'Accept T&C'
Funding Status - In order to understand actual reasons for drop off funding status data will be required in BI at the Product Application level and need to be integrated into the funnel reports to illustrate where applications have not yet completed.
T&C Completion - In order to understand actual reasons for drop off then data will be required in BI to be integrated into the funnel reports to illustrate where applications have not yet completed acceptance of T&Cs.
Reason Codes & Descriptions Reason code data (including severity code where available) and associated descriptions should be available within BI.
Ensure data and reports are held in local time Non STP Processing/Queue Management To support longer acting account opening processes, as well as to enable human (and non-human) intervention with the AO application, integration with queue management is provided with Account Opening.

The rules to define when an application should be put into queue management services (QMS) are defined within APe. All required reason codes will be provided by APe in order that QMS can generate work items. All management of user groups, queues and work assignments internally with QMS will be defined by QMS.

Figure 22:
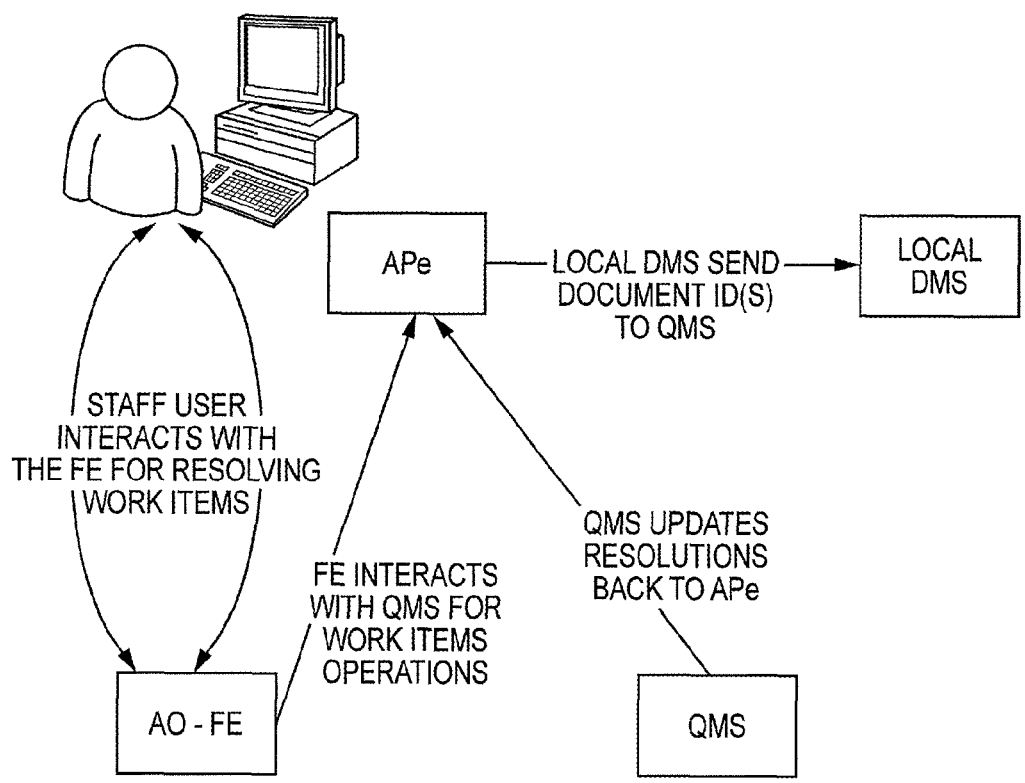
FIG. 22 is a an exemplary diagram of Non-STP Processing/Queue Management, according to some embodiments of the invention.

FIG. 22 shows a schematic of Non-STP Processing/Queue Management.

QMS and Application Maintenance. One of the main goals of Account Opening is to provide straight through processing (STP) which carries out the entire end-to-end process without any interruptions. Applications that fail to complete their journey in STP will be referred and will require manual intervention.

Queue Management System (QMS) has the ability to track events that requires staff users' intervention and is highly dependent on the availability of the various features of the application maintenance function to resolve work items so that an application can either proceed or terminate. QMS works closely with OH APe, and in some embodiments relies on some of the OH APe built-in functions and data elements to support its own functionalities.

Application maintenance is a function within Account Opening that enables back-office, branch and call center staff users to monitor and resolve work-items associated with customer's product and/or application(s). It also provides staff users the ability to update customer application data and override certain milestone statuses related to the application. An example is the ability to manually update the decision status.

(1) Application Data Retrieval: FE retrieves application information from OH APe and displays it on application maintenance screens. The application information is displayed by different categories: Personal Detail, Employment Detail, Product Configuration, Funding, Terms and Conditions, etc. OH APe provides an account boarding status indicator to FE. Based on this indicator, FE determines whether the product-centric fields (e.g., Product Configuration, Funding and Fulfilments) can be editable or not. For example: in a case of multiproduct application (e.g., two products on an application) if one of the products was boarded and work-items generated for the other product, then the application detail will be shown read only for the boarded product on application maintenance screens. However, the product-centric fields related to T&C, Funding, Fulfilment, Product Configuration options would remain editable for that in-progress product.

OH APe supports storage of local entity data (credit bureau scores, etc.) for re-decision. Entities define what data they want to store in the entity data table. Displaying of the local entity data on application maintenance screens may require local development.

Figure 23:
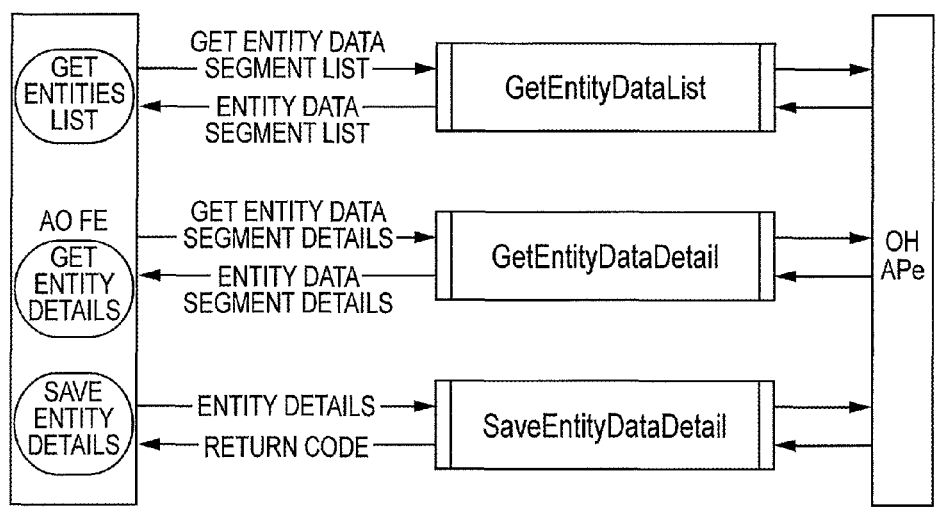
FIG. 23 is an exemplary diagram of Entity Data for Decision.

FIG. 23 shows a schematic of Entity Data for Decision.

(2) Application Data Update: Whenever application data is modified on application maintenance, the updated information will be saved. However, updating those "material fields" (the fields used to perform validate identity/validate business and are entity configurable) are preferably limited after validate identity/validate business is completed. OH APe provides validate identity status on the applicant (or the business, in the case of VB). Application maintenance will use this value (valid or invalid) to enable or disable those "material" fields.

Application maintenance allows capture of user notes during the application process and is stored in OH APe. OH APe passes the information in chronological order back to the FE so the user can review entries made to the application.

Whenever application data is updated and saved, OH APe can support automation to rerun functional macros (this may be an extension developed by local entity). In some embodiments, AO supports the automatic re-decision of the product/application. OH APe can re-decision the product if FE explicitly invokes this service. This means that when the staff makes changes to application data and submits, the system will only save the changes. Staff then needs to select to re-decision the application manually. All products with status Approved, Accepted and Pend boarded only will be re-decisioned. If it is approved, all T&C, funding and fulfilment status will remain as is. While there is a single button in the user interface for redecisioning, OH APe can support at the product/applicant level if FE passes the Product tracker ID.

(3) Application Data Archive: Entities have the ability to archive the application history and application notes for applications past the default 45-day purge date. However business has the flexibility to change the default purge value. Within OH APe, when an application is purged, all data related to that application will be purged, including the event tracking and application notes and saved to a historical database. If staff users want to create a report on data beyond the retention period, for example, an auditing report, an offline request should be submitted to HTS operations.

(4) Milestone Status Maintenance: An application overview screen allows staff users to maintain the milestone (Validate Identity/Validate Business and T&C) status. Once a To-Do is closed, OH APe will attempt to restart boarding, and allow the checks that are in place within the pre-boarding checks to perform its 'gatekeeper' function.

Staff users will not be able to update the milestone status if the customer is being assisted with completion of the application. OH APe tracks the user journey progress through an "end of journey" indicator. FE uses this indicator to disable the capability for entitled staff users updating the milestone status if the user journey is still in progress. No work-items will be displayed for 'in-progress' applications.

(5) Application Event Tracking OH APe captures major events that occurred on the application. These major events are, for example: APPLICATION STATUS CHANGED, PRODUCT STATUS CHANGED, VALIDATE IDENTITY STATUS CHANGED, USER GAD STARTED, ACCEPT TERMS AND CONDITIONS, ACCEPT PRODUCT OFFER, USER GAD COMPLETE, DECISION STATUS CHANGED, USER JOURNEY COMPLETE, PRODUCT REPLACED—UPSELL/DOWNSELL, and SENT FINAL ACTIVITY COMMUNICATION. OH APe provides event tracking at the service level which means if an entity chooses not to execute a milestone service then it will not appear in the event tracking log. Event tracker will log the time of the event, who invokes the service, and what milestone value is changed (both the old value and the new value). OH APe will pass the information in chronological order to the FE for users to view.

Figure 24:
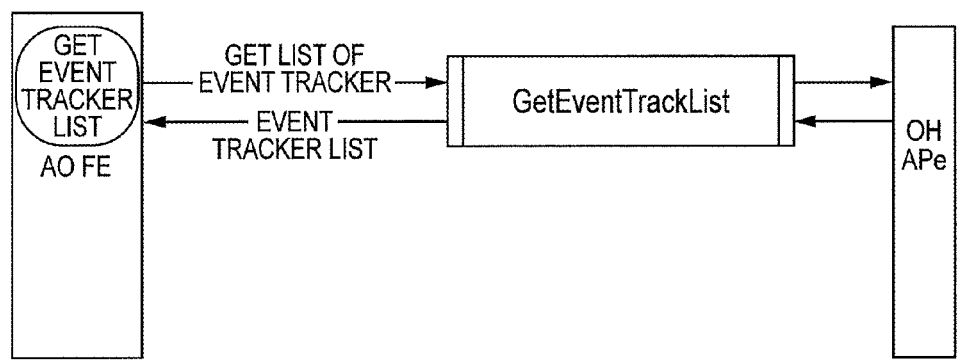
FIG. 24 is an exemplary diagram of Application Event Tracking.

FIG. 24 shows a schematic of Application Event Tracking (6) Create Work Item: Work item creation is triggered by OH APe based on predefined rules of process errors and reason codes. The business will create and define table entries for each reason code and key customer information. Reason codes will also have the appropriate indicator as to whether or not a work item should be created, and if so, what the priority is associated with that work item. Reason code entries shall be unique for a given combination of entity, OH APe service ID (macro) and OH APe sub-service ID (micro). This expands the use of any given reason code. For example, the implementation within a given region or entity for Decision Application will be associated with a specific set of reason codes for each outcome of each service invocation, while a different region or entity may define an entirely different set of reason codes.

OH APe tables will assist in ascertaining the need to create a work item and what priority to assign to the work item. Additionally, there will be work item parameters that will aid in determining the actions of OH APe. There will be a 'Hold Work Item' flag, which will be used to determine if the reason code should be held until end of journey or released immediately. There will also be a 'Stop Boarding flag' which will allow OH APe to determine if the work item should hold up the boarding process or not. In addition, there is information that will allow OH APe to determine what level the work item belongs to, applicant, product, or applicant product level.

When the journey ends, currently defined for PFS as when the Open Account macro service is called, the current micro service that does the pre-board check for open work items will check for reason codes held by OH APe, and their associated parameters before continuing on. If reason codes have been held, they may now be released to QMS. If this is a bundled product then the journey should be complete for all applicants and all products. If this is a single product, the journey should be complete for all applicants. For multiple products, the journey should be complete for all applicants for the product passed in, if so then release the work items for that product. In a multi product/multi applicant scenario, the "end of journey" definition would take into consideration the completion of journey for all products and all applicants. Each applicant in a multi-applicant application will have their own end of journey indicator.

In the case of CMB, a new sub service within the Decision Application macro service will exist which will enable the creation of an application-level "RM or Staff Review" work item. This work item (along with any other 'held' work item created thus far) will be held until all applicants that are configured to complete a journey have done so. A 'journey complete indicator' is received from the FE at the end of each applicant's journey. OH APe will match these received indicators against the internal To-Do for 'journey complete' for the applicants required to do so as determined by the Business.

The Business is responsible for mapping reason codes to the queues. When it is elected to set up a reason code to have the associated 'Stop Boarding Flag' set to a value of 'no' this would essentially have the work item belong to a category that would warrant special consideration. All 'milestones' would have been satisfied, except for maybe one work item being present which is set to allow the application to continue on to boarding. This is a special queue which the Business shall designate such that the Business Process that would surround the management and monitoring of items in this queue would take place after the account has been opened. Any necessary actions that would result from such monitoring would be a manual process and would be handled by the respective product system. An example would be the closing of the account that had just been opened as a result of the post booking review.

When a Create Work Item message is sent from OH APe, QMS will create the work items and map and forward the work item to the appropriate queue based on an internal mapping table.

The Front End provides the screens for the users to be able to retrieve and update the work item in the queues. For non-critical work items, staff user is able to update a work item status to 'closed'. The Front End will also capture the user action details as well as the work item resolution for a work item (this refers to the action itself as well as the notes associated with this), while QMS will store the captured information within the work item. QMS will also provide the support of a locking mechanism to prevent a single work item to be edited by more than one user at the same time.

(7) Work Item Resolution: After the work item resolution by the user is submitted to QMS, QMS will send a message to update the work item resolution status back to OH APe for each work item that is resolved. OH APe will re-run the service (if configured internally to be re-run after work item resolution), but only after all work items created by the service are resolved. In addition, OH APe will ensure that the Boarding service is restarted as well. If, as a result of a service re-run, a brand new reason code is generated that would warrant work item creation, OH APe shall immediately release the work item (e.g., the value of "Hold Work Item" shall not come into play). Similarly, if a reason code is generated that requires work item creation after end of journey is reached, the same rule shall apply. The same reason code will not be generated after subsequent service re-runs as OH APe performs a check that would prevent this from occurring.

Figure 25:
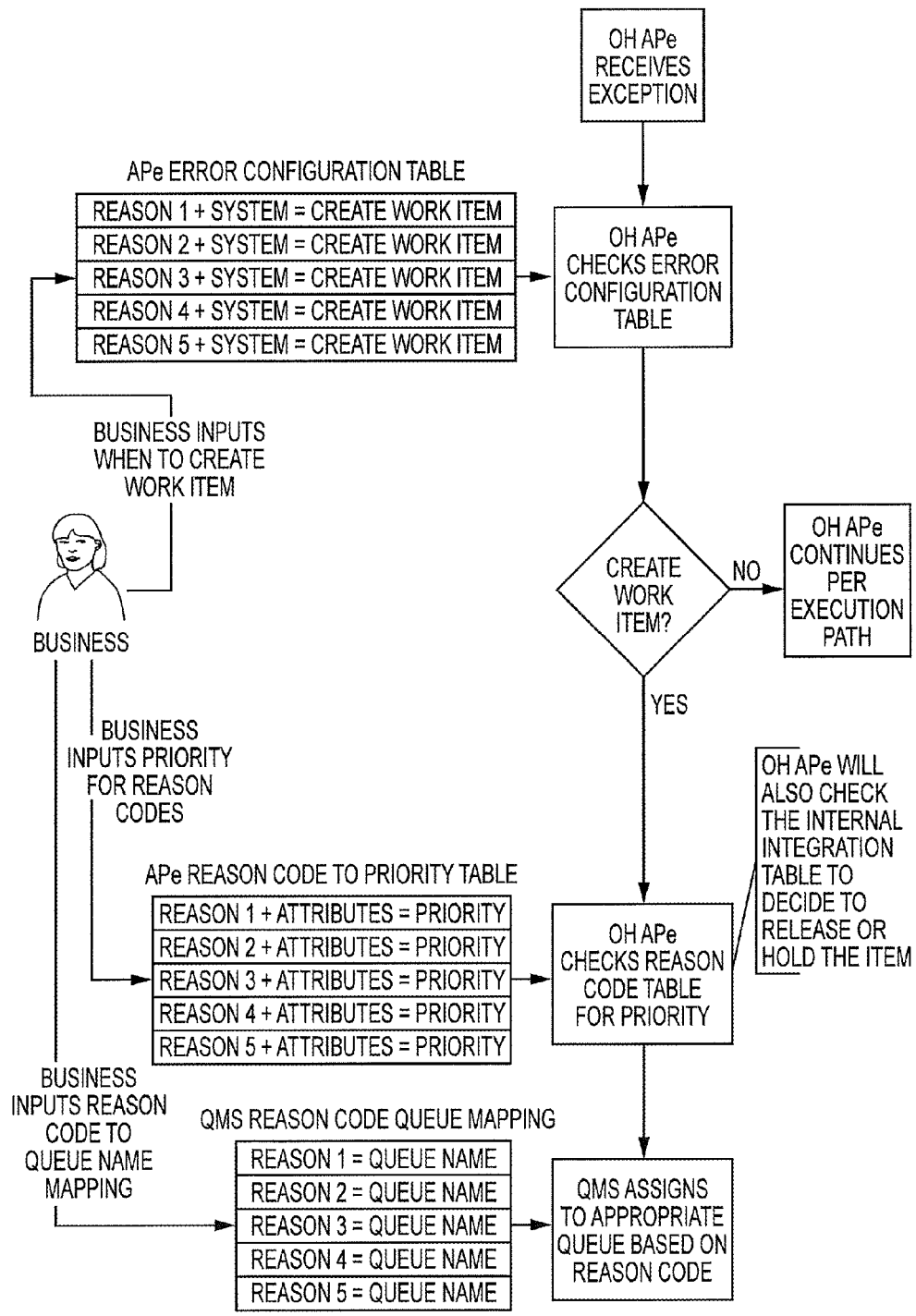
FIG. 25 is a diagram illustrating an exemplary Creation of Work Items process.

The following statuses are possible for a work item:
Open—ready to be worked on by staff
Pended—either systematically due to existing critical item or pended by an staff
Resolved—staff has resolved the work item successfully; this triggers a re-run of the related process
Failed—staff considers the work item failed (e.g., fraud work item failed); this should not re-trigger the re-run of related processes
Closed—when work items are systemically brought to completion When QMS sends OH APe a 'failed' status for any critical work item that is related to an applicant, for example 'failed' work item related to VI of an applicant, then all the products that applicant applied for, will be 'DENIED'. Whenever a product is denied, all work items related to that denied product will be marked as closed. The diagram in FIG. 25 outlines the creation of work items process.

(8) Close Work Item: When closing work items for a product, if this is the only product on the application, then the application level work items will be closed as well based on the product tracker ID passed in.

If there are other products on the application, and all products have reached some completion (a product status of denied, declined, or cancelled), then the application level work items also need to be closed and would be by the product tracker ID passed in. If the status is boarded or complete, no open work items would have existed for the applicant or that status would not have been reached.

For multi-product, before closing the applicant level work item, OH APe may check if the applicants for this 'to be cancelled product' have any open applicant level work items for products that are still open. If they do, then OH APe would not close the applicant level work items.

For CMB, there is an application level work item for which the following logic applies.

If the application level work item has a positive outcome (e.g., the RM is ready to close this as the decision to approve the application is impending): if there remain other work items, those are to remain open, and the RM will have to manually close those.

If the application level work item has a negative outcome (e.g., the RM is ready to close this as the decision to deny the application is impending): if there remain other work items, those are to be systematically closed and the system will deny all products within the application.

If a critical work item fails for an applicant, all other work items related to the applicant will be closed and all products related to that applicant will be denied. If the applicant is not attached to all products in the application, then the application level work item will remain open. If the applicant is attached to all products in the application, then the application level work item will be closed.

(9) On Screen Notification: When a work item is triggered, that staff may be notified on-screen via an appropriate message as they complete a journey on behalf of the customer. An advisory "error" code will be used to represent the triggering of work item. OH APe will return this advisory "error" code to the Front End. Front End will translate the "error" code to the appropriate message and display to the user as per the current error handling design. To disable such message, the corresponding error text for the reason code can be removed from the configuration file.

Prioritization, Escalation and Aging

The Business can assign a priority for each reason code, service ID, sub-service ID and customer key data. The Create Work Item message from OH APe to QMS will carry this priority information. The priority may, for example, be a two character field with the values 01-99. QMS will support priority levels within queues.

In the response to create a work item, QMS will return to OH APe whether this item was deemed critical. OH APe will store and use this value to analyze when a response to work items is received. When QMS sends OH APe a 'failed' status for any critical work item that is related to an applicant, for example 'failed' work item related to VI of an applicant, then all the products that applicant applied for, will be 'DENIED'.

The 'lower priority' items will only be processed after all 'critical priority' items.

The following describes the management of the prioritization, escalation and aging functionality that will be provided within AO. These are mostly QMS-owned responsibilities, or interactions between the Front End and QMS.

When work items for an application reside in different queues, the critical priority item will be in an 'open' status while the lower priority items will be in a 'pending' status. When the critical priority item is resolved, the 'pending' item will now be open. Older items may then appear ahead of newer higher priority items. Push to staff for work items associated with an application across queues may not be supported. If SLA monitoring is turned on, the urgency level attribute is also factored into the order of display. QMS provides a queue level attribute for SLA monitoring that is a time-based aging process. SLA monitoring is established at the queue level, and is not a dynamic setting.

This functionality employs an urgency attribute that will support up to five levels of urgency. The level of urgency is initially set to the lowest level. A threshold is defined for aging at each urgency level. Urgency level is escalated as each aging threshold is exceeded. If the last urgency threshold is exceeded, the work item may be moved to an escalation queue. The urgency level will also be displayed with the work item to allow the user to know where in the SLA monitoring the item is. It is possible that within the same queue, a lower priority item that has reached critical urgency level displayed before a higher priority item.

Additional functionality that would describe the management of work items by staff is described in connection with QMS Front End and Application Maintenance.

To-Do Items. To-do items are created systematically when applicants and products are added to the application. A To-do item will be first set to incomplete status, and marked complete when that milestone is completed.

The Business will have the ability to define which milestones To-Do items will be created for. They can set up and define the To-do items in the To-do configuration table. These To-do items may vary by entity based on regulatory issues, journey assembly for products, etc. as business entities will have the ability to define the To-do items that would correspond to "steps" that need to be completed specific to their own business needs.

Examples of To-do items include:
Pending validate identity(VI) documentation from customer
Pending internet banking registration
T&C acceptance is pending
Funding of the account is pending
Additional regional regulatory items for which To-Do items need to be created will be the responsibility of the local entity.

To-do items can be created within one of the following OH APe macro services: Create Application service and Add Involved Parties service.

Where appropriate, the applicant role (primary/secondary) will also be used to determine if a To-do item should be created. For example, there may be milestones that the secondary applicant may or may not be required to do.

During the application process, any To-do item that is created will be inserted into the OH APe To-do assignment table for tracking purposes. The list of To-do items and the descriptions of each will be presented on the Application Summary page as well as the Application Overview page.

During the life of the application, as the To-do items are completed by the customer, various OH APe services will be called to update the To-do items status and close the corresponding To-do items systematically.

Another example is in the case where the customer is presented Universal Terms & Conditions (UTC), the T&C milestone will automatically be marked as complete and the customer will not be presented the option to accept. Once closed, the To-do items will no longer be shown on the Application Overview page or the Application Summary page.

In some embodiments, there will only be four 'events' for which a systemic close of To Do's will occur in OH APe, upon completion. These are: valid VI, signed T&C, acceptance of Offer, and Funding completion. The Business may still define other events for which To Do's shall be created, however, they will need to be manually closed via the Front End.

To-do items are milestone related and are different than work items generated because of a break in the straight through processing. Within a predefined business process for a product, there are milestones or steps that are to be undertaken to complete the process which generates the To-do list upfront, either during Create Application or Add Involved Parties. If during the course of an applicant journey, some information that is required to complete the process is missing, a work item may be created. A To-do item cannot be a work item and are closed when a milestone systematically reaches final status. They can also be closed when a manual update to a milestone status is made via the Application Maintenance screen. The diagram below outlines the physical architecture of To-do configuration/assigned tables.

As the Account Opening business process for CMB in AO is largely supported by manual processes, AO will leverage the To-Do functionality. OH APe will generate the "RM Review" application level work item when a CMB application is first created. This will provide the required notification and enable the staff or relationship manager to "work" the queue in which the work item had been placed. The work item will have the "Stop Boarding" flag enabled.

In addition, the Business will have the ability to define various To-Do's at an applicant level, product level and at the applicant/product level, utilizing the Business Process Role as a differentiating factor in the To-Do items. For example, an applicant having a Stakeholder role may have a list of To-Do's different from an applicant having an Auditor role. Where the concept of To-Do had originally come about in order to manage 'milestones', with the introduction of multiple parties within an application each potentially playing varied 'roles of significance' from an account opening perspective, To-Do's can be said to allow OH APe to internally manage and understand what each of those parties need to complete and allow the application to move forward. As such the list of To-Do's have been expanded. This capability is not being limited to CMB applications; it is part of the OH APe framework. In the PFS world, reference to 'role' would simply take on a meaning of 'primary' or 'other' as an example.

The following is a sample list an entity may wish to enforce as configured To-Do's:
'VBVALID'—Governs the requirement that "Validate Business" be done
'VIVALID'—Governs which roles need to have the "Validate Identity" done
'BLKLIST'—Governs which roles have to go through a black list check
'FULLGAD'—Governs which roles need to have "full GAD" completed
'TCSIGNED'—Governs which roles need to sign or accept T&C's
'ACCTOAPP'—Governs which roles need to have access to the application (manages the creation of retrieval code)
'DECISION'—Governs which roles need to be decisioned
'OFFRACPTD'—Governs which roles need to accept the offer
'BRDACCT'—Governs which roles need to be boarded
'FUNDACCT'—Governs the requirement to fund the deposit account
'JRNYCMPL'—Governs which roles need to 'complete' the journey
'CDMBUSIP'—Governs which roles have to have a 'Business Involved Party' record created in the customer data management system
'CDMSTKRL'—Governs which roles have to have a 'Stakeholder' record created in the customer data management system
'CDMOTHRL'—Governs which roles have to have an 'Other Account User' record created in the customer data management system The following are the special "To-Do's" which will not be configured and will be created during the course of a CMB journey, as the initiator elects which applicants would be granted the corresponding option. OH APe will have the ability to dynamically turn "on" or "off" the option for the role as they are being selected:
'IBCNFG'—Internet banking applied to the elected role
'PBCNFG'—Phone banking applied to the elected role
'DBTCRD'—Debit Card applied to the elected role
'CRDCARD'—Credit Card applied to the elected role After the respective tasks are complete, the staff and/or Relationship Manager will need to close both the To-Do(s) and work item(s) via Application Maintenance in order for the product to be released to the servicing system. The release for boarding is preferably a deliberate action on the part of the RM or staff In summary, the business process that would potentially be observed by staff specific to CMB in a non STP application may be described by the following actions/tasks to be performed:

- Select the work item from the Work Queue corresponding to the application to be reviewed.
- Select the Application Maintenance link.
- Review the application information using Application Maintenance screens.
- Update the Decision Status (where automated decisioning does not exist). A decision will be captured for each Involved Party that takes part in decisioning, including the "Business". The capture of the decision is at the individual applicant level. OH APe possesses the knowledge via the "Decision To Do" which is defined at the applicant-product level. For each applicant that is required to be decisioned, OH APe will inform the FE so that the FE can expose the field for manual decision for the applicants requiring a decision to be captured.
- Perform other tasks where applicable, such as complete the VB/VI step(s), capture a wet signature, manual record funding completion, apportion the credit limit among involved parties for the card product, apply the overdraft limit at the company level for a deposit product, if desired, override the applicable interest rate for the product that has been selected, validate the contract booking number, and check for e-Mandate acceptance.
- Select the link to return to the Work Queue.
- Update the work item, thereby clearing it for the application.
- From Application Maintenance, close off the "RM Review To-do(s)".
- Select the option or button to explicitly release the application for boarding (which should be done per product). A systematically-invoked resumption of the application processing including the Open Account service will occur. The Open Account macro service will invoke a configurable set of (locally) interchangeable sub-services for pre-boarding, boarding and fulfilment processing according to the CMB product requirements.

Document ID Capture. In some embodiments, imaging system integration may be provided. Staff users will be able to add or remove a "Doc ID" at both Application level and Work Item level. This will be passed from the Front End and stored in OH APe. Local entity effort will be required for automatic update or delete in QMS or OH APe if a "Doc ID" is updated or removed at the local Document Management System.

Exemplary functional features of Queue Management, according to some embodiments of the invention, are listed in Table 8.

TABLE 8

| Functional Specifications - Queue Management |
|---|
| When an Account Opening application is submitted, APe may put an application in pending or 'approved with conditions' status while it waits for the completion of one or more "to-do" items. To-do items are created systematically where steps are incomplete in an application and requires action from the customer |
| The list of to-do items should be presented on the application summary page as well as the Application Overview page. |
| To-Do Items - Description: |
| Entities have the ability to define for which incomplete "steps" in a journey for which a "To-Do" items is to be created. These "To-do" items may vary by entity based on regulatory issues, journey assembly for products, etc. Examples of To-do items: |
| Pending VI documentation from customer |
| Pending Internet Banking Registration |
| T&C acceptance pending |
| Funding of account pending |
| To-Do Items - Description: |
| As the incomplete processes are completed by the customer/or validated to be completed by staff member via maintenance of step statuses, for example, the corresponding to-do items will be systematically closed by the system and will no longer be shown on the Application Overview page or the Application Summary page. |
| Application Data Maintenance - The ability to alter or otherwise update application data should be limited: data in the "material fields" should not usually be maintainable. These fields are not to be maintainable after validate identity is complete. Exceptions to this rule would include staff with appropriate entitlements to make these 'material changes' (e.g., staff members in fraud prevention who evaluate identity). |
| Material fields are defined as those fields used to perform Validate Identity. These fields are to be entity-configurable |
| Application Data Maintenance will be presented to users as tabbed pages, with fields grouped into categories) |
| Staff should be able to view data previously entered in the AO journey |
| Whenever application data is maintained and saved, the corresponding Macro services and other affected downstream services should be re-run by APe automatically. Entities should be able to configure which services are re-run automatically by APe and/or triggered manually by the staff |
| Application Step Status Maintenance: Staff requires the ability to maintain the step (aka "milestone") status. |
| The ability to maintain/override step status will be suppressed while staff is assisting customers with completing their applications (e.g., the staff should not be able to manually maintain step statuses before the end of the journey (e.g., Account Boarding service has been attempted) |
| Staff should have the ability to cancel an application |
| Ability to Re-run Processes |
| The system should be able to automatically re-decision a product/application where whenever application data is maintained and saved |
| Any existing data previously obtained (e.g., Credit Bureau scores) should be available for use when re-decisioning occurs |
| User Action History/Application Maintenance: System should have the ability to capture a log of major events (e.g., status change for a "milestone", submission of an application, decision rendered on a |

| TABLE 8-continued |
|---|
| Functional Specifications - Queue Management | product, account boarding, resolution of work items, etc.) These events may be triggered by applicants, staff, and system
The 'major events' that are captured and shown in the log should be entity-configurable
Staff requires the ability to capture AO applications notes on staff-facing screens (e.g., during completion of user journey, application maintenance (data or step status maintenance) via Application Overview, Work Item resolution)
Staff requires the ability to view the Application History and Application Notes in a single, chronologically-sorted log
Each entry in the log should include the following information: • Performed by (System, Applicant Name, or User ID) • Date/time • Product • Action Description/User Note
Entities have the ability to archive the Application History and Application Notes for applications pass the default 45-day purge trigger
A "Document Reference ID" or equivalent in QMS is required by the entities to facilitate the indexing/retrieval of documentation images for a work item
APe Response to Reason Codes • When entities define the response to reason codes coming from the various internal and external systems (e.g., SMG3, PPE, 3rd party VI systems, etc.), configuration should be able to account for multiple pieces of key customer information such as customer Segment, Customer value, line of business.
APe Response to Reason Codes • Business requires the ability to define the actions APe would take in response to these reason codes (e.g., create work item, add item to 'to-do' list, etc.).
APe Response to Reason Codes • Business should be able to assign a priority code to each reason code that triggers a work item, which would then be used to determine the priority in which the associated work items are pushed to staff and how they would be presented on-screen.
APe Response to Reason Codes • Business should be able to define certain work items as inter-dependent. That is, if the business deems certain work items to be "critical" in the process, all other work items would be assigned a "pend status" (e.g., not pushed to staff automatically nor staff be able to resolve them) until such a time when the critical work item(s) are resolved
Ability to create work items • Entities should be able to define rules in APe that determines whether a work item is created, (e.g., trigger a work item for certain reason codes such as failed Validate Identity).
Ability to create work • Work items may be triggered as the journey is being completed. However, work items should only be created in QMS once the journey is completed and submitted (e.g., when APe OpenAccount Macro Service is triggered)
Ability to create work items • System should allow flexibility such that work items may be triggered and created in QMS as the AO journey is completed in future release
Ability to work on/resolve work Items • Once a work item has been resolved (i.e., status = "resolved") by a member of staff, the macro service/APe processes associated with work item is automatically re-run
Ability to work on/resolve work Items • For critical work items the staff has assigned status = failed, the application should be declined automatically and any pending work items purge
Prioritization • There should be the ability to prioritize work items based on the priority code assigned to the reason codes that triggered them
Prioritization • The priority code should take into account for the following: • The reason code being presented back from internal/external systems (e.g., SMG3, PPE, 3rd party VI, etc.)• Multiple pieces of key customer information such as Customer Segment, Customer Value, Line of Business. This list should be expandable to accommodate other workstreams in future releases
Escalation and Aging • There should be the ability to escalate work items based on time-on-system
Escalation and Aging • As a work item ages in a queue, there should be the ability for the system to re-assign the work item with a higher Urgency Level and move it towards the top of the queue.
Escalation and Aging • Business should have the ability to define the business logic associated with the Urgency Level (Service Level Agreement (SLA))for each queue. • The urgency level of a work item within a queue may increase according to the time-on-system (e.g., 5 days = weighting of 1, 10 days = weighting of 2, etc
Escalation and Aging • As part of the escalation process, there should be the ability for an item to be transferred from queue to queue
Re-Decision: • Ability to Re-Decision the Application at any time during the journey • Ability to Re-Decision the Application during QMS
Ability for a relationship manager to confirm the company has completed all required steps for boarding and then action AO to commence boarding.
Validate Business (Yes/No) - due diligence check on Business
Permitted to Board (Yes/No) - Staff (e.g. Relationship Manager) verifies that the product can be boarded (for CMB)
Ability to present error message when work item is triggered
When a work item is triggered, staff should be notified on-screen via an appropriate message as they complete a journey on behalf of the customer. This function is not to be made available on customer channels System Maintenance System maintenance provides the ability to set applications to a 'cancelled' status as well as creates follow-up communications within Account Opening. It also enables the archiving of the application data into a retrievable Database after the application is purged from OH APe tables.

The Business has the ability to schedule and configure when chaser or follow-up communications are sent to a customer, where an application has been saved and the customer has not returned to complete the application. For instance, if an application has been pending for a certain number of days, a chaser communication may be sent to the customer to remind him that he has an incomplete application outstanding, with details of how to retrieve and continue with his application.

There are several chaser files created by OH APe based on values predefined within an OH APe internal configuration table. The main chaser files include: Validate Identity Chasers, Terms and Conditions Chasers, Decision Chasers, Boarding Welcome Letter Chasers and Funding Chasers. A local entity can configure the chaser letters based on product type, product status, application status, time limit/number of days before a chase letter is sent, chaser document ID, etc. The selection criteria should be on the applicant level, not the application level, but are based on the statuses as they pertain to the event for which a chaser is being created, for example, the VI chaser is based on the VI status of the applicant. OH APe will send these files to ICCM, and ICCM enables the communication letter to be sent to advise applicants of the action required.

Exemplary conditions under which Chasers should be sent by ICCM for OH APe core include the following:

Validate Identity Chasers—Validate Identity is in 'In Review' status for a number of days Terms and Conditions Chasers—The customer has been presented the Terms and Conditions, but has not accepted or declined in number of days Decisioning Chasers—The customer is in Pending Decision status for a number of days Funding Chasers—The account is boarded and funding is pending for cash or check or funding is unsuccessful for online funding for number of days Final Activity (About to Cancel) Chasers—Product is in INPRG (in progress) or approved status (not boarded) and no activity has occurred in number of days Table 9 lists exemplary criteria for the batch triggers.

TABLE 9

| COMMS TYPE DESC | Batch Trigger Criteria |
| --- | --- |
| VALIDATE IDENTITY FAILED | Applicant Validate Identity Status = 'INVALD', Validate Identity Timestamp falls between last date time and next date time (24 hr period) for the current processing date on the APE Date table, and Applicaton is in Active status. Configurable by Entity ID. VI Reason codes sent to ICCM |
| PENDING ID VALIDATION | Applicant Validate Identity Status = 'INREVW', Validate Identity Timestamp falls between last date time and next date time (24 hr period) for the current processing date on the APE Date table, and Application is in Active status. Configurable by Entity ID. VI Reason codes sent to ICCM |
| PENDING VI CHASER 1 | Applicant Validate Identity Status = 'INREVW', Validate Identity Timestamp falls between START DATE TIME and END DATE TIME (24 hr period), and Applicaton is in Active status. Configurable by Entity ID, Number of Days til Chaser. VI Reason codes sent to ICCM |
| PENDING VI CHASER 2 | Applicant Validate Identity Status = 'INREVW', Validate Identity Timestamp falls between START DATE TIME and END DATE TIME (24 hr period), and Applicaton is in Active status. Configurable by Entity ID, Number of Days til Chaser. VI Reason codes sent to ICCM |
| PENDING VI CHASER 1 MULTI-APPLICANT | Applicant Validate Identity Status = 'INREVW', Validate Identity Timestamp falls between START DATE TIME and END DATE TIME (24 hr period), and Application is in Active status. Configurable by Entity ID, Number of Days til Chaser. Send to Primary Applicant |
| PENDING VI CHASER 2 MULTI-APPLICANT | Applicant Validate Identity Status = 'INREVW', Validate Identity Timestamp falls between START DATE TIME and END DATE TIME (24 hr period), and Application is in Active status. Configurable by Entity ID, Number of Days til Chaser. Send to Primary Applicant |
| DECISION NOTIFICATION PENDING | Multiple Product Application, (single product application gets realtime comms), All applicants on Product are decisioned. Decision Status is Approved with Work items (Pending), Decision Status Timestamp for Product falls between last date time and next date time (24 hr period) on the APE Date table, and Application is in Active status. All Products decisioned in this timeframe with Pending Status on same Comms. Configurable by Entity ID, Group product Code, Channel origin Code, Test Treatment Code. |
| DECISION NOTIFICATION APPROVED | Multiple Product Application, (single product application gets realtime comms), All applicants on Product are decisioned, Decision Status is Approved, Decision Status Timestamp for Product falls between last date time and next date time (24 hr period) on the APE Date table, and Applicaton is in Active status. All Products decisioned in this timeframe with Approved Status on same Comms. Configurable by Entity ID, Group product Code, Channel origin Code, Test Treatment Code. |

TABLE 9-continued

| COMMS TYPE DESC | Batch Trigger Criteria |
|---|---|
| DECISION NOTIFICATION DENIED | Multiple Product Application, (single product application gets realtime comms),<br>All applicants on Product are decisioned,<br>Decision Status is Denied,<br>Decision Status Timestamp for Product falls between last date time and next date time (24 hr period) on the APE Date table, and Application is in Active status.<br>All Products decisioned in this timeframe with Denied Status on same Comms,<br>Configurable by Entity ID, Group product Code, Channel origin Code, Test Treatment Code. |
| DECISIONING ACTIVITY CHASER | All applicants on Product are decisioned,<br>Decision Status is Approved with Work items (Pending),<br>Decision Status Timestamp for Product falls between START DATE TIME and END DATE TIME (24 hr period), and Application is in Active status.<br>Configurable by Entity ID, Number of Days til Chaser, Group product Code, Channel origin Code, Test Treatment Code.<br>Send to Primary Applicant if Secondary Applicant PENDING |
| DECISION NOTIFICATION CHASER MULTI-APPLICANT | All applicants on Product are decisioned,<br>Decision Status is Approved with Work items (Pending),<br>Decision Status Timestamp for Product falls between START DATE TIME and END DATE TIME (24 hr period), and Application is in Active status.<br>Configurable by Entity ID, Number of Days til Chaser, Group product Code, Channel origin Code, Test Treatment Code. Send to Primary Applicant if Secondary Applicant PENDING |
| T&C PENDING ACCEPT CHASER 1 | Customer has been presented Terms and Conditions, but has neither Accepted or Declined for the product,<br>Terms and Conditions Timestamp falls between START DATE TIME and END DATE TIME (24 hr period), and Application is in Active status.<br>Configurable by Entity ID, Number of Days til Chaser, Group product Code, Channel origin Code, Test Treatment Code. |
| T&C PENDING ACCEPT CHASER 2 | Customer has been presented Terms and Conditions, but has neither Accepted or Declined for the product,<br>Terms and Conditions Timestamp falls between START DATE TIME and END DATE TIME (24 hr period), and Application is in Active status.<br>Configurable by Entity ID, Number of Days til Chaser, Group product Code, Channel origin Code, Test Treatment Code. |
| T&C PENDING ACCEPT CHASER 1 MULTI-APPLICANT | Customer has been presented Terms and Conditions, but has neither Accepted or Declined for the product,<br>Terms and Conditions Timestamp falls between START DATE TIME and END DATE TIME (24 hr period), and Application is in Active status.<br>Configurable by Entity ID, Number of Days til Chaser, Group product Code, Channel origin Code, Test Treatment Code.<br>Send to Primary Applicant if Secondary Applicant Pending T and C. |
| T&C PENDING ACCEPT CHASER 2 MULTI-APPLICANT | Customer has been presented Terms and Conditions, but has neither Accepted or Declined for the product,<br>Terms and Conditions Timestamp falls between START DATE TIME and END DATE TIME (24 hr period), and Application is in Active status.<br>Configurable by Entity ID, Number of Days til Chaser, Group product Code, Channel origin Code, Test Treatment Code.<br>Send to Primary Applicant if Secondary Applicant Pending T and C. |
| FUNDING PENDING CHASER1 | Product Status = Boarded ('BOARD'),<br>Funding Status Timestamp falls between START DATE TIME and END DATE TIME (24 hr period), AND<br>(Funding Status = 'PND' and Funding Option = Cash or Check OR Funding Status = 'Uns' Unsuccessful and Funding Option = Electronic), AND<br>Application is in Active status.<br>Configurable by Entity ID, Number of Days til Chaser, Group product Code, Channel origin Code, Test Treatment Code. |
| FUNDING PENDING CHASER2 | Product Status = Boarded ('BOARD'),<br>Funding Status Timestamp falls between START DATE TIME and END DATE TIME (24 hr period), AND<br>(Funding Status = 'PND' and Funding Option = Cash or Check OR Funding Status = 'Uns' Unsuccessful and Funding Option = Electronic), AND<br>Application is in Active status.<br>Configurable by Entity ID, Number of Days til Chaser, Group product Code, Channel origin Code, Test Treatment Code. |

TABLE 9-continued

| COMMS TYPE DESC | Batch Trigger Criteria |
|---|---|
| FUNDING PENDING CHASER1 MULTI-APPLICANT | Product Status = Boarded ('BOARD'), Funding Status Timestamp falls between START DATE TIME and END DATE TIME (24 hr period), AND (Funding Status = 'PND' and Funding Option = Cash or Check OR Funding Status = 'Uns' Unsuccessful and Funding Option = Electronic), AND Application is in Active status. Configurable by Entity ID, Number of Days til Chaser, Group product Code, Channel origin Code, Test Treatment Code. Send to Primary Applicant if Secondary Applicant gets Funding Chaser. |
| FUNDING PENDING CHASER2 MULTI-APPLICANT | Product Status = Boarded ('BOARD'), Funding Status Timestamp falls between START DATE TIME and END DATE TIME (24 hr period), AND (Funding Status = 'PND' and Funding Option = Cash or Check OR Funding Status = 'Uns' Unsuccessful and Funding Option = Electronic), AND Application is in Active status. Configurable by Entity ID, Number of Days til Chaser, Group product Code, Channel origin Code, Test Treatment Code. Send to Primary Applicant if Secondary Applicant gets Funding Chaser |
| BOARDED WELCOME CREDIT CARD | Multiple Product Application, (single product application gets realtime comms), Product status was changed to BOARD (Boarded) between last date time and next date time (24 hr period) on the APE Date table, and Application is in Active status, Only the Credit card product boarded in this time period All applicants on the Product will get Welcome letter. Configurable by Entity ID, Group product Code, Product code, Channel origin Code, Test Treatment Code. |
| BOARDED WELCOME SAVINGS | Multiple Product Application, (single product application gets realtime comms), Product status was changed to BOARD (Boarded) between last date time and next date time (24 hr period) on the APE Date table, and Application is in Active status, Only the Savings product boarded in this time period All applicants on the Product will get Welcome letter. Configurable by Entity ID, Group product Code, Product code, Channel origin Code, Test Treatment Code. |
| BOARDED WELCOME TERM DEPOSIT | Multiple Product Application, (single product application gets realtime comms), Product status was changed to BOARD (Boarded) between last date time and next date time (24 hr period) on the APE Date table, and Application is in Active status, Only the Term deposit product boarded in this time period All applicants on the Product will get Welcome letter. Configurable by Entity ID, Group product Code, Product code, Channel origin Code, Test Treatment Code. |
| BOARDED WELCOME CHECKING | Multiple Product Application, (single product application gets realtime comms), Product status was changed to BOARD (Boarded) between last date time and next date time (24 hr period) on the APE Date table, and Application is in Active status, Only the Checking product boarded in this time period All applicants on the Product will get Welcome letter. Configurable by Entity ID, Group product Code, Product code, Channel origin Code, Test Treatment Code. |
| BOARDED WELCOME MULTI-PRODUCT | Multiple Product Application, (single product application gets realtime comms), Product status was changed to BOARD (Boarded) between last date time and next date time (24 hr period) on the APE Date table, and Application is in Active status, More than one product boarded in this time period (all boarded products from time period on comms) All applicants on the Product will get Welcome letter. Configurable by Entity ID, Group product Code, Product code, Channel origin Code, Test Treatment Code |
| BOARDED WELCOME BUNDLE PRODUCT | Multiple Product Application, (single product application gets realtime comms), Product status was changed to BOARD (Boarded) between last date time and next date time (24 hr period) on the APE Date table, and |

TABLE 9-continued

| COMMS TYPE DESC | Batch Trigger Criteria |
|---|---|
| | Application is in Active status, This is a Bundled product boarded in this time period (all products in bundle from time period on comms) All applicants on the Product will get Welcome letter. Configurable by Entity ID, Group product Code, Product code, Channel origin Code, Test Treatment Code. |

As part of the system maintenance function, the Business also has the ability to move a product to a "cancelled" status. The Business can set a period in days (since the application was saved) after which a pending application is considered cancelled/expired, if the customer has not returned to complete the application during that time. The cancel parameters will be required at a product level, so that it can be set for all applications for the same product type. A local entity can configure the cancel parameters based on application/product status, time limit/number of days before cancel, communication/document ID, etc. A daily batch job shall run to create a cancel file which includes all applications that has one or more products passed the expiration date. This file will be sent to ICCM, and a notification of product cancellation will be sent to all applicants by ICCM. When an application is cancelled, OH APe will invoke QMS to clean up all pending work items related to that product and mark the work item status to "cancelled" as well.

System Maintenance also provides the ability to archive the old application data. The Business will set a time period in days after which applications will be archived from the account opening system to a historic database. The original application data will be purged from OH APe application tables. At the time of archival, the customer profile needs to be updated and relevant information, such as T&C elements, should be stored. Other items relating to profile and usage should be maintained on the profile, not within account opening. The archived applications shall be retrievable in case of a future need for audit purposes, legal or compliance purposes.

The parameters governing the cancel and purging of applications are set individually, providing a separate count down for the ability.

Exemplary functional features of Application Process Flow Management, according to some embodiments of the invention, are listed in Table 10.

TABLE 10

| Functional Specifications - System Maintenance |
|---|
| Description: System Maintenance Active Application timer should be at the Applicant level, not the Application level. Pending Items and Chaser Communications - Multiple types of Batch System maintenance Communications and Chasers may be defined and configured by the business Description: Provide detail how Batch Bulk and System Maintenance can utilize the APe Restart process. |

Figure 26:
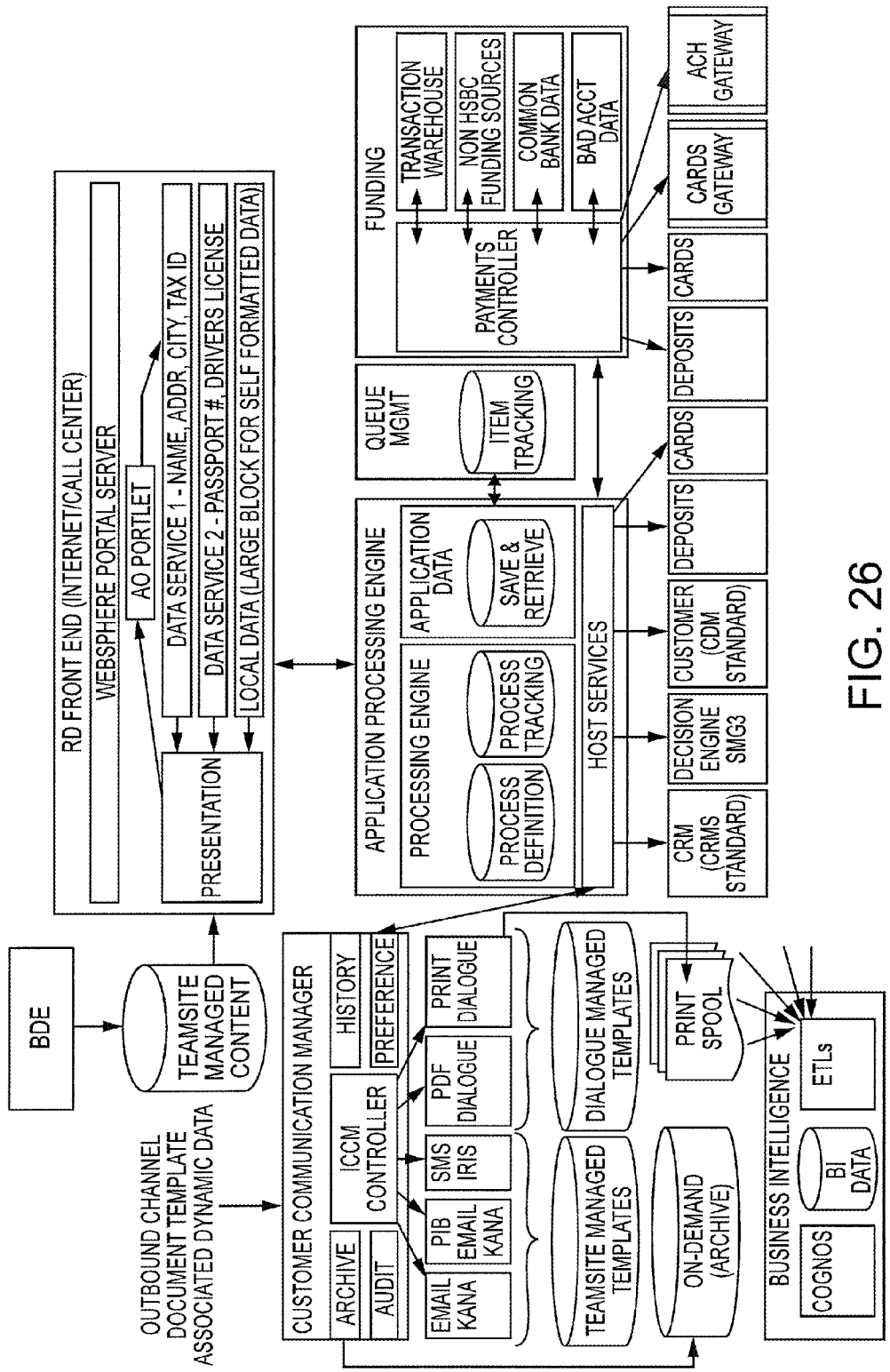
FIG. 26 shows the application processing engine within the architecture of an exemplary embodiment of an account opening system.
Figure 27:
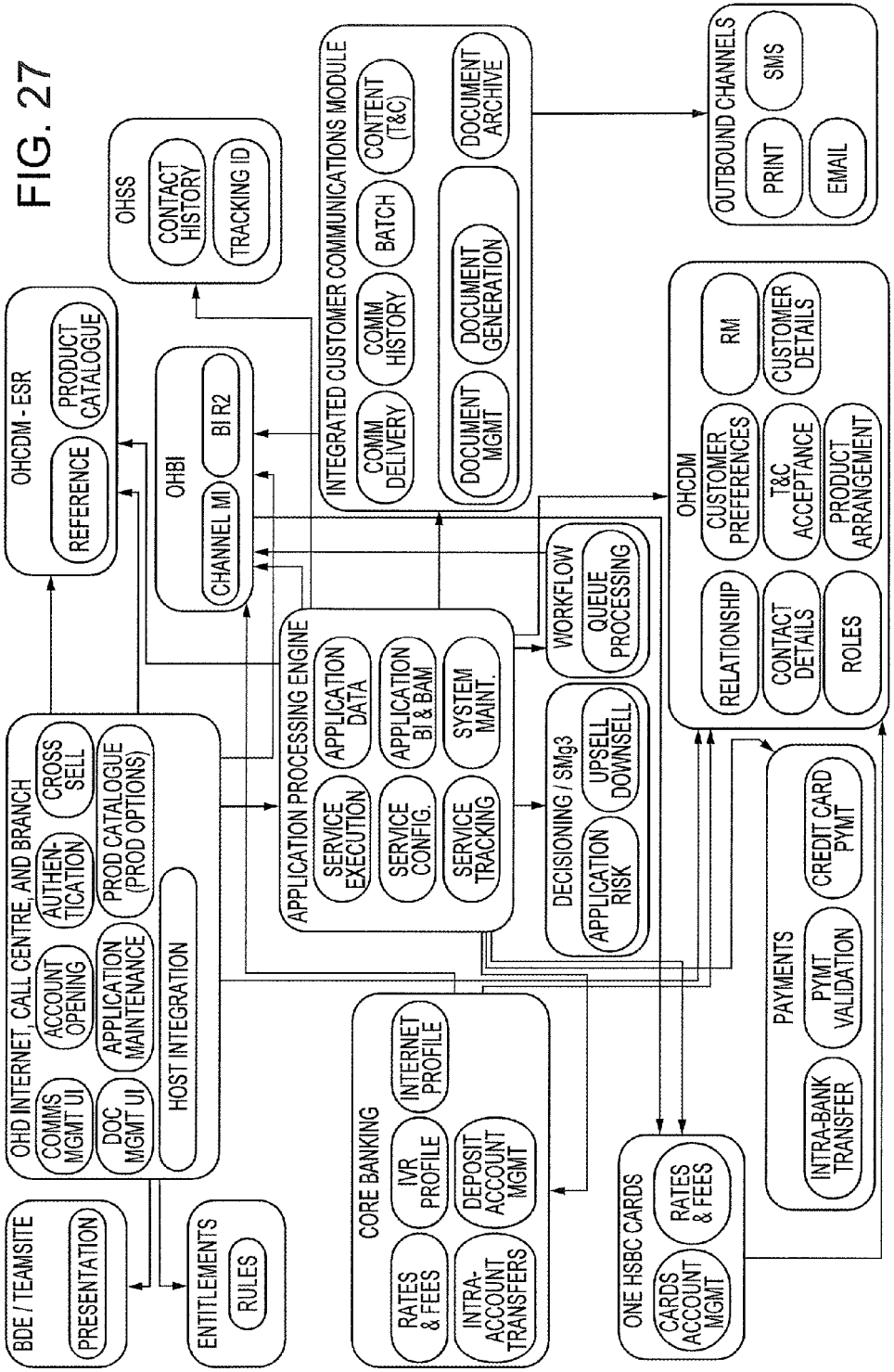
FIG. 27 shows another view the application processing engine within the architecture of an exemplary embodiment of an account opening system.

FIGS. 26 and 27 show the application processing engine within the overall architecture of exemplary embodiments of an account opening system.

Figure 28:
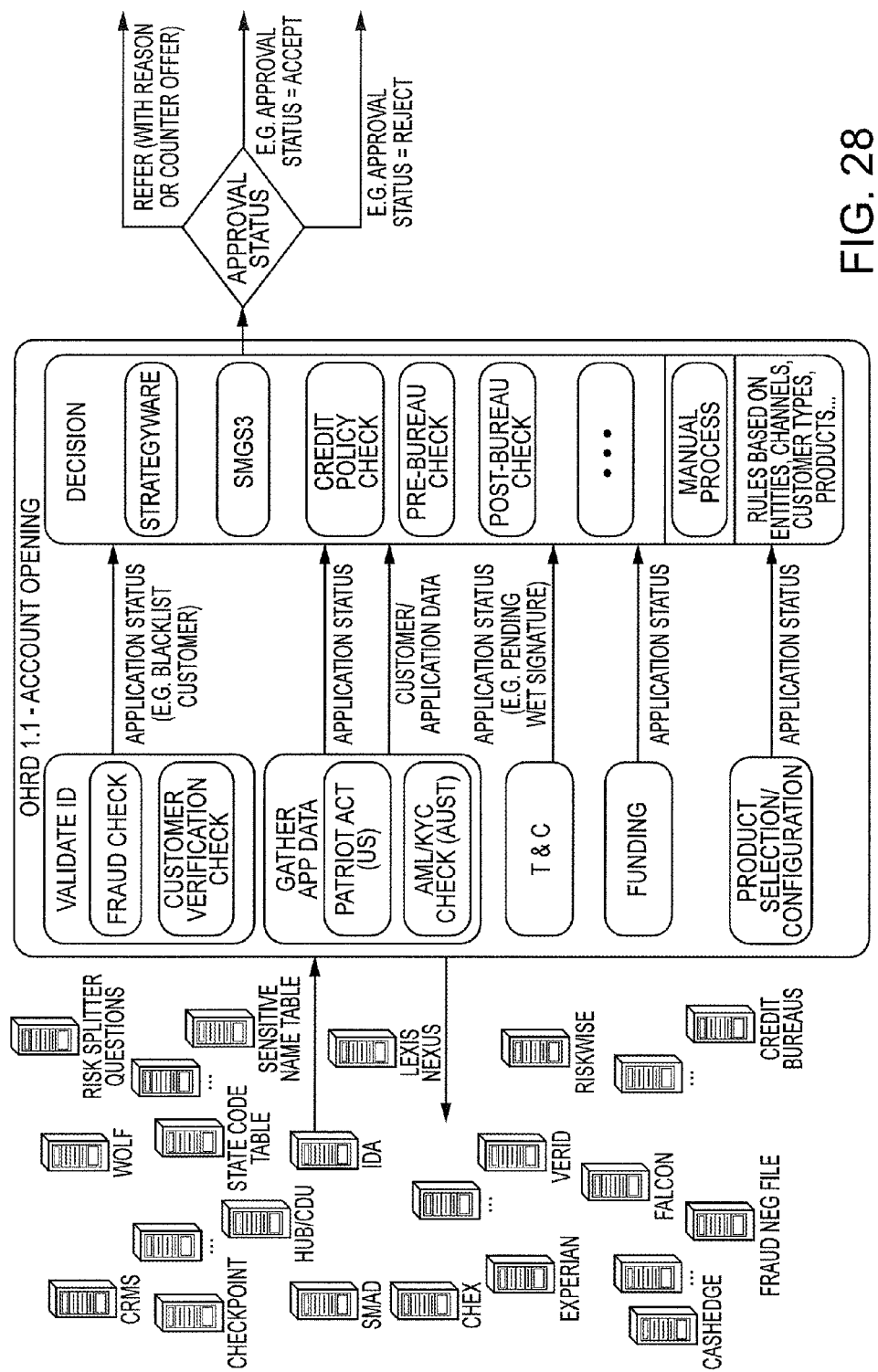
FIG. 28 depicts exemplary internal and third party data sources that may support the decision process.

FIG. 28 depicts exemplary internal and third party data sources that may support the decision process.

Figure 29:
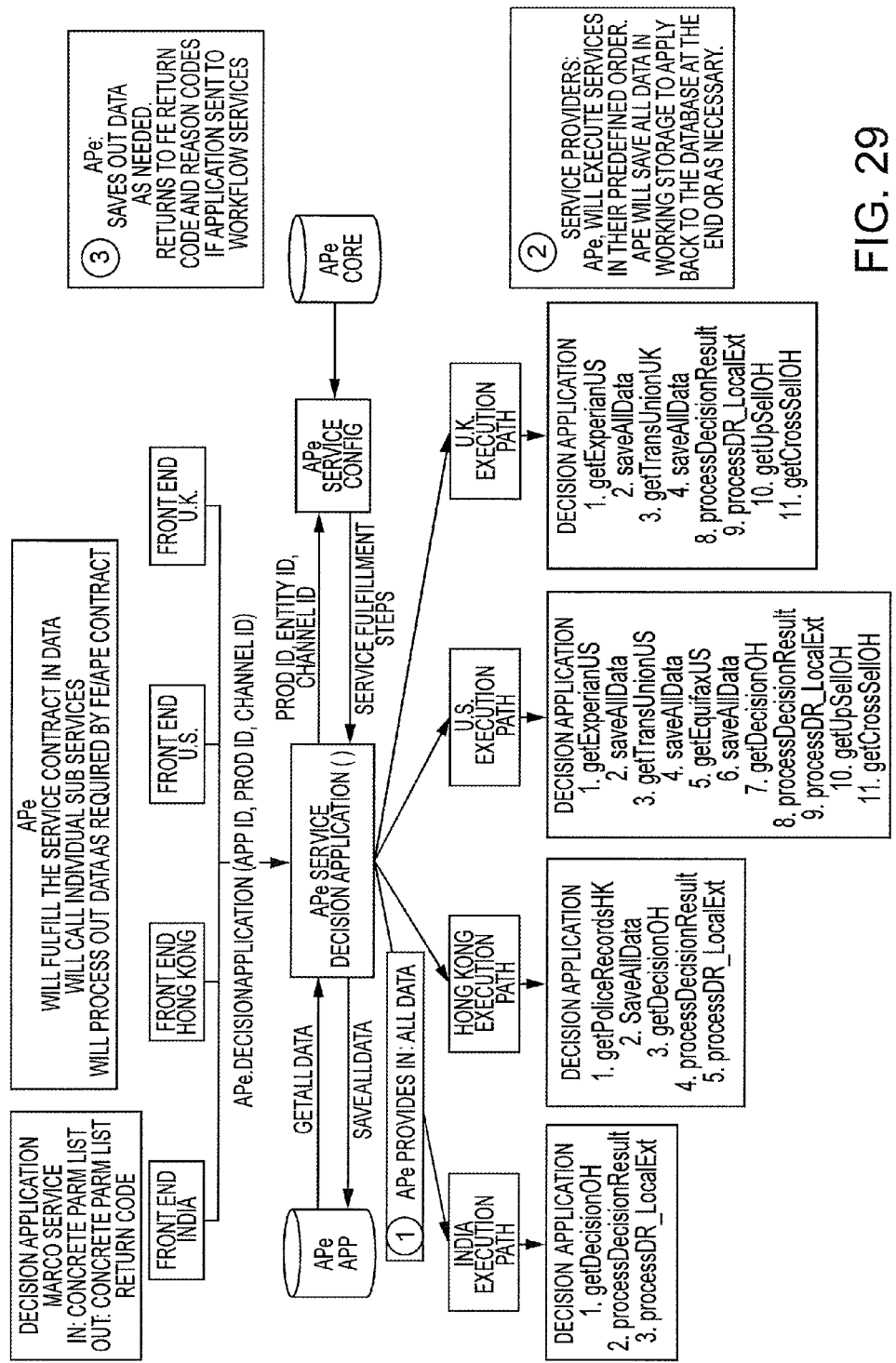
FIG. 29 is a diagram showing exemplary local entity decision systems.

APe is built to support regional deployment. FIG. 29 is a diagram showing exemplary local entity decision systems.

The detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the instructions and/or operations performed may be referred to in terms, such as generating, determining, adding and/or comparing. The instructions and/or operations described herein which form part of the present invention are machine operations. Useful machines for performing the operation of the present invention include general purpose digital computers or similar devices that have been programmed to perform these specialized operations.

The present invention also relates to apparatus for performing these operations. This apparatus may be specially constructed for the required purpose or it may comprise a general purpose computer as selectively activated or reconfigured by a computer program stored in the computer. Various general purpose machines may be used with programs written in accordance with the teachings herein providing a specialized machine thereby, or it may prove more convenient to construct more specialized apparatus to perform the required method steps. The required structure for a variety of these machines will appear from the description given.

The system according to the invention may include a general purpose computer programmed in a particular manner, or a specially programmed special purpose computer. The user may interact with the system, for example, via a personal computer, wireless device, PDA, etc. Either of these may be implemented as a distributed computer system rather than a single computer. Similarly, the communications link may be a dedicated link, a modem over a POTS line, the Internet, an Intranet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, laptop/notebook, mini, mainframe and super computers, wireless smart devices, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

It is to be understood that the invention is not limited in its application to the details of construction and to the arrangements of the components set forth in the description above or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

What is claimed is:

1. An application processing engine computer system, comprising:
    at least one computer database; and
    an application processing computer in communication with said at least one database, the application processing computer configured to process an application for at least one product using a plurality of coordinated, configurable services, comprising:
        an application data management service, responsive to the application, receiving and updating application data based on front end data from a front end user interface, internal data from an internal database, and external data from an external database;
        an application process flow management service generating an application record and executing at least one macro service;
        a decisioning service determining a decision for the application based on the application data;
        an application processing host service retrieving the internal data and the external data, and processing instructions responsive to predetermined and configurable service rules to complete the application process;
        an application activity monitoring service monitoring application processing activity and providing activity data and metrics;
        a queue management service managing applications that are pending and unable to be processed via straight through processing of the application; and
        a system maintenance service supporting communications, application archiving, application aging, and application expiry processes, and restarting of pending applications based on user configurable criteria,
    wherein the front end user interface is configured to be accessible by both a customer channel providing access to a customer computer to provide customer data for the application to be processed and a staff channel providing access to a staff computer to provide application processing data used in the processing of the application by the application processing engine computer system.

2. The application processing engine computer system of claim 1, wherein the front end user interface comprises a user configurable front end user interface that is decoupled from the underlying application process provided by the application processing engine.

3. The application processing engine computer system of claim 1, wherein the application processing computer is configured to receive reference data and product data for the at least one product from an enterprise standard reference repository.

4. The application processing engine computer system of claim 1, wherein the application processing computer is configured to communicate with a customer data management system to generate a customer record or retrieve information from an existing customer record stored in at least one customer data management database.

5. The application processing engine computer system of claim 1, wherein the application processing computer is configured to use a decoupled process to invoke an integrated customer communications module to provide one or more communications to a user based on user configurable criteria including business process, product group, product code, and user role, responsive to a call from the front end user interface or the application process flow management service.

6. The application processing engine computer system of claim 1, wherein the application processing computer is configured to communicate with at least one third party validation system to validate the identity of an applicant associated with the application.

7. The application processing engine computer system of claim 1, wherein the application processing computer is configured to communicate with a decision engine supporting the decisioning service.

8. The application processing engine computer system of claim 1, wherein the external database is at least one of a credit bureau database and a blacklist database.

9. The application processing engine computer system of claim 1, wherein the application processing computer is configured to communicate with a sales services system to track contacts with the user.

10. The application processing engine computer system of claim 1, wherein the application processing computer is configured to communicate with said front end user interface and a payment processing engine to execute one or more account funding instructions.

11. The application processing engine computer system of claim 1, wherein the application processing computer is configured to board an account to at least one product system.

12. The application processing engine computer system of claim 1, wherein the application processing computer is configured to provide at least one of a product application data extract, a product applicant data extract, a transaction log, a product configuration data extract, a to-do data extract, and a queue management system data extract to a computer intelligence system.

13. The application processing engine computer system of claim 1, wherein the application processing computer is configured to generate work items in a queue management system based on predetermined rules of process errors and reason codes.

14. The application processing engine computer system of claim 13, wherein the reason codes include a priority associated with the work item, and wherein the reason codes are unique for a given combination of entity, service ID, and sub-service ID.

15. The application processing engine computer system of claim 1, wherein the application processing computer is configured to log all activity related to the application and maintain the state of the application and products within the application.

16. The application processing engine computer system of claim 1, wherein the application processing computer is configured to determine and configure whether a product option is at a product level or applicant level, and associate the product option with at least one of a configuration ID, a customer segment, and a business line.

17. The application processing engine computer system of claim 16, wherein the front end user interface presents the product option responsive to at least one of the configuration ID and a user role.

18. The application processing engine computer system of claim 1, wherein the application processing engine receives from the front end user interface an Accept Offer or Decline Offer message resulting in a status change for die user for the at least one product, and invoking one or more downstream processes.

19. The application processing engine computer system of claim 1, wherein the application processing computer is configured to save the application data to said at least one database, wherein said saving comprises at least one of accepting predetermined application data and preferred contact mode, generating a retrieval code based upon a code generation request type, and saving the retrieval code and the preferred contact mode to said at least one database.

20. The application processing engine computer system of claim 19, wherein the application processing computer is configured to retrieve the previously saved application data from said at least one database, responsive to receiving the predetermined application data and the retrieval code, provided that the application has not reached a user configurable point in time for archival.

21. The application processing engine computer system of claim 1, wherein the application processing computer is configured to receive an application ID, an applicant ID, and a product tracker ID; insert an event type into an event tracker table indicating that gather application data is completed for the at least one product; and update a product status to accept when the product status is approved, gather application data is completed, and there are no to-do items pending.

22. The application processing engine computer system of claim 1, wherein the application processing computer is configured to capture events that occurred in the application at a service level, the events comprising application status changed, product status changed, validate identity status changed, user gather application data started, accept terms and conditions, accept product offer, user gather application data complete, decision status changed, user journey complete, product replaced—upsell/downsell, and sent final activity communication.

23. The application processing engine computer system of claim 1, wherein the application processing computer is configured to generate configurable to-do items at an applicant level, a product level and an applicant/product level for different user roles.

24. The application processing engine computer system of claim 1, wherein the at least one macro service calls a sub service responsive to the configurable service rules.

25. The application processing engine computer system of claim 1, wherein the at least one macro service is called by the front end user interface to perform at least one of the following functions responsive to the execution by the application process flow management service: Create Application, Add Involved Party, Update Applicant, Process Applicant, Accept Terms and Conditions, Accept Offer, Save Options, Cancel Product, Decision Application, Open Account, Execute Funding, Decision Application.

26. A computer implemented method for processing an application for at least one product by an application processing computer in communication with at least one database, comprising:
   receiving and updating application data, by the application processing computer implementing an application data management service, based on front end data from a front end user interface, internal data from an internal database, and external data from an external database;
   generating an application record and executing at least one macro service, by the application processing computer implementing an application process flow management service;
   determining a decision for the application, by the application processing computer implementing, a decisioning service, based on the application data;
   retrieving the intermit data and the external data, and processing instructions responsive to predetermined and configurable service rules, by the application processing computer implementing an application processing host service, to complete the application process;
   monitoring application processing activity and providing activity data and metrics, by the application processing computer implementing an application activity monitoring service;
   managing applications that are pending and unable to be processed via straight through processing of the application, by the application processing computer implementing a queue management service; and
   supporting communications, application archiving, application aging, and application expiry processes, and restarting of pending applications, by the application processing computer implementing a system maintenance service, based on user configurable criteria,
   wherein the front end user interface is configured to be accessible by both customer channel providing access to a customer computer to provide customer data for the application to be processed and a staff channel providing access to a staff computer to provide application processing data used in the processing of the application by the application processing engine computer system.

27. The computer implemented method for processing an application of claim 26, wherein the front end user interface comprises a user configurable front end user interface that is decoupled from the underlying application process provided by the application processing engine.

28. The computer implemented method for processing an application of claim 26, further comprising receiving by the application processing computer reference data and product data for the at least one product from an enterprise standard reference repository.

29. The computer implemented method for processing an application of claim 26, further comprising communicating by the application processing computer with a customer data management system to generate a customer record or retrieve information from an existing customer record stored in at least one customer data management database.

30. The computer implemented method for processing an application of claim 26, further comprising invoking an integrated customer communications module by the application processing computer using a decoupled process to provide one or more communications to a user based on user configurable criteria including business process, product group, product code, and user role, responsive to a call from the front end user interface or the application, process flow management service.

31. The computer implemented method for processing an application of claim 26, further comprising communicating by the application processing computer with said front end user interface and a payment processing engine to execute one or more account funding instructions.

32. The computer implemented method for processing an application of claim 26, further comprising generating by the application processing computer work items based on predetermined rules of work item processing codes unique for a given combination of entity, service ID, and. sub-service ID including a priority associated with the work item.

33. The computer implemented method for processing an application of claim 26, further comprising determining by the application processing computer whether a product option is at a product level or applicant level, and associating the product option with at least one of a configuration ID, a customer segment, and a business line.

34. The computer implemented method for processing an application of claim 26, further comprising saving by the application processing computer the application data to said at least one database, wherein said saving comprises at least one of accepting predetermined application data and preferred contact mode, generating a retrieval code based upon a code generation request type, and saving the retrieval code and the preferred contact mode to said at least one database.

35. The computer implemented method for processing an application of claim 34, further comprising retrieving the previously saved application data from said at least one database, responsive to receiving the predetermined application data and the retrieval code, provided that the application has not reached a user configurable point in time for archival.

36. The computer implemented method for processing an application of claim 26, further comprising: receiving an application ID, an applicant ID, and a product tracker ID; inserting an event type into an event tracker table indicating that gather application data is completed for the at least one of the product and service; and updating a product status to accept when the product status is approved, gather application data is completed, and there are no to-do items pending.

* * * * *

UNITED STATES PATENT AND TRADEMARK OFFICE
CERTIFICATE OF CORRECTION

| | | |
|---|---|---|
| PATENT NO. | : 8,843,939 B2 | Page 1 of 1 |
| APPLICATION NO. | : 13/270831 | |
| DATED | : September 23, 2014 | |
| INVENTOR(S) | : Ron Lesandro et al. | |

It is certified that error appears in the above-identified patent and that said Letters Patent is hereby corrected as shown below:

On the title page, item 75 please change the Inventors section as follows:

From:

"Srinivas Laksham, Mexico City (MX);"

To:

--Srinivas Lakshman, Mexico City (MX)--

Signed and Sealed this
Seventh Day of June, 2016

Michelle K. Lee
*Director of the United States Patent and Trademark Office*